(12) United States Patent
Noh et al.

(10) Patent No.: US 10,470,128 B2
(45) Date of Patent: Nov. 5, 2019

(54) EARLY DETECTION PROCEDURE OF HIGH-EFFICIENCY FRAME AND DECISION TIMING FOR SPATIAL REUSE

(71) Applicant: NEWRACOM, INC., Irvine, CA (US)

(72) Inventors: Yujin Noh, Irvine, CA (US); Dae Won Lee, Portland, OR (US); Sungho Moon, San Jose, CA (US); Young Hoon Kwon, Laguna Niguel, CA (US); Ahmad Reza Hedayat, Aliso Viejo, CA (US)

(73) Assignee: NEWRACOM, INC., Lake Forest, CA (US)

( * ) Notice: Subject to any disclaimer, the term of this patent is extended or adjusted under 35 U.S.C. 154(b) by 125 days.

(21) Appl. No.: 15/356,496

(22) Filed: Nov. 18, 2016

(65) Prior Publication Data

US 2017/0142659 A1    May 18, 2017

Related U.S. Application Data

(60) Provisional application No. 62/405,530, filed on Oct. 7, 2016, provisional application No. 62/400,563, filed on
(Continued)

(51) Int. Cl.
*H04W 52/02* (2009.01)
*H04L 27/00* (2006.01)
(Continued)

(52) U.S. Cl.
CPC ..... *H04W 52/0245* (2013.01); *H04L 27/0006* (2013.01); *H04L 27/2602* (2013.01);
(Continued)

(58) Field of Classification Search
None
See application file for complete search history.

(56) References Cited

U.S. PATENT DOCUMENTS

2014/0307650 A1* 10/2014 Vermani ............... H04L 5/0044
370/329
2015/0195790 A1* 7/2015 Rong .................. H04W 52/243
370/311
(Continued)

OTHER PUBLICATIONS

LAN/MAN Standards Committee of the IEEE Computer Society, "IEEE P802.11ah™/D5.0 Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 2: Sub 1 GHz License Exempt Operation," Mar. 2015.
(Continued)

*Primary Examiner* — Christopher M Crutchfield
*Assistant Examiner* — Alan L Lindenbaum
(74) *Attorney, Agent, or Firm* — Morgan, Lewis & Bockius LLP

(57) ABSTRACT

In wireless communications, a station associated with a first wireless network may perform early detection of a high-efficiency (HE) frame for spatial reuse (SR). The station may determine a received power of a legacy preamble of the HE frame when the frame is associated with a second wireless network. The station may reduce the received power by a predetermined value. The station may initiate an SR transmission, when the reduced power is less than an overlapping basic service set (OBSS) packet detection level. The station may obtain an SR parameter associated with a second station, where the SR parameter is based on a transmission power level and an interference level at the second station, and initiate an SR transmission, based on the SR parameter and the reduced power. Other methods, apparatus, and computer-readable media are also disclosed.

18 Claims, 29 Drawing Sheets

Related U.S. Application Data on Sep. 27, 2016, provisional application No. 62/382,168, filed on Aug. 31, 2016, provisional application No. 62/346,229, filed on Jun. 6, 2016, provisional application No. 62/338,986, filed on May 19, 2016, provisional application No. 62/333,083, filed on May 6, 2016, provisional application No. 62/257,116, filed on Nov. 18, 2015.

(51) Int. Cl.
*H04L 27/26* (2006.01)
*H04W 84/12* (2009.01)

(52) U.S. Cl.
CPC ........ *H04W 52/0229* (2013.01); *H04W 84/12* (2013.01); *Y02D 70/00* (2018.01); *Y02D 70/142* (2018.01); *Y02D 70/22* (2018.01)

(56) References Cited

U.S. PATENT DOCUMENTS

| | | | |
|---|---|---|---|
| 2015/0312907 A1* | 10/2015 | Lee | H04L 27/2085 370/338 |
| 2016/0212247 A1* | 7/2016 | Azizi | H04L 27/2613 |
| 2017/0223563 A1* | 8/2017 | Yang | H04W 24/08 |
| 2017/0294949 A1* | 10/2017 | Zhang | H04B 7/0617 |
| 2018/0048503 A1* | 2/2018 | Kim | H04L 27/26 |

OTHER PUBLICATIONS

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz," 2013.

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications," 2012.

* cited by examiner

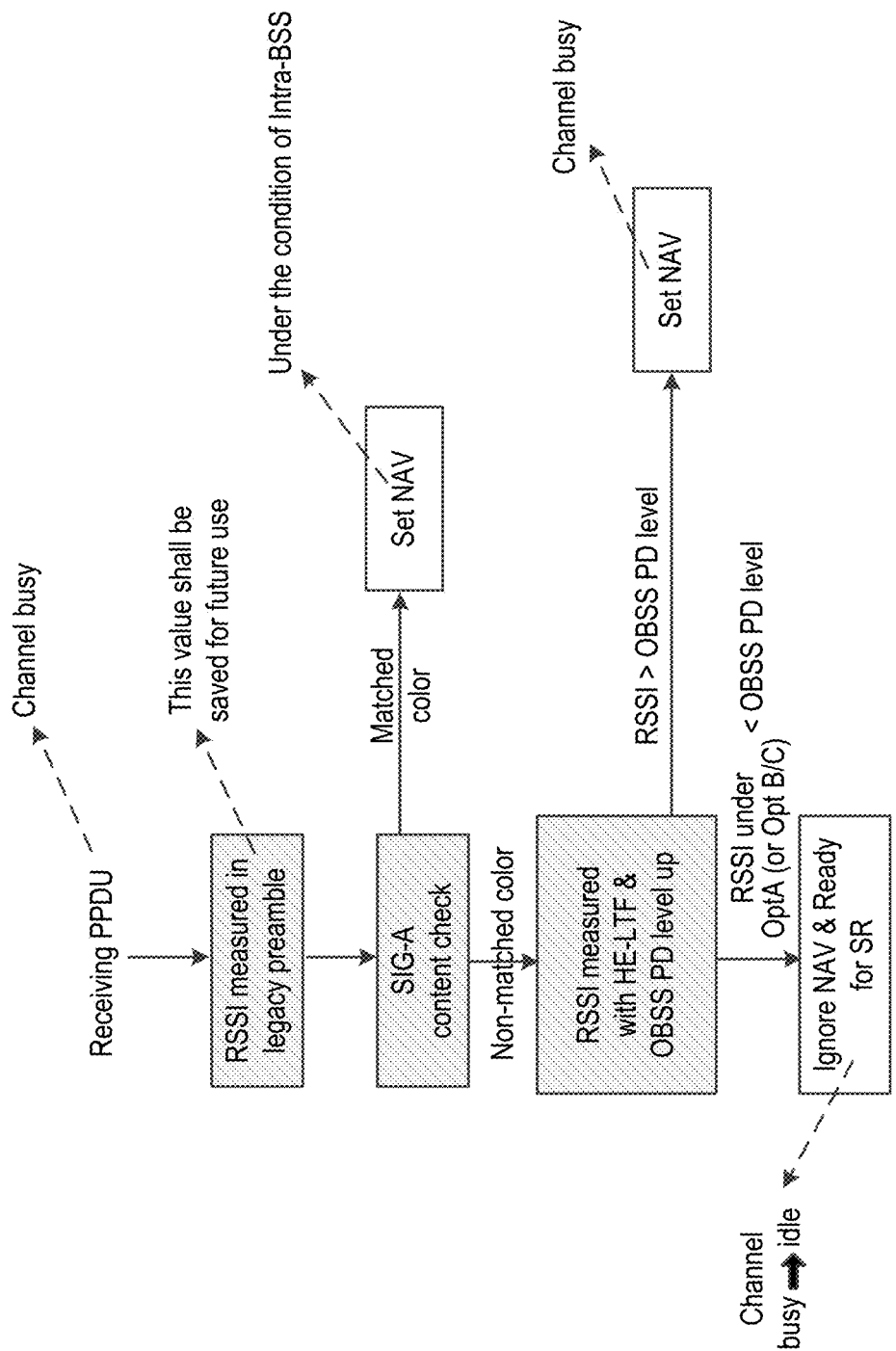

EARLY DETECTION PROCEDURE OF HIGH-EFFICIENCY FRAME AND DECISION TIMING FOR SPATIAL REUSE

CROSS-REFERENCE TO RELATED APPLICATIONS

This application claims the benefit of priority from U.S. Provisional Application No. 62/257,116, entitled "EARLY DETECTION PROCEDURE OF LEGACY FRAME AND HE FRAME FOR SR," filed Nov. 18, 2015; U.S. Provisional Application No. 62/333,083, entitled "EARLY DETECTION PROCEDURE OF LEGACY FRAME AND DECISION TIMING FOR SR," filed May 6, 2016; U.S. Provisional Application No. 62/338,986, entitled "EARLY DETECTION PROCEDURE OF LEGACY FRAME AND DECISION TIMING FOR SR," filed May 19, 2016; U.S. Provisional Application No. 62/346,229, entitled "EARLY DETECTION PROCEDURE OF LEGACY FRAME AND DECISION TIMING FOR SR," filed Jun. 6, 2016; U.S. Provisional Application No. 62/382,168, entitled "EARLY DETECTION PROCEDURE OF LEGACY FRAME AND DECISION TIMING FOR SR," filed Aug. 31, 2016; U.S. Provisional Application No. 62/400,563, entitled "EARLY DETECTION PROCEDURE OF LEGACY FRAME AND DECISION TIMING FOR SR," filed Sep. 27, 2016; and U.S. Provisional Application No. 62/405,530, entitled "EARLY DETECTION PROCEDURE OF LEGACY FRAME AND DECISION TIMING FOR SR," filed Oct. 7, 2016, all of which are incorporated herein by reference in their entirety.

TECHNICAL FIELD

The present description relates in general to wireless communication systems and methods, and more particularly to, for example, without limitation, early detection procedures of high-efficiency frame and decision timing for spatial reuse.

BACKGROUND

Wireless local area network (WLAN) devices are deployed in diverse environments. These environments are generally characterized by the existence of access points and non-access point stations. Increased interference from neighboring devices gives rise to performance degradation. Additionally, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices.

The description provided in the background section should not be assumed to be prior art merely because it is mentioned in or associated with the background section. The background section may include information that describes one or more aspects of the subject technology.

BRIEF DESCRIPTION OF THE DRAWINGS

FIGS. 13A and 13B illustrate examples of detecting a frame over multiple decision times.

Figure 1:
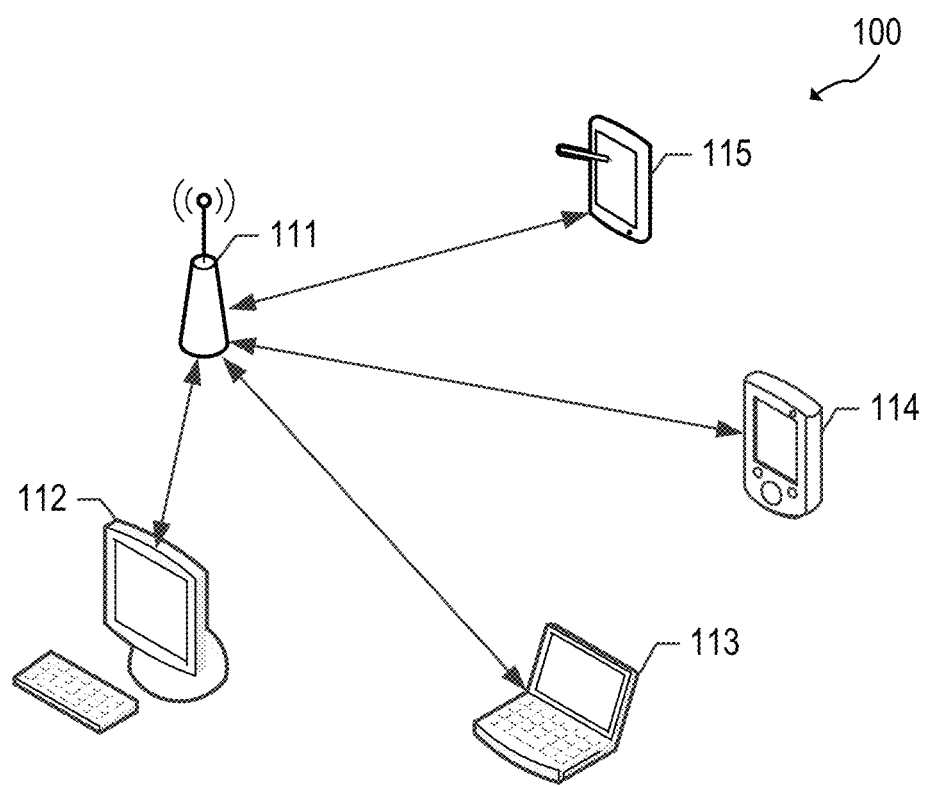
FIG. 1 illustrates a schematic diagram of an example of a wireless communication network.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Early detection procedures for a frame (e.g., a high-efficiency (HE) frame) provide new opportunities for next-generation WiFi technology, including 802.11ax technology, for spatial reuse (SR). In one or more implementations for achieving SR in next generation WLAN technologies, a basic service set (BSS) color field of a frame may be used to detect early on whether a received frame is an inter-frame (e.g., originates from an overlapping-BSS (OBSS) associated with a different wireless network as that of a station (STA) detecting the received frame) or an intra-frame (e.g., originates from a BSS associated with a same wireless network as that of the STA detecting the received frame). An early detection procedure can thus provide the ability to determine whether a frame (e.g., an HE frame or a legacy frame) is an inter-frame or intra-frame. In one or more implementations, legacy frames are taken into account because some devices in the market have design capabilities limited to earlier releases of IEEE 802.11 technologies.

Early frame detection for SR also may be achieved through receiver power measurements at different decision time points under a particular physical layer (PHY) procedure. Absent any early detection, the SR mechanism may not allow earlier access to a medium to transmit a PPDU, which is likely to give off some interference to an inter-frame from an OBSS.

New multi-user (MU) transmissions, such as downlink (DL) and uplink (UL) orthogonal frequency division multiple access (OFDMA) and UL MU multiple-input/multiple-output (MIMO), are provided for next-generation WiFi technology. For example, DL OFDMA is a technique that can be used in WiFi technology in order to enhance the aggregation of multiple payloads that are destined to multiple STAs within the same frame. Due to this and other advantages. OFDMA technique may be used for next generation WLAN technologies, including 802.11ax, which is also referred to as HE technology. MU transmission refers to cases that multiple resources are transmitted to or from multiple STAs simultaneously. Examples of the different resources may include different frequency resources in OFDMA transmission and different spatial streams in MU-MIMO transmission. Examples of MU transmissions may include DL-OFDMA, DL-MU-MIMO, UL-OFDMA, and UL-MU-MIMO.

IEEE 802.11ax can support DL MU transmissions and UL MU transmissions. In one or more implementations, UL MU physical layer convergence procedure protocol data units (PPDUs) (e.g., over MU-MIMO or OFDMA) are sent as a response to a trigger frame transmitted by an access point (AP). A trigger frame may have enough STA specific information and assigned resource units to identify the STAs intended (or configured) to transmit UL MU PPDUs. Efficient multiplexing acknowledgement-based transmissions in response to DL MU PPDU or UL MU PPDU may be used as part of the early detection procedure.

Moreover, IEEE 802.11ax can support features such as new clear channel assessment (CCA) levels and deferral rules to improve OBSS operation in dense environments, such that an STA can determine whether the detected frame is an inter-BSS or an intra-BSS frame. As mentioned above, the STA can detect a frame by using a BSS color field in a high-efficiency signal-A (HE-SIG-A) field or a medium access control (MAC) address in a MAC header of the frame. If the detected frame is an inter-BSS frame, under one or more specific conditions, the early detection procedure can utilize a predetermined OBSS packet detection (PD) level. In one or more implementations, if an OBSS PPDU is received and is determined to be less than the predetermined OBSS PD level, then the medium is determined to be available for use, provided that CCA indication indicates that the medium is IDLE.

In one or more implementations, when an STA receives a legacy PPDU, the STA may behave as follows:

The STA obtains a MAC address in the first MAC protocol data unit (MPDU) (e.g., MAC frame) and uses the MAC address for early frame detection before a cyclical redundancy check (CRC) is performed. The STA compares the MAC addresses to an address associated with a same BSS as that of the STA (which may be referred to as "myBSS"). If it is determined that the MAC address does not match the address associated with myBSS, the STA determines that the received frame originates from OBSS temporally (i.e., an inter-BSS frame). In one respect, the received frame is considered as a "valid frame" or a frame with a "valid MAC header" when the received frame is determined to be an OBSS frame (or inter-BSS frame).

In one or more implementations, if the received frame is determined to have a valid MAC header under a predetermined condition, and if the received power (e.g., received signal strength indicator (RSSI), received channel power indicator (RCPI), etc.) is less than a predetermined OBSS PD level, the STA can ignore updating a NAV timer. Thereafter, if the STA determines that the medium condition indicates an IDLE channel (or IDLE) based on channel sensing, the STA resumes a countdown process (e.g., a countdown process or a decrementing process with respect to an interframe space (IFS) time period, backoff, or a combination thereof) to have the STA ready for an SR transmission. In one or more implementations, if the received frame is determined not to have a valid MAC header (i.e., intra-BSS frame), then the STA concludes that the medium condition remains indicating a BUSY channel (or BUSY).

In one or more implementations, when the STA receives a frame (i.e., a non-legacy frame), the STA may behave as follows:

The STA may check the contents in an HE-SIG-A field of the received frame, and may obtain color information (e.g., color bits) from the HE-SIG-A field. The STA may compare the color information obtained to color information associated with the same BSS as that of the STA. When the color information of the received frame does not match the color information associated with myBSS, the STA may conclude that the received frame is an inter-BSS frame. Otherwise, the STA concludes that the received frame is an intra-BSS frame (i.e., the color information match).

In the case of the STA determining that the received frame is an inter-BSS frame, the STA measures the receive power (e.g., RSSI) in a legacy preamble of the received frame. The STA then compares the measured received power of the received frame to the predetermined OBSS PD level. If the measured received power is less than the predetermined OBSS PD level, the STA can ignore updating the NAV timer. Thereafter, the STA determines that the medium condition indicates an IDLE channel based on channel sensing, the STA resumes a countdown process (e.g., a countdown process or a decrementing process with respect to an interframe space (IFS) time period, backoff, or a combination thereof) to have the STA ready for an SR transmission.

In one or more implementations, there are two SR conditions to be considered before determining to initiate an SR transmission. In one or more implementations, a first condition refers to an OBSS PD based SR transmission, which corresponds to measuring a receive power of a frame received from an OBSS STA. In this implementation, the STA receives the frame and measures a receive power in a preamble (or header) of the received frame. The STA then compares the measured received power to a predetermined OBSS PD level. When the measured received power is less than the predetermined OBSS PD level, the STA determines that the medium condition indicates an IDLE channel.

In one or more implementations, a second condition refers to an opportunistic adaptive CCA (OA-CCA, which is sometimes referred to as CCA-OA) based SR transmission, which takes into account an interference level at an OBSS STA (e.g., a receiving OBSS STA) for determining whether an SR transmission, initiated from the STA, would adversely impact the OBSS STA. In this implementation, when the STA receives the frame, the STA considers an estimated interference level that is not expected to affect the OBSS STA in order to determine a proper transmit power at the STA for initiating the SR transmission. When the transmit power of the STA is determined to be less than the power level that does not impact the receiving OBSS STA, the STA determines that the medium condition indicates an IDLE channel for the duration of the received frame (i.e., up to the end of the frame).

FIG. 1 illustrates a schematic diagram of an example of a wireless communication network 100. In the wireless communication network 100, such as a wireless local area network (WLAN), a basic service set (BSS) includes a plurality of wireless communication devices (e.g., WLAN devices). In one aspect, a BSS refers to a set of STAs that can communicate in synchronization, rather than a concept indicating a particular area. In the example, the wireless communication network 100 includes wireless communication devices 111-115, which may be referred to as STAs.

Each of the wireless communication devices 111-115 may include a media access control (MAC) layer and a physical (PHY) layer according to an IEEE 802.11 standard. In the example, at least one wireless communication device (e.g., device 111) is an access point (AP). An AP may be referred to as an AP STA, an AP device, or a central station. The other wireless communication devices (e.g., devices 112-115) may be non-AP STAs. Alternatively, all of the wireless communication devices 111-115 may be non-AP STAs in an Ad-hoc networking environment.

An AP STA and a non-AP STA may be collectively called STAs. However, for simplicity of description, in some aspects, only a non-AP STA may be referred to as an STA. An AP may be, for example, a centralized controller, a base station (BS), a node-B, a base transceiver system (BTS), a site controller, a network adapter, a network interface card (NIC), a router, or the like. A non-AP STA (e.g., a client device operable by a user) may be, for example, a device with wireless communication capability, a terminal, a wireless transmit/receive unit (WTRU), a user equipment (UE), a mobile station (MS), a mobile terminal, a mobile subscriber unit, a laptop, a non-mobile computing device (e.g., a desktop computer with wireless communication capability) or the like. In one or more aspects, a non-AP STA may act as an AP (e.g., a wireless hotspot).

In one aspect, an AP is a functional entity for providing access to a distribution system, by way of a wireless medium, for an associated STA. For example, an AP may provide access to the internet for one or more STAs that are wirelessly and communicatively connected to the AP. In FIG. 1, wireless communications between non-AP STAs are made by way of an AP. However, when a direct link is established between non-AP STAs, the STAs can communicate directly with each other (without using an AP).

In one or more implementations, OFDMA-based 802.11 technologies are utilized, and for the sake of brevity, an STA refers to a non-AP high efficiency (HE) STA, and an AP refers to an HE AP. In one or more aspects, an STA may act as an AP.

Figure 2:
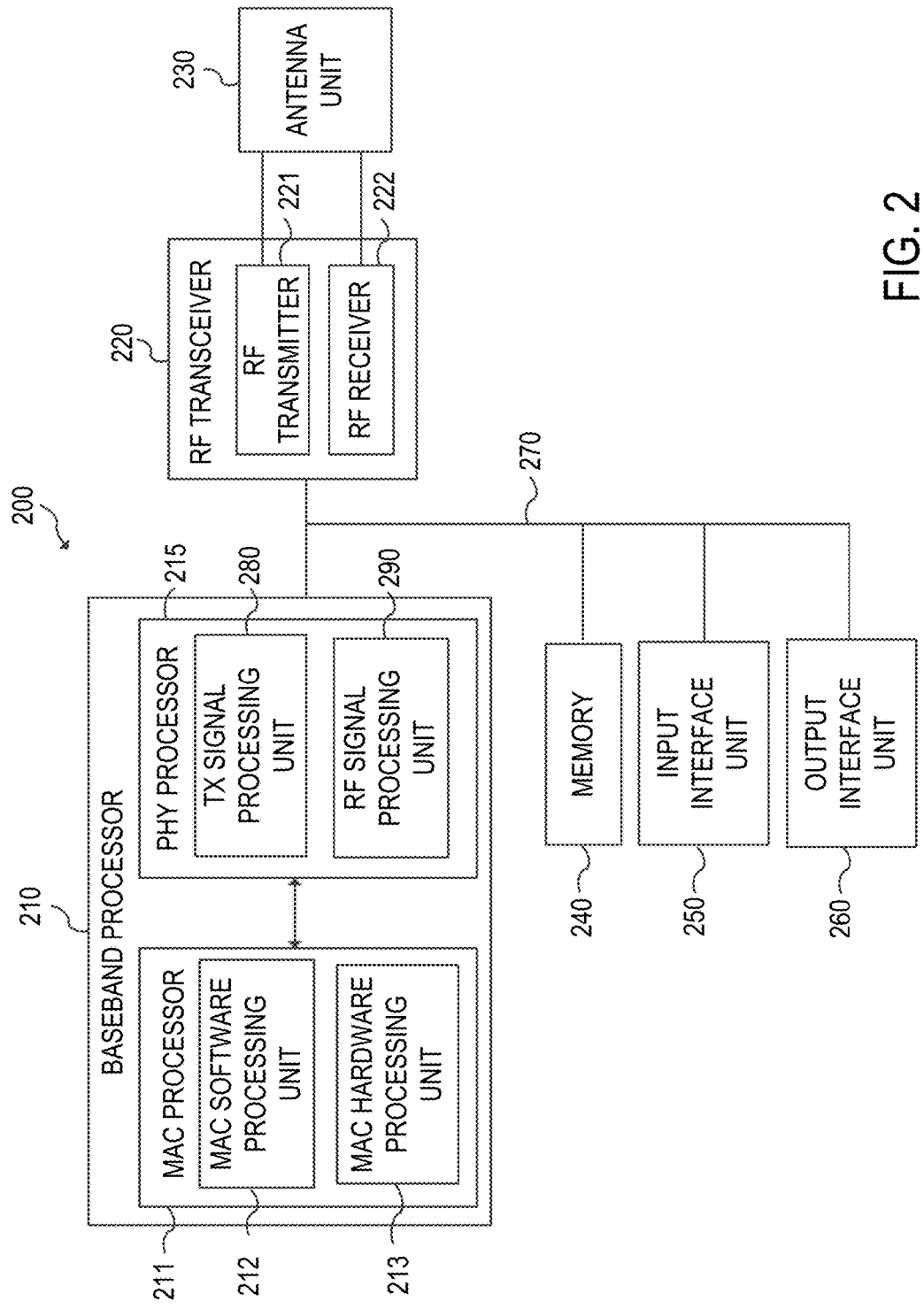
FIG. 2 illustrates a schematic diagram of an example of a wireless communication device.

FIG. 2 illustrates a schematic diagram of an example of a wireless communication device. The wireless communication device 200 includes a baseband processor 210, a radio frequency (RF) transceiver 220, an antenna unit 230, a memory 240, an input interface unit 250, an output interface unit 260, and a bus 270, or subsets and variations thereof. The wireless communication device 200 can be, or can be a part of, any of the wireless communication devices 111-115.

In the example, the baseband processor 210 performs baseband signal processing, and includes a medium access control (MAC) processor 211 and a PHY processor 215. The memory 240 may store software (such as MAC software) including at least some functions of the MAC layer. The memory may further store an operating system and applications.

In the illustration, the MAC processor 211 includes a MAC software processing unit 212 and a MAC hardware processing unit 213. The MAC software processing unit 212 executes the MAC software to implement some functions of the MAC layer, and the MAC hardware processing unit 213 may implement remaining functions of the MAC layer as hardware (MAC hardware). However, the MAC processor 211 may vary in functionality depending on implementation. The PHY processor 215 includes a transmitting (TX) signal processing unit 280 and a receiving (RX) signal processing unit 290. The term TX may refer to transmitting, transmit, transmitted, transmitter or the like. The term RX may refer to receiving, receive, received, receiver or the like.

The PHY processor 215 interfaces to the MAC processor 211 through, among others, transmit vector (TXVECTOR) and receive vector (RXVECTOR) parameters. In one or more aspects, the MAC processor 211 generates and provides TXVECTOR parameters to the PHY processor 215 to supply per-packet transmit parameters. In one or more aspects, the PHY processor 215 generates and provides RXVECTOR parameters to the MAC processor 211 to inform the MAC processor 211 of the received packet parameters.

In some aspects, the wireless communication device 200 includes a read-only memory (ROM) (not shown) or registers (not shown) that store instructions that are needed by one or more of the MAC processor 211, the PHY processor 215 and/or other components of the wireless communication device 200.

In one or more implementations, the wireless communication device 200 includes a permanent storage device (not shown) configured as a read-and-write memory device. The permanent storage device may be a non-volatile memory unit that stores instructions even when the wireless communication device 200 is off. The ROM, registers and the permanent storage device may be part of the baseband processor 210 or be a part of the memory 240. Each of the ROM, the permanent storage device, and the memory 240 may be an example of a memory or a computer-readable medium. A memory may be one or more memories.

The memory 240 may be a read-and-write memory, a read-only memory, a volatile memory, a non-volatile memory, or a combination of some or all of the foregoing. The memory 240 may store instructions that one or more of the MAC processor 211, the PHY processor 215, and/or another component may need at runtime.

The radio frequency (RF) transceiver 220 includes an RF transmitter 221 and an RF receiver 222. The input interface unit 250 receives information from a user, and the output interface unit 260 outputs information to the user. The antenna unit 230 includes one or more antennas. When multi-input multi-output (MIMO) or multi-user MIMO (MU-MIMO) is used, the antenna unit 230 may include more than one antenna.

The bus 270 collectively represents all system, peripheral, and chipset buses that communicatively connect the numerous internal components of the wireless communication device 200. In one or more implementations, the bus 270 communicatively connects the baseband processor 210 with the memory 240. From the memory 240, the baseband processor 210 may retrieve instructions to execute and data to process in order to execute the processes of the subject disclosure. The baseband processor 210 can be a single processor, multiple processors, or a multi-core processor in different implementations. The baseband processor 210, the memory 240, the input interface unit 250, and the output interface unit 260 may communicate with each other via the bus 270.

The bus 270 also connects to the input interface unit 250 and the output interface unit 260. The input interface unit 250 enables a user to communicate information and select commands to the wireless communication device 200. Input devices that may be used with the input interface unit 250 may include any acoustic, speech, visual, touch, tactile and/or sensory input device, e.g., a keyboard, a pointing device, a microphone, or a touchscreen. The output interface unit 260 may enable, for example, the display or output of videos, images, audio, and data generated by the wireless communication device 200. Output devices that may be used with the output interface unit 260 may include any visual, auditory, tactile, and/or sensory output device, e.g., printers and display devices or any other device for outputting information. One or more implementations may include devices that function as both input and output devices, such as a touchscreen.

One or more implementations can be realized in part or in whole using a computer-readable medium. In one aspect, a computer-readable medium includes one or more media. In one or more aspects, a computer-readable medium is a tangible computer-readable medium, a computer-readable storage medium, a non-transitory computer-readable medium, a machine-readable medium, a memory, or some combination of the foregoing (e.g., a tangible computer-readable storage medium, or a non-transitory machine-readable storage medium). In one aspect, a computer is a machine. In one aspect, a computer-implemented method is a machine-implemented method.

A computer-readable medium may include storage integrated into a processor and/or storage external to a processor. A computer-readable medium may be a volatile, non-volatile, solid state, optical, magnetic, and/or other suitable storage device, e.g., RAM, ROM, PROM, EPROM, a flash, registers, a hard disk, a removable memory, or a remote storage device.

In one aspect, a computer-readable medium comprises instructions stored therein. In one aspect, a computer-readable medium is encoded with instructions. In one aspect, instructions are executable by one or more processors (e.g., 210, 211, 212, 213, 215, 280, 290) to perform one or more operations or a method. Instructions may include, for example, programs, routines, subroutines, data, data structures, objects, sequences, commands, operations, modules, applications, and/or functions. Those skilled in the art would recognize how to implement the instructions.

A processor (e.g., 210, 211, 212, 213, 215, 280, 290) may be coupled to one or more memories (e.g., one or more external memories such as the memory 240, one or more memories internal to the processor, one or more registers internal or external to the processor, or one or more remote memories outside of the device 200), for example, via one or more wired and/or wireless connections. The coupling may be direct or indirect. In one aspect, a processor includes one or more processors. A processor, including a processing circuitry capable of executing instructions, may read, write, or access a computer-readable medium. A processor may be, for example, an application specific integrated circuit (ASIC), a digital signal processor (DSP), or a field programmable gate array (FPGA).

In one aspect, a processor (e.g., 210, 211, 212, 213, 215, 280, 290) is configured to cause one or more operations of the subject disclosure to occur. In one aspect, a processor is configured to cause an apparatus (e.g., a wireless communication device 200) to perform operations or a method of the subject disclosure. In one or more implementations, a processor configuration involves having a processor coupled to one or more memories. A memory may be internal or external to the processor. Instructions may be in a form of software, hardware or a combination thereof. Software instructions (including data) may be stored in a memory. Hardware instructions may be part of the hardware circuitry components of a processor. When the instructions are executed or processed by one or more processors, (e.g., 210, 211, 212, 213, 215, 280, 290), the one or more processors cause one or more operations of the subject disclosure to occur or cause an apparatus (e.g., a wireless communication device 200) to perform operations or a method of the subject disclosure.

Figure 3A:
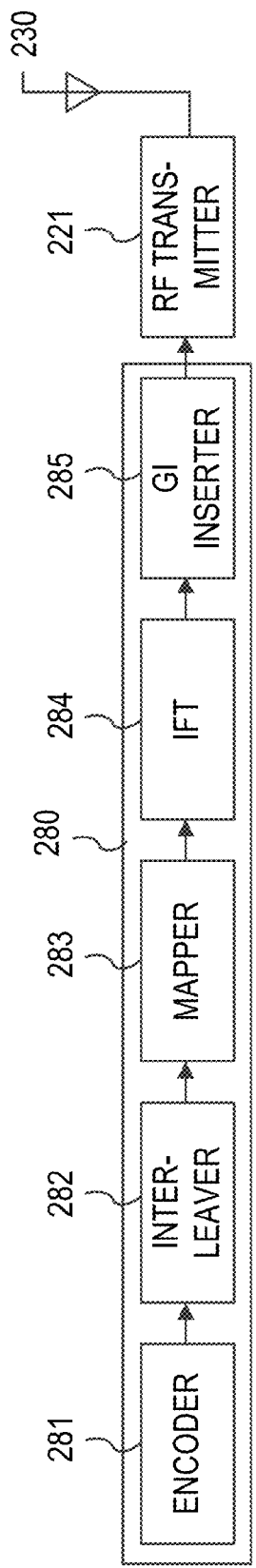
FIG. 3A illustrates a schematic block diagram of an example of a transmitting signal processor in a wireless communication device.

FIG. 3A illustrates a schematic block diagram of an example of a transmitting signal processing unit 280 in a wireless communication device. The transmitting signal processing unit 280 of the PHY processor 215 includes an encoder 281, an interleaver 282, a mapper 283, an inverse Fourier transformer (IFT) 284, and a guard interval (GI) inserter 285.

The encoder 281 encodes input data. For example, the encoder 281 may be a forward error correction (FEC) encoder. The FEC encoder may include a binary convolutional code (BCC) encoder followed by a puncturing device, or may include a low-density parity-check (LDPC) encoder. The interleaver 282 interleaves the bits of each stream output from the encoder 281 to change the order of bits. In one aspect, interleaving may be applied only when BCC encoding is employed. The mapper 283 maps the sequence of bits output from the interleaver 282 into constellation points.

When MIMO or MU-MIMO is employed, the transmitting signal processing unit 280 may use multiple instances of the interleaver 282 and multiple instances of the mapper 283 corresponding to the number of spatial streams ($N_{SS}$). In the example, the transmitting signal processing unit 280 may further include a stream parser for dividing outputs of the BCC encoders or the LDPC encoder into blocks that are sent to different interleavers 282 or mappers 283. The transmitting signal processing unit 280 may further include a space-time block code (STBC) encoder for spreading the constellation points from the number of spatial streams into a number of space-time streams ($N_{STS}$) and a spatial mapper for mapping the space-time streams to transmit chains. The spatial mapper may use direct mapping, spatial expansion, or beamforming depending on implementation. When MU-MIMO is employed, one or more of the blocks before reaching the spatial mapper may be provided for each user.

The IFT 284 converts a block of the constellation points output from the mapper 283 or the spatial mapper into a time domain block (e.g., a symbol) by using an inverse discrete Fourier transform (IDFT) or an inverse fast Fourier transform (IFFT). If the STBC encoder and the spatial mapper are employed, the IFT 284 may be provided for each transmit chain.

When MIMO or MU-MIMO is employed, the transmitting signal processing unit 280 may insert cyclic shift diversities (CSDs) to prevent unintentional beamforming. The CSD insertion may occur before or after the inverse Fourier transform operation. The CSD may be specified per transmit chain or may be specified per space-time stream. Alternatively, the CSD may be applied as a part of the spatial mapper.

The GI inserter 285 prepends a GI to the symbol. The transmitting signal processing unit 280 may optionally perform windowing to smooth edges of each symbol after inserting the GI. The RF transmitter 221 converts the symbols into an RF signal and transmits the RF signal via the antenna unit 230. When MIMO or MU-MIMO is employed, the GI inserter 285 and the RF transmitter 221 may be provided for each transmit chain.

Figure 3B:
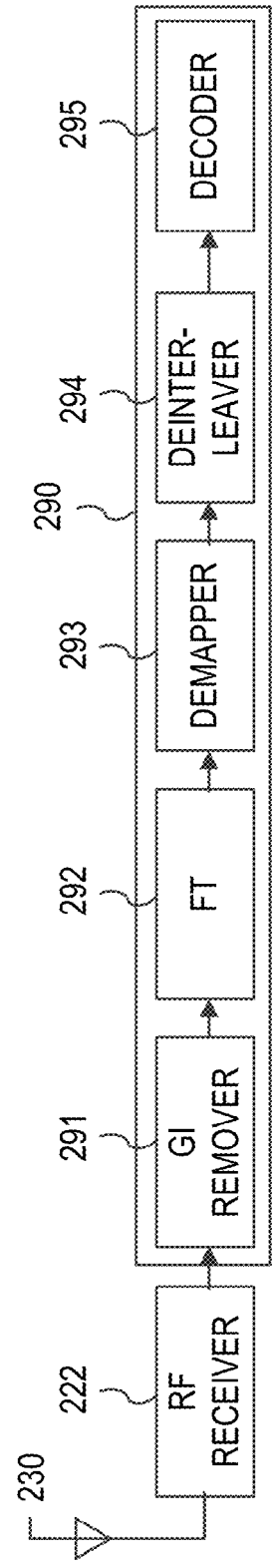
FIG. 3B illustrates a schematic block diagram of an example of a receiving signal processor in a wireless communication device.

FIG. 3B illustrates a schematic block diagram of an example of a receiving signal processing unit 290 in a wireless communication device. The receiving signal processing unit 290 of the PHY processor 215 includes a GI remover 291, a Fourier transformer (FT) 292, a demapper 293, a deinterleaver 294, and a decoder 295.

The RF receiver 222 receives an RF signal via the antenna unit 230 and converts the RF signal into one or more symbols. In some aspects, the GI remover 291 removes the GI from the symbol. When MIMO or MU-MIMO is employed, the RF receiver 222 and the GI remover 291 may be provided for each receive chain.

The FT 292 converts the symbol (e.g., the time domain block) into a block of the constellation points by using a discrete Fourier transform (DFT) or a fast Fourier transform (FFT) depending on implementation. In one or more implementations, the FT 292 is provided for each receive chain.

When MIMO or MU-MIMO is employed, the receiving signal processing unit 290 may further include a spatial demapper for converting the Fourier transformed receiver chains to constellation points of the space-time streams, and an STBC decoder (not shown) for despreading the constellation points from the space-time streams into the spatial streams.

The demapper 293 demaps the constellation points output from the FT 292 or the STBC decoder to the bit streams. If the LDPC encoding is used, the demapper 293 may further perform LDPC tone demapping before the constellation demapping. The deinterleaver 294 deinterleaves the bits of each stream output from the demapper 293. In one or more implementations, deinterleaving may be applied only when BCC decoding is used.

When MIMO or MU-MIMO is employed, the receiving signal processing unit 290 may use multiple instances on the demapper 293 and multiple instances of the deinterleaver 294 corresponding to the number of spatial streams. In the example, the receiving signal processing unit 290 may further include a stream deparser for combining the streams output from the deinterleavers 294.

The decoder 295 decodes the streams output from the deinterleaver 294 and/or the stream deparser. For example, the decoder 295 may be an FEC decoder. The FEC decoder may include a BCC decoder or an LDPC decoder.

Figure 4:
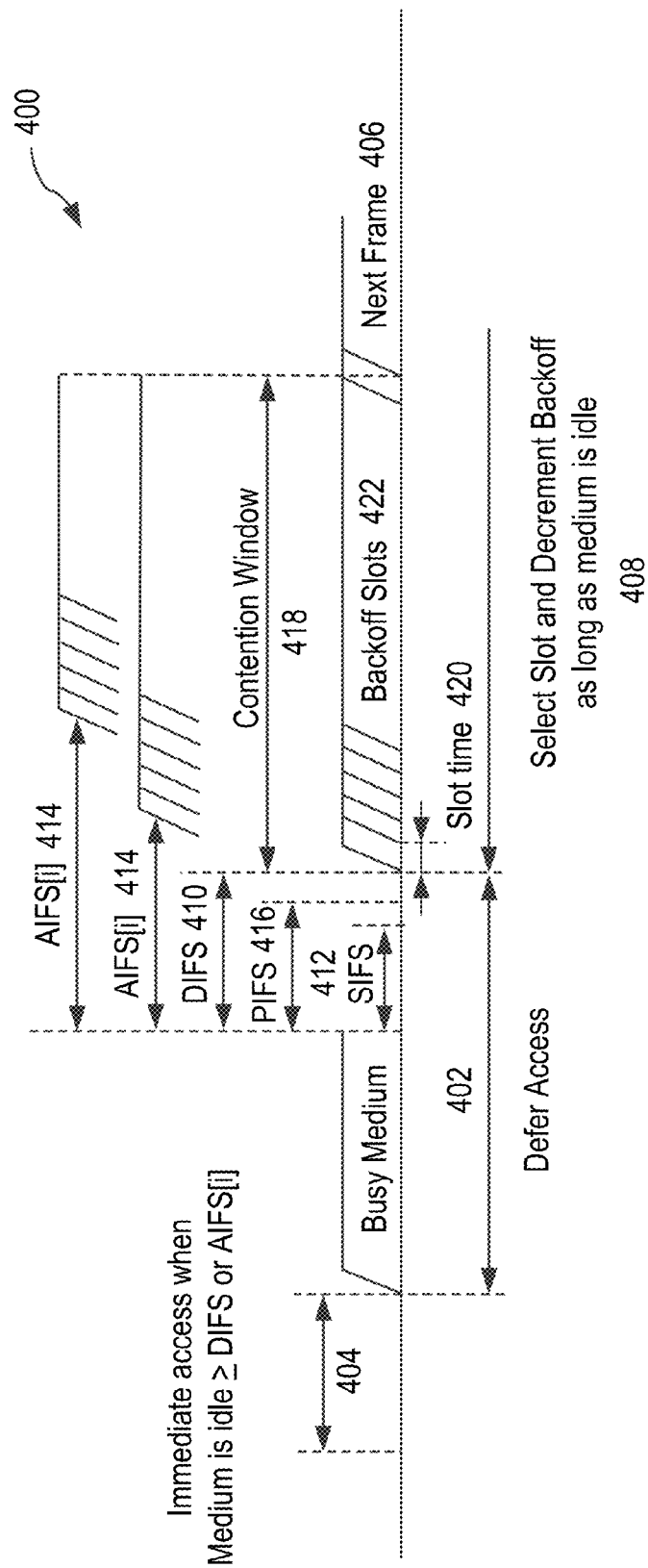
FIG. 4 illustrates an example of a timing diagram of interframe space (IFS) relationships.

FIG. 4 illustrates an example of a timing diagram of interframe space (IFS) relationships. In this example, a data frame, a control frame, or a management frame can be exchanged between the wireless communication devices 111-115 and/or other WLAN devices.

Referring to the timing diagram 400, during the time interval 402, access is deferred while the medium (e.g., a wireless communication channel) is busy until a type of IFS duration has elapsed. At time interval 404, immediate access is granted when the medium is idle for a duration that is equal to or greater than a distributed coordination function IFS (DIFS) 410 duration or arbitration IFS (AIFS) 414 duration. In turn, a next frame 406 may be transmitted after a type of IFS duration and a contention window 418 have passed. During the time 408, if a DIFS has elapsed since the medium has been idle, a designated slot time 420 is selected and one or more backoff slots 422 are decremented as long as the medium is idle.

The data frame is used for transmission of data forwarded to a higher layer. In one or more implementations, a WLAN device transmits the data frame after performing backoff if DIFS 410 has elapsed from a time when the medium has been idle.

The management frame is used for exchanging management information that is not forwarded to the higher layer. Subtype frames of the management frame include a beacon frame, an association request/response frame, a probe request/response frame, and an authentication request/response frame.

The control frame is used for controlling access to the medium. Subtype frames of the control frame include a request to send (RTS) frame, a clear to send (CTS) frame, and an acknowledgement (ACK) frame. In the case that the control frame is not a response frame of the other frame (e.g., a previous frame), the WLAN device transmits the control frame after performing backoff if the DIFS 410 has elapsed. In the case that the control frame is the response frame of the other frame, the WLAN device transmits the control frame without performing backoff if a short IFS (SIFS) 412 has elapsed. For example, the SIFS may be 16 microseconds. The type and subtype of frame may be identified by a type field and a subtype field in a frame control field of the frame.

On the other hand, a Quality of Service (QoS) STA may transmit the frame after performing backoff if AIFS 414 for access category (AC), e.g., AIFS[AC], has elapsed. In this case, the data frame, the management frame, or the control frame that is not the response frame may use the AIFS[AC].

In one or more implementations, a point coordination function (PCF) enabled AP STA transmits the frame after performing backoff if a PCF IFS (PIFS) 416 has elapsed. In this example, the PIFS 416 duration is less than the DIFS 410 but greater than the SIFS 412. In some aspects, the PIFS 416 is determined by incrementing the SIFS 412 duration by a designated slot time 420.

Figure 5:
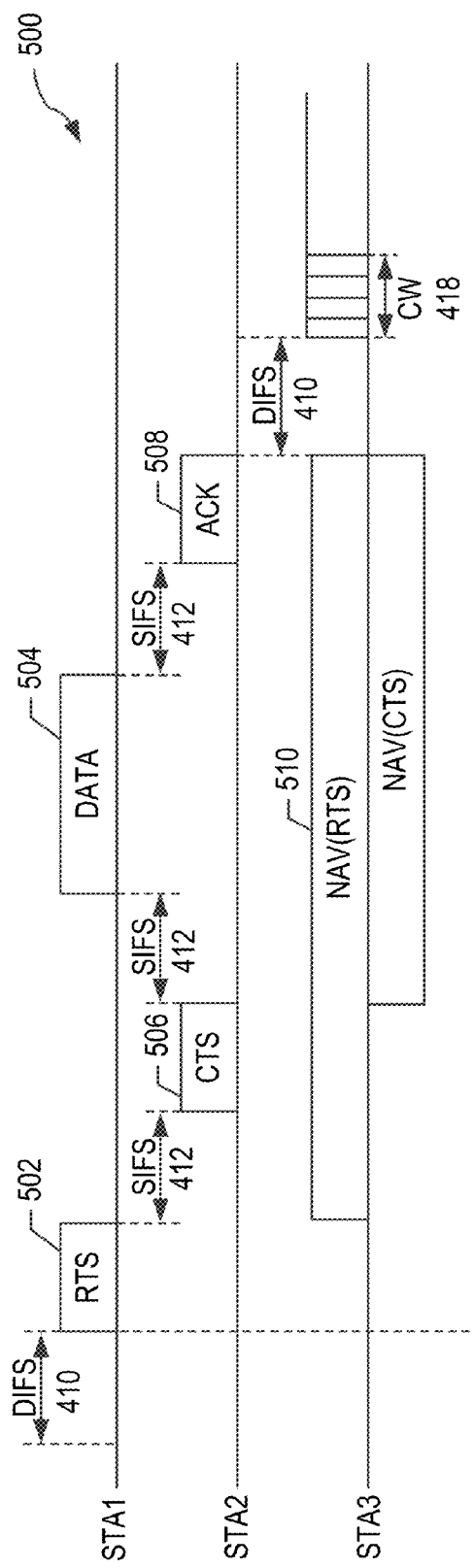
FIG. 5 illustrates an example of a timing diagram of a carrier sense multiple access/collision avoidance (CSMA/CA) based frame transmission procedure for avoiding collision between frames in a channel.

FIG. 5 illustrates an example of a timing diagram of a carrier sense multiple access/collision avoidance (CSMA/CA) based frame transmission procedure for avoiding collision between frames in a channel. In FIG. 5, any one of the wireless communication devices 111-115 in FIG. 1 can be designated as one of STA1, STA2 or STA3. In this example, the wireless communication device 111 is designated as STA1, the wireless communication device 112 is designated as STA2, and the wireless communication device 113 is designated as STA3. While the timing of the wireless communication devices 114 and 115 is not shown in FIG. 5, the timing of the devices 114 and 115 may be the same as that of STA2.

In this example, STA is a transmit WLAN device for transmitting data, STA2 is a receive WLAN device for receiving the data, and STA3 is a WLAN device that may be located at an area where a frame transmitted from STA1 and/or a frame transmitted from STA2 can be received by STA3.

STA1 may determine whether the channel (or medium) is busy by carrier sensing. STA1 may determine the channel occupation based on an energy level on the channel or correlation of signals in the channel. In one or more implementations, STA1 determines the channel occupation by using a network allocation vector (NAV) timer.

When determining that the channel is not used by other devices during the DIFS 410 (e.g., the channel is idle), STA1 may transmit an RTS frame 502 to STA2 after performing backoff. Upon receiving the RTS frame 502, STA2 may transmit a CTS frame 506 as a response of the CTS frame 506 after the SIFS 412.

When STA3 receives the RTS frame 502, STA3 may set a NAV timer for a transmission duration representing the propagation delay of subsequently transmitted frames by using duration information involved with the transmission of the RTS frame 502 (e.g., NAV(RTS) 510). For example, STA3 may set the transmission duration expressed as the summation of a first instance of the SIFS 412, the CTS frame 506 duration, a second instance of the SIFS 412, a data frame 504 duration, a third instance of the SIFS 412 and an ACK frame 508 duration.

Upon receiving a new frame (not shown) before the NAV timer expires, STA3 may update the NAV timer by using duration information included in the new frame. STA3 does not attempt to access the channel until the NAV timer expires.

When STA1 receives the CTS frame 506 from STA2, STA1 may transmit the data frame 504 to STA2 after the SIFS 412 elapses from a time when the CTS frame 506 has been completely received. Upon successfully receiving the data frame 504. STA2 may transmit the ACK frame 508 after the SIFS 412 elapses as an acknowledgment of receiving the data frame 504.

When the NAV timer expires. STA3 may determine whether the channel is busy by the carrier sensing. Upon determining that the channel is not used by the other WLAN devices (e.g., STA1, STA2) during the DIFS 410 after the NAV timer has expired, STA3 may attempt the channel access after a contention window 418 has elapsed. In this example, the contention window 418 may be based on a random backoff.

Figure 6:
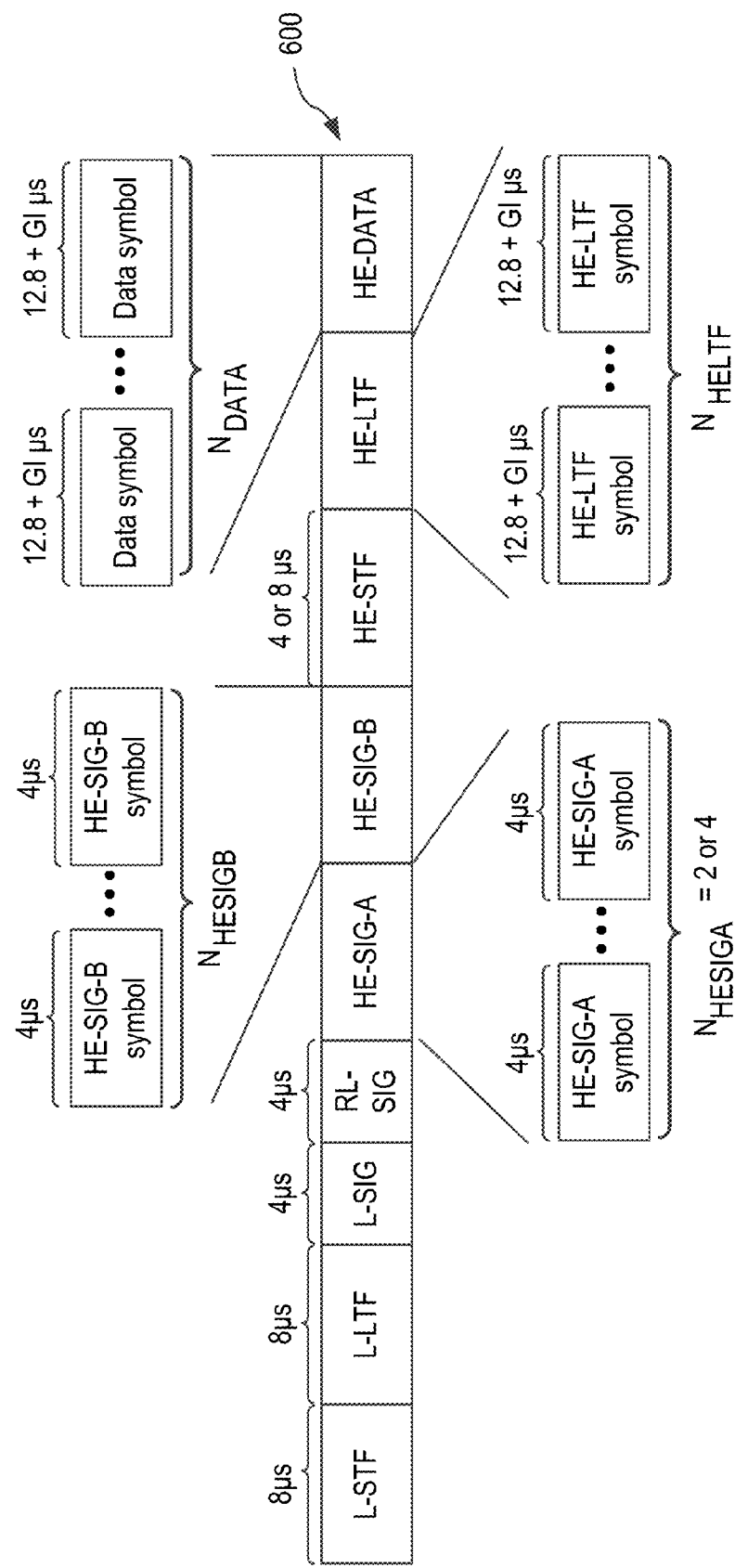
FIG. 6 illustrates an example of a high efficiency (HE) frame.

FIG. 6 illustrates an example of a high efficiency (HE) frame 600. The HE frame 600 is a physical layer convergence procedure (PLCP) protocol data unit (or PPDU) format. An HE frame may be referred to as an OFDMA frame, a PPDU, a PPDU format, an OFDMA PPDU, an MU PPDU, another similar term, or vice versa. An HE frame may be simply referred to as a frame for convenience. A transmitting station (e.g., AP, non-AP station) may generate the HE frame 600 and transmit the HE frame 600 to a receiving station. The receiving station may receive, detect, and process the HE frame 600. The HE frame 600 may include an L-STF field, an L-LTF field, an L-SIG field, an RL-SIG field, an HE-SIG-A field, an HE-SIG-B field, an HE-STF field, an HE-LTF field, and an HE-DATA field. The HE-SIG-A field may include $N_{HESIGA}$ symbols, the HE-SIG-B field may include $N_{HESIGB}$ symbols, the HE-LTF field may include $N_{HELTF}$ symbols, and the HE-DATA field may include $N_{DATA}$ symbols. In an aspect, the HE-DATA field may also be referred to as a payload field, data, data signal, data portion, payload. PLCP service data unit (PSDU). or MPDU.

In one or more implementations, an AP may transmit a frame for downlink (DL) using a frame format shown in this figure or a variation thereof (e.g., without any or some portions of an HE header). A STA may transmit a frame for uplink (UL) using a frame format shown in this figure or a variation thereof (e.g., without any or some portions of an HE header).

The table below provides examples of characteristics associated with the various components of the HE frame 600.

| Element | Definition | Duration | DFT period | GI | Subcarrier Spacing | Description |
|---|---|---|---|---|---|---|
| Legacy(L)-STF | Non-high throughput (HT) Short Training field | 8 μs | — | — | equivalent to 1,250 kHz | L-STF of a non-trigger-based PPDU has a periodicity of 0.8 μs with 10 periods. |
| L-LTF | Non-HT Long Training field | 8 μs | 3.2 μs | 1.6 μs | 312.5 kHz | |
| L-SIG | Non-HT SIGNAL field | 4 μs | 3.2 μs | 0.8 μs | 312.5 kHz | |
| RL-SIG | Repeated Non-HT SIGNAL field | 4 μs | 3.2 μs | 0.8 μs | 312.5 kHz | |
| HE-SIG-A | HE SIGNAL A field | $N_{HESIGA}$ * 4 μs | 3.2 μs | 0.8 μs | 312.5 kHz | HE-SIG-A is duplicated on each 20 MHz segment after the legacy preamble to indicate common control information. $N_{HESIGA}$ means the number of OFDM symbols of the HE-SIG-A field and is equal to 2 or 4. |
| HE-SIG-B | HE SIGNAL B field | $N_{HESIGB}$ * 4 μs | 3.2 μs | 0.8 μs | 312.5 kHz | $N_{HESIGB}$ means the number of OFDM symbols of the HE-SIG-B field and is variable. DL MU packet contains HE-SIG-B. |

-continued

| Element | Definition | Duration | DFT period | GI | Subcarrier Spacing | Description |
|---|---|---|---|---|---|---|
| HE-STF | HE Short Training field | 4 or 8 μs | — | — | non-trigger-based PPDU: (equivalent to) 1,250 kHz; trigger-based PPDU: (equivalent to) 625 kHz | Single user (SU) packets and UL Trigger based packets do not contain HE-SIG-B. HE-STF of a non-trigger-based PPDU has a periodicity of 0.8 μs with 5 periods. A non-trigger-based PPDU is not sent in response to a trigger frame. The HE-STF of a trigger-based PPDU has a periodicity of 1.6 μs with 5 periods. A trigger-based PPDU is a UL PPDU sent in response to a trigger frame. |
| HE-LTF | HE Long Training field | $N_{HELTF}$ * (DFT period + GI) μs | 2xLTF: 6.4 μs 4xLTF: 12.8 μs | supports 0.8, 1.6, 3.2 μs | 2xLTF: (equivalent to) 156.25 kHz; 4xLTF: 78.125 kHz | HE PPDU may support 2xLTF mode and 4xLTF mode. In the 2xLTF mode, HE-LTF symbol excluding GI is equivalent to modulating every other tone in an OFDM symbol of 12.8 μs excluding GI, and then removing the second half of the OFDM symbol in time domain. $N_{HELTF}$ means the number of HE-LTF symbols and is equal to 1, 2, 4, 6, 8. |
| HE-DATA | HE DATA field | $N_{DATA}$ * (DFT period + GI) μs | 12.8 μs | supports 0.8, 1.6, 3.2 μs | 78.125 kHz | $N_{DATA}$ means the number of HE data symbols. |

Referring to FIG. 6, the HE frame 600 contains a header and a data field. The header includes a legacy header comprised of the legacy short training field (L-STF), the legacy long training field (L-LTF), and the legacy signal (L-SIG) field. These legacy fields contain symbols based on an early design of an IEEE 802.11 specification. Presence of these symbols may facilitate compatibility of new designs with the legacy designs and products. The legacy header may be referred to as a legacy preamble. In one or more aspects, the term header may be referred to as a preamble.

In one or more implementations, the legacy STF, LTF, and SIG symbols are modulated/carried with FFT size of 64 on a 20 MHz sub-channel and are duplicated every 20 MHz if the frame has a channel bandwidth wider than 20 MHz (e.g., 40 MHz, 80 MHz, 160 MHz). Therefore, the legacy field (i.e., the STF, LTF, and SIG fields) occupies the entire channel bandwidth of the frame. The L-STF field may be utilized for packet detection, automatic gain control (AGC), and coarse frequency-offset (FO) correction. In one aspect, the L-STF field does not utilize frequency domain processing (e.g., FFT processing) but rather utilizes time domain processing. The L-LTF field may be utilized for channel estimation, fine frequency-offset correction, and symbol timing. In one or more aspects, the L-SIG field may contain information indicative of a data rate and a length (e.g., in bytes) associated with the HE frame 600, which may be utilized by a receiver of the HE frame 600 to calculate a time duration of a transmission of the HE frame 600.

The header may also include an HE header comprised of an HE-SIG-A field and an HE-SIG-B field. The HE header may be referred to as a non-legacy header. These fields contain symbols that carry control information associated with each PSDU and/or radio frequency (RF), PHY, and MAC properties of a PPDU. In one aspect, the HE-SIG-A field can be carried/modulated using an FFT size of 64 on a 20 MHz basis. The HE-SIG-B field can be carried/modulated using an FFT size of e.g., 64 or 256 on a 20 MHz basis depending on implementation. The HE-SIG-A and HE-SIG-B fields may occupy the entire channel bandwidth of the frame. In some aspects, the size of the HE-SIG-A field and/or the HE-SIG-B field is variable (e.g., can vary from frame to frame). In an aspect, the HE-SIG-B field is not always present in all frames. To facilitate decoding of the HE frame 600 by a receiver, the size of (e.g., number of symbols contained in) the HE-SIG-B field may be indicated in the HE-SIG-A field. In some aspects, the HE header also includes the repeated L-SIG (RL-SIG) field, whose content is the same as the L-SIG field. In an aspect, the HE-SIG-A and HE-SIG-B fields may be referred as control signal fields. In an aspect, the HE-SIG-A field may be referred to as an SIG-A field, SIG-A, or simply SIGA. Similarly, in an aspect, the HE-SIG-B field may be referred to as an SIG-B field, SIG-B, or simply SIGB.

The HE header may further include HE-STF and HE-LTF fields, which contain symbols used to perform necessary RF and PHY processing for each PSDU and/or for the whole PPDU. The HE-LTF symbols may be modulated/carried with an FFT size of 256 for 20 MHz bandwidth and modulated over the entire bandwidth of the frame. Thus, the HE-LTF field may occupy the entire channel bandwidth of the frame. In one aspect, the HE-LTF field may occupy less than the entire channel bandwidth. In one aspect, the HE-LTF field may be transmitted using a code-frequency resource. In one aspect, an HE-LTF sequence may be utilized by a receiver to estimate MIMO channel between the transmitter and the receiver. Channel estimation may be utilized to decode data transmitted and compensate for channel properties (e.g., effects, distortions). For example, when a preamble is transmitted through a wireless channel, various distortions may occur, and a training sequence in the HE-LTF field is useful to reverse the distortion. This may be referred to as equalization. To accomplish this, the amount of channel distortion is measured. This may be referred to as channel estimation. In one aspect, channel estimation is performed using an HE-LTF sequence, and the channel estimation may be applied to other fields that follow the HE-LTF sequence.

The HE-STF symbols may have a fixed pattern and a fixed duration. For example, the HE-STF symbols may have a predetermined repeating pattern. In one aspect, the HE-STF symbols do not require FFT processing. The HE frame 600 may include the data field, represented as HE-DATA, that contains data symbols. The data field may also be referred to as a payload field, data, payload or PSDU.

In one or more aspects, additional one or more HE-LTF fields may be included in the header. For example, an additional HE-LTF field may be located after a first HE-LTF field. In one or more implementations, a TX signal processing unit 280 (or an IFT 284) illustrated in FIG. 3A may carry out the modulation described in this paragraph as well as the modulations described in other paragraphs above. In one or more implementations, an RX signal processing unit 290 (or an FT 292) may perform demodulation for a receiver.

Figure 7:
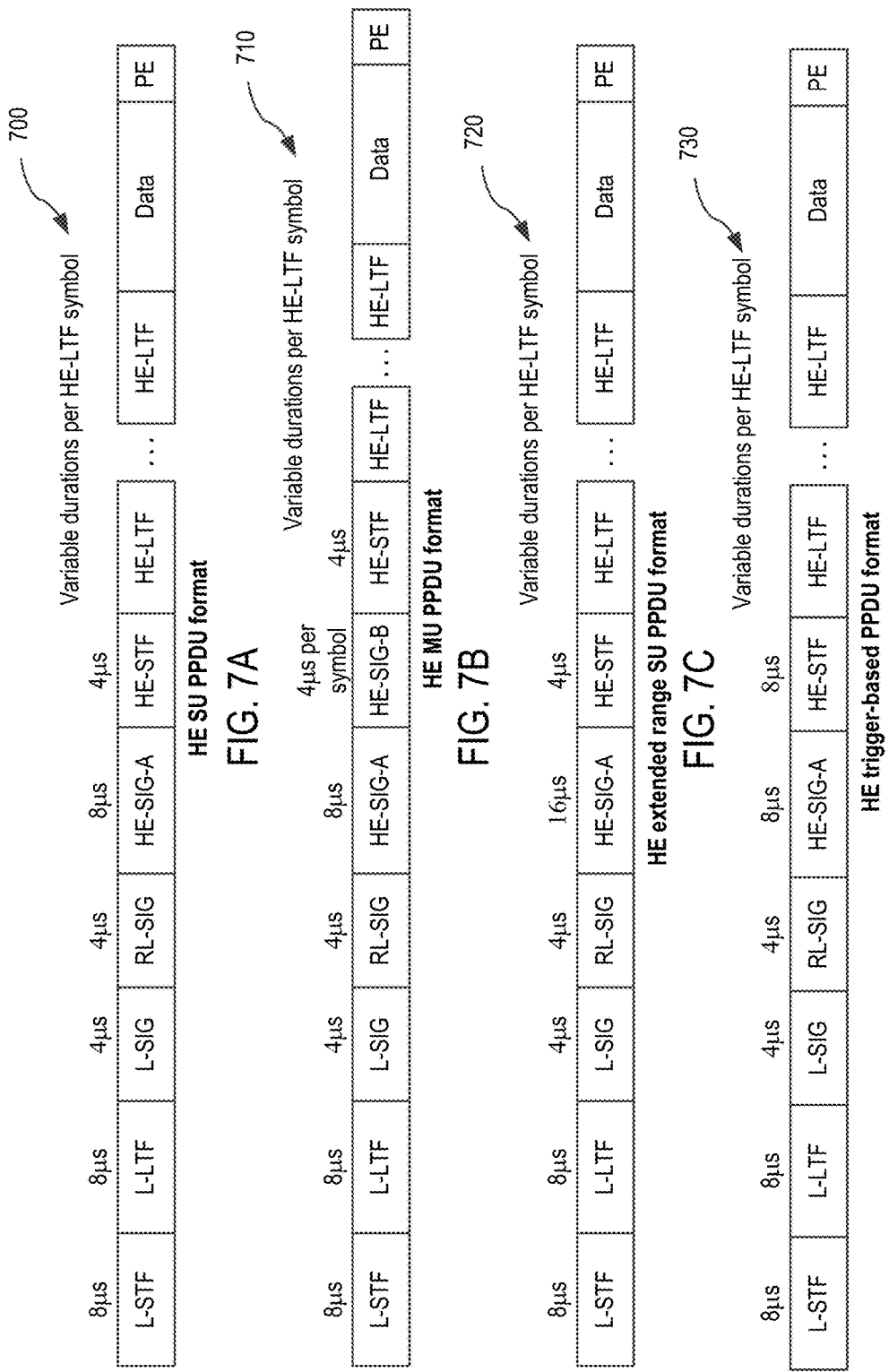
FIGS. 7A through 7D illustrate examples of physical layer convergence procedure (PLCP) protocol data unit (PPDU) formats.

FIGS. 7A through 7D illustrate examples of PPDU formats. In or more implementations, four HE PPDU formats are defined: HE SU PPDU (FIG. 7A), HE MU PPDU (FIG. 7B), HE extended range SU PPDU (FIG. 7C) and HE trigger-based PPDU (FIG. 7D). In FIG. 7A, the format of the HE SU PPDU is used for SU transmissions. The HE SU PPDU format does not replicate the HE-SIG-A field. In FIG. 7B, the format of the HE MU PPDU is used for MU transmissions (e.g., not in response to a trigger frame). The HE MU PPDU format includes an HE-SIG-B field. The size of (e.g., number of symbols contained in) the HE-SIG-B field may be indicated in the HE-SIG-A field. In FIG. 7C, the format of the HE extended range SU PPDU is used for SU transmissions. The HE extended range SU PPDU's HE-SIG-A field is replicated (e.g., HE-SIG-A1, HE-SIG-A1', HE-SIG-A2, and HE-SIG-A2'). In FIG. 7D, the format of the HE trigger-based PPDU is used for MU transmissions that are in response to a trigger frame. In this example, the HE trigger-based PPDU format does not replicate the HE-SIG-A field.

Figure 8:
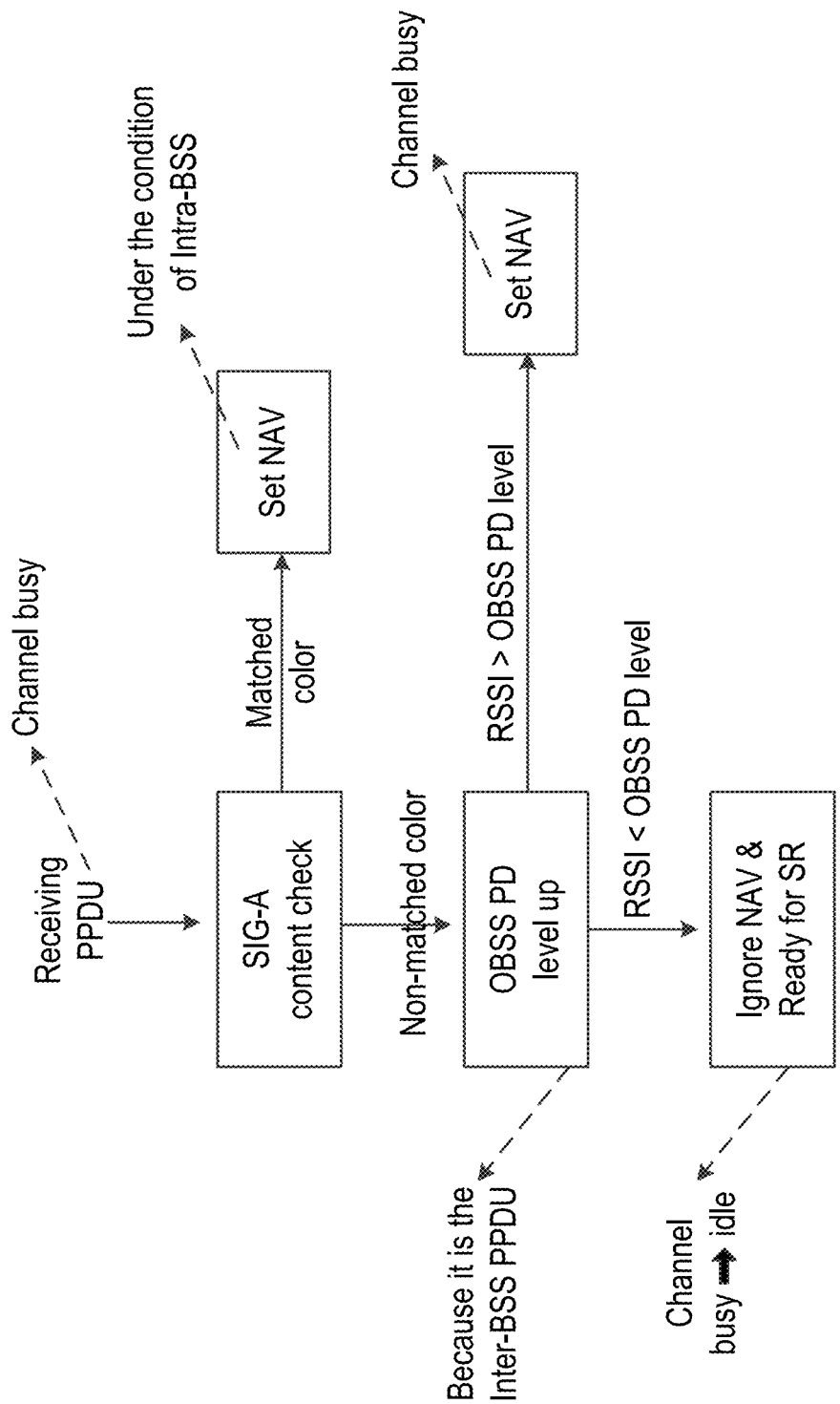
FIG. 8 illustrates an example process of detecting a frame and determining whether spatial reuse is allowed.

FIG. 8 illustrates an example process of detecting a frame and determining whether spatial reuse is allowed. When an STA receives a frame (e.g., PPDU, HE frame) from a second STA, the medium condition indicates a BUSY channel, and this BUSY channel indication continues during the period of time that is taken by the STA to validate that the frame is an inter-BSS frame (i.e., the frame originates from an inter-BSS). During the same time period, the STA may suspend a countdown process (e.g., a countdown or decrementing process with respect to an interframe space (IFS) time period, backoff, or a combination thereof, to have the STA ready for an SR transmission).

During the same time period, the STA decodes the frame and checks the contents of the HE-SIG-A field of the frame. The contents of the HE-SIG-A field include a color field, which contains color information (e.g., color bits). The STA compares the obtained color information to the color information associated with myBSS (i.e., BSS with which the STA is associated or to which the STA belongs). When the color information in the HE-SIG-A field matches with the color information associated with myBSS (i.e., the frame originates from the same BSS as that of the STA), the STA sets its local NAV timer. When the color information in the HE-SIG-A field does not match the color information associated with myBSS (i.e., the frame originates from a different BSS as that of the STA), the STA identifies the frame as an inter-BSS frame. The STA may increase an OBSS PD level to a predetermined level when the color information is not matched.

The STA may obtain a received power associated with the received frame. A received power may be represented as an RSSI value. The STA may then compare the received power to the OBSS PD level. When the STA determines that the received power is less than the OBSS PD level, the STA ignores updating a NAV timer. Following the comparison, if the medium condition indicates an IDLE channel (e.g., medium condition transitions from a BUSY channel to an IDLE channel) based on channel sensing, the STA resumes the countdown process to have the STA ready to initiate an SR transmission. On the other hand, when the STA determines that the received power is greater than or equal to the OBSS PD level, the STA sets the NAV timer.

Figure 9:
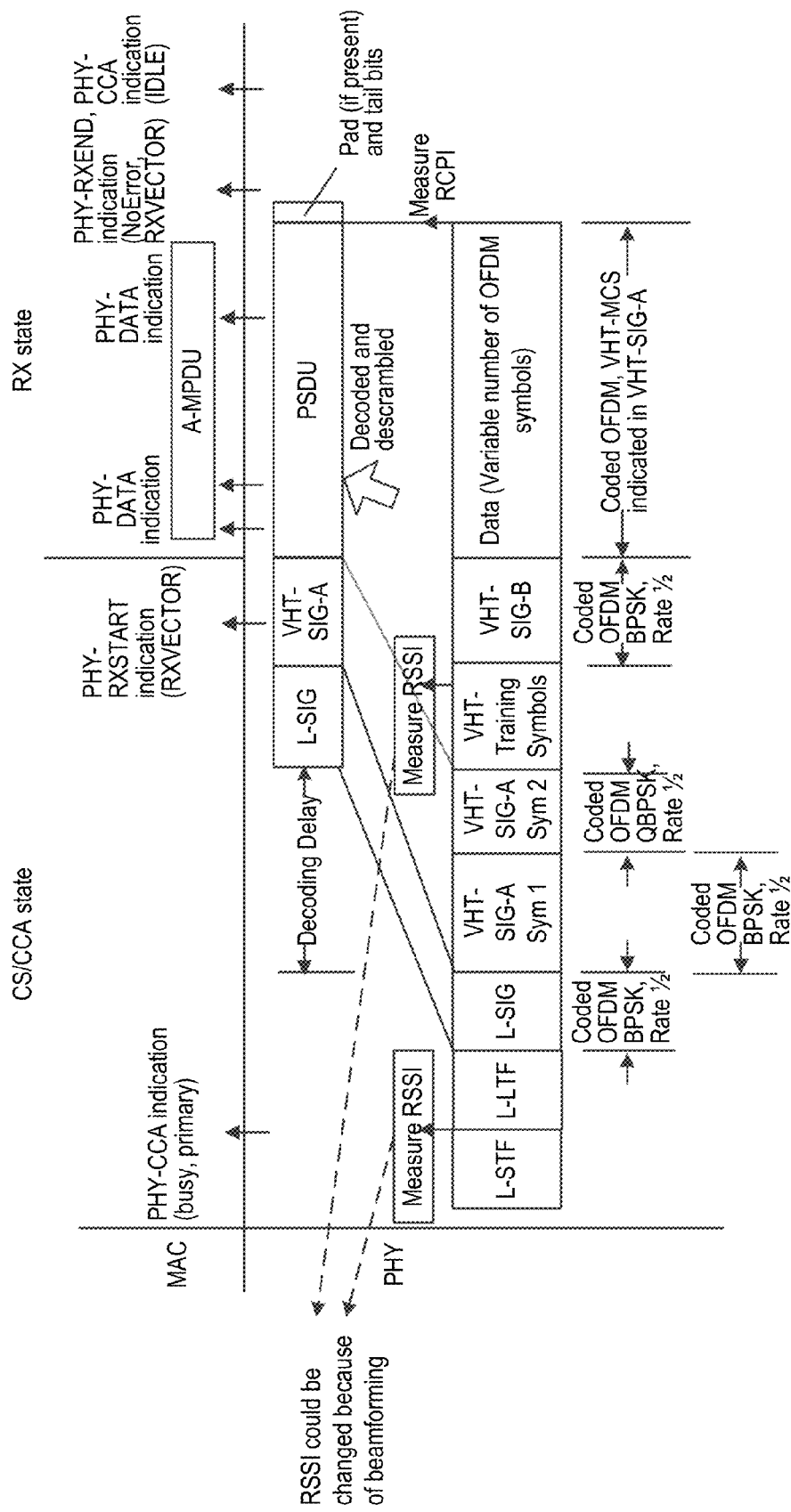
FIG. 9 illustrates an example of detecting a frame over multiple decision times.

FIG. 9 illustrates an example of detecting a frame over multiple decision times. FIG. 9 describes the timing to measure the received power in order to compare the measured received power to the OBSS PD level for determining whether an SR transmission may be initiated. As explained in FIG. 8, the measured received power is a critical component and it can be measured several times through a PHY receive procedure as illustrated in FIG. 9. In the legacy preamble (e.g., L-STF, L-LTF), the received power (e.g., RSSI) can be measured during the reception of the legacy PHY preamble. In one or more implementations, the PHY includes the most recently measured RSSI value in the PHY-RXSTART indication (RXVECTOR) primitive issued to the MAC. For an 802.11ac preamble, the received power can be measured during the reception of the very-high-throughput (VHT)-LTF field. In one or more implementations, the measured received power (e.g., RSSI) changes when beamforming is applied. In one or more implementations, another frame signal measurement (e.g., RCPI) can be measured over the entire received frame or other equivalent means that meets the specified accuracy.

Figure 10:
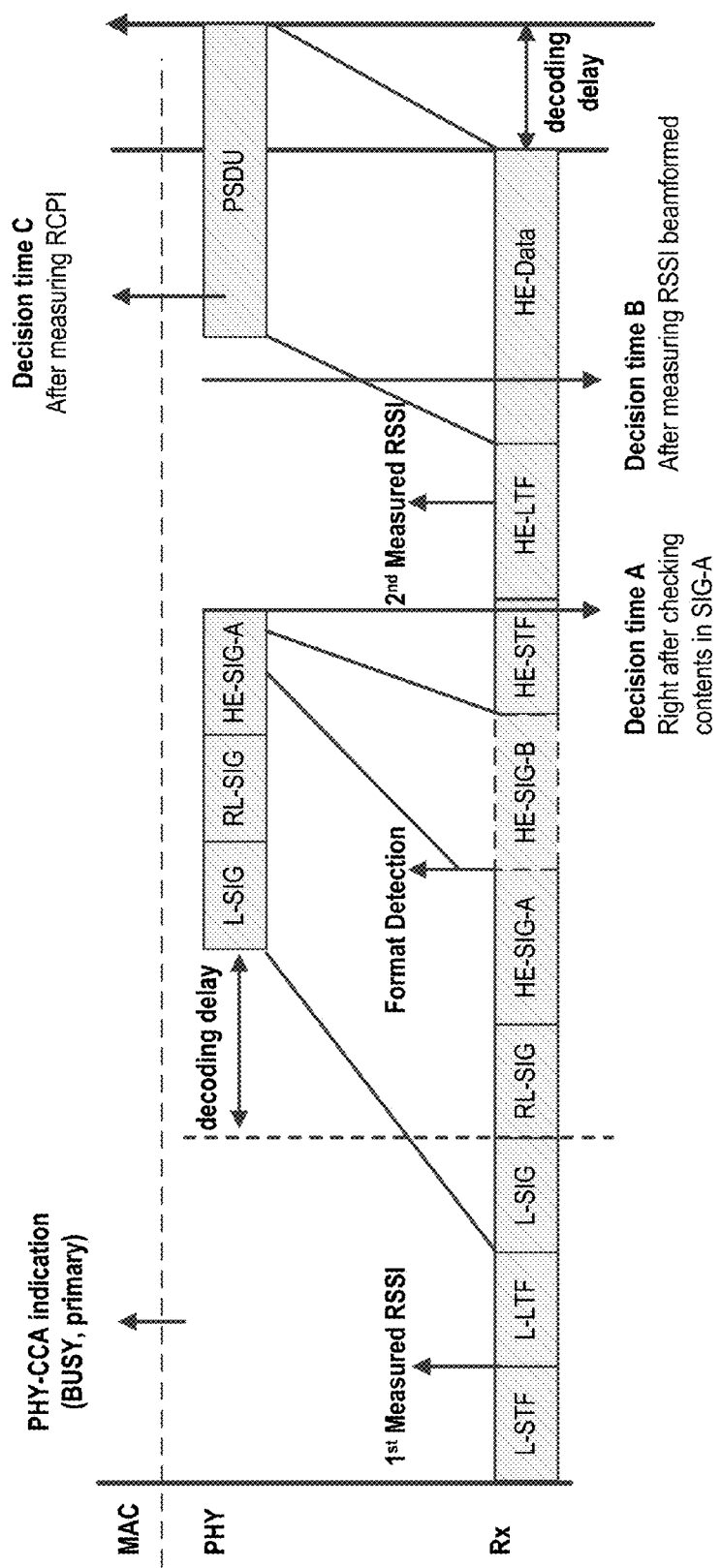
FIG. 10 illustrates another example of detecting a frame over multiple decision times.

FIG. 10 illustrates another example of detecting a frame over multiple decision times. Like in FIG. 9, there may be different decision times to check the contents of the HE-SIG-A field, and compare the measured received power to the OBSS PD level. In FIG. 10, a first received power value is measured based on the legacy preamble, and a first decision time occurs after contents in the HE-SIG-A field are checked. A second received power is measured based on the HE-LTF, and a second decision time occurs after the second measured received power (beamforming applied). The RCPI can be measured, and a third decision time occurs after measuring the RCPI. In one or more implementations, the two measured RSSI values can be determined based on the legacy preamble and the HE-LTF field (under the 802.11ax specification), and the RCPI value is a measurement of the received RF power in the selected channel for a received frame. This parameter may be a measurement by the PHY of the received RF power in the channel measured over the entire received frame or by other equivalent means that meet the specified accuracy.

Figure 11:
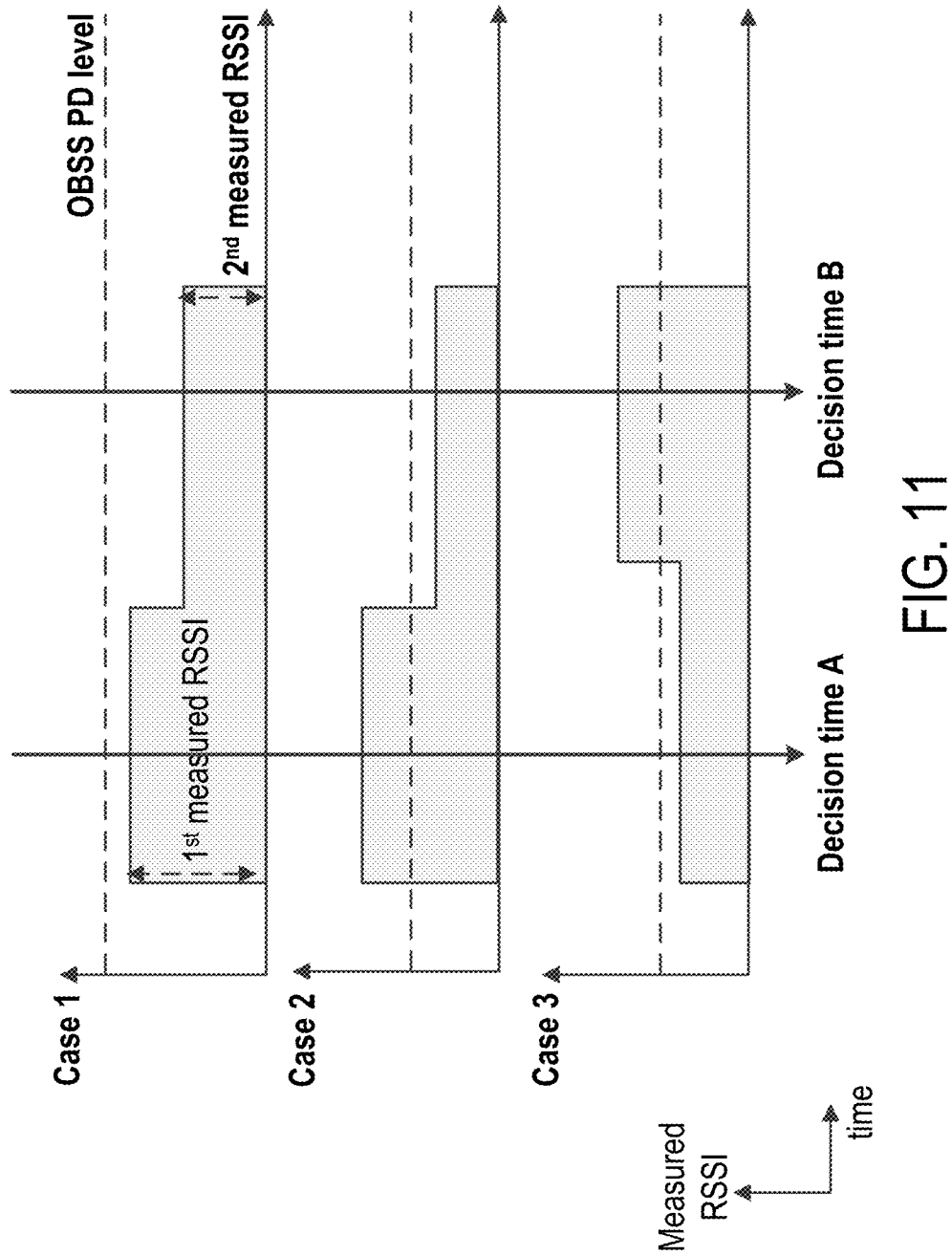
FIG. 11 illustrates an example of detecting a frame over multiple decision times.

FIG. 11 illustrates an example of detecting a frame over multiple decision time. Based on a given decision time, the received power measured at different decision times may differ such that it may not be clear which measured received power should be compared to the OBSS PD level to achieve SR. In addition to Case 1 shown, FIG. 11 describes two case scenarios (e.g., Case 2 and Case 3), which correspond to different measured RSSIs, resulting in different SR procedures depending on the given decision time. For example, an STA in Case 2 may set the NAV after determining that the measured received power at decision time A exceeds the OBSS PD level, whereas the STA may ignore updating the NAV timer after determining that the measured received power at decision time B is less than the OBSS PD level. The STA in Case 1 may ignore updating the NAV timer based on the measured received power taken at either decision times.

Figure 12:
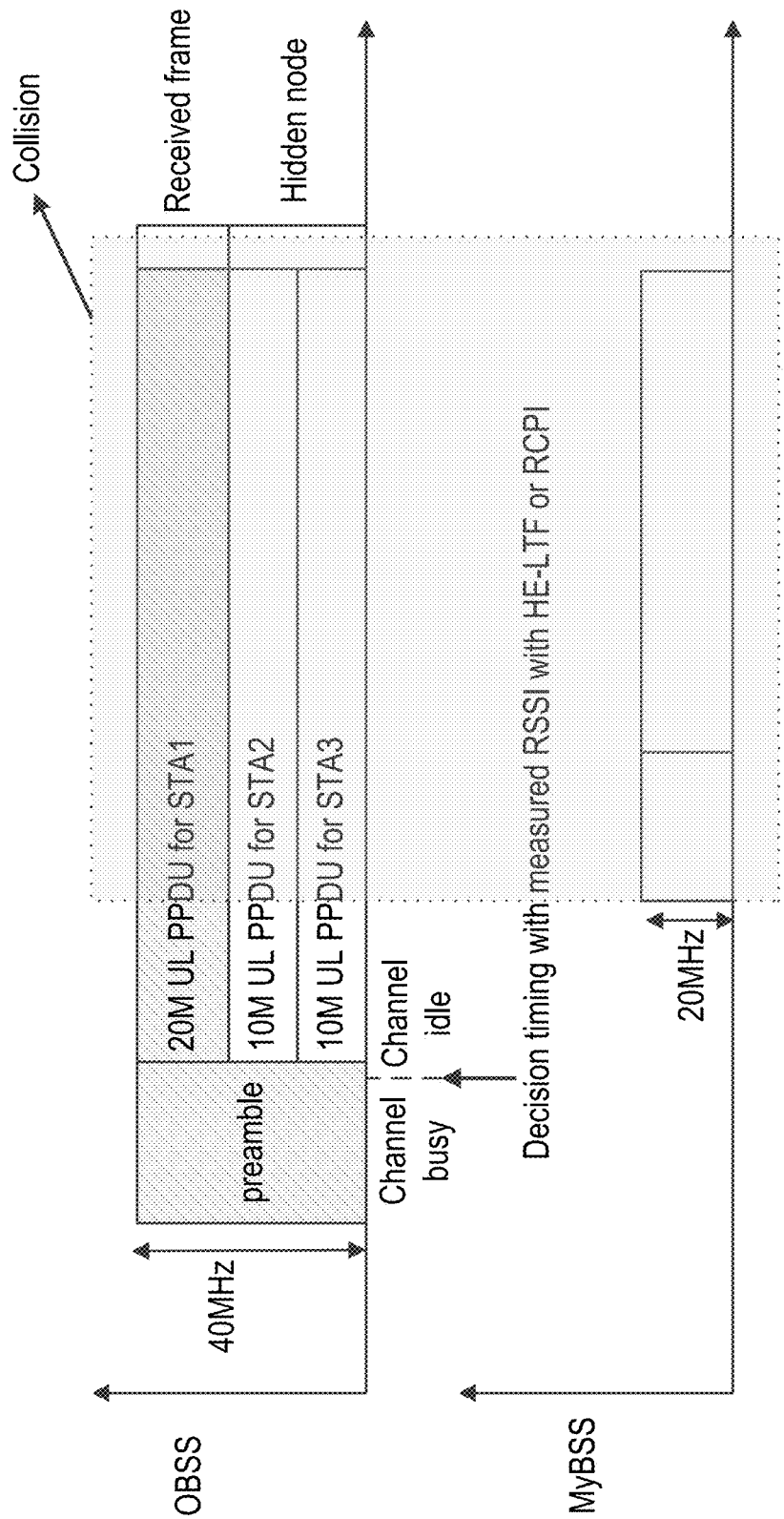
FIG. 12 illustrates an example of detecting a frame over multiple decision times.

FIG. 12 illustrates an example of detecting a frame over multiple decision times. Referring to Case 2 of FIG. 11, multiple decision timing may be needed to avert a possible collision because the frame can be an UL MU PPDU from an OBSS as described in FIG. 12, where the STA in myBSS (i.e., a same BSS to which the STA belongs) receives another inter-BSS frame from an OBSS. Moreover, the measured received power may be less than the OBSS PD level when the decision time is set to the B position, where beamformed received power is measured based on the HE-LTF. Because the measured received power at decision time B satisfies the OBSS PD based SR condition, the STA is expected to start a backoff counter for initiating an SR transmission. Once the STA has a chance to transmit the PPDU frame, there would be a collision, thus resulting in a signal interference against the UL MU PPDU from other STAs assigned by the trigger frame in the OBSS.

Referring to Case 3 of FIG. 11, given the decision time A to compare a first measured RSSI based on the legacy preamble to the OBSS PD level (where the measured received power is less than the OBSS PD level), the medium condition indicates a transition to an IDLE channel from a BUSY channel indication, and the STA resumes the countdown process. During the DIFS or extended IFS (EIFS) time periods, the STA may detect that the medium is occupied (i.e., a BUSY channel).

Figure 13A:
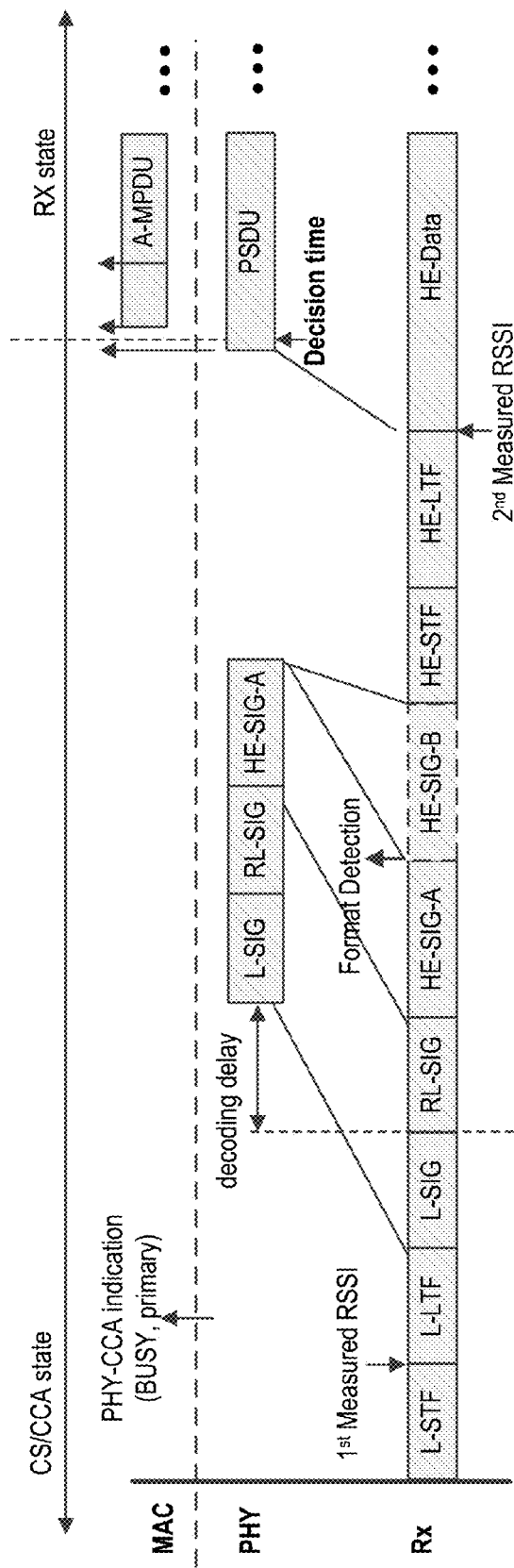

FIGS. 13A and 13B illustrate examples of detecting a frame over multiple decision times. In one or more implementations (which may be referred to as "E8" simply for convenience), when an STA receives a frame having color bits not matched to myBSS, the STA may obtain the received power to be then used to compare against the OBSS PD level.

The STA may compare the received power to the OBSS PD level. When the STA determines that the received power is less than the OBSS PD level, the STA ignores updating a NAV timer. Following the comparison, if the medium condition indicates an IDLE channel (e.g., medium condition transitions from a BUSY channel to an IDLE channel) based on channel sensing, the STA resumes the countdown process to have the STA ready to initiate an SR transmission.

In one or more implementations, when multiple received power measurements are taken, certain mechanisms as follow may apply for selecting the measured received power to compare to the OBSS PD level: 1) take weighted sum of the two measured RSSI values, 2) take minimum RSSI value among the measured RSSIs, and 3) each measured RSSI value is used to compare to the OBSS PD level.

Figure 14:
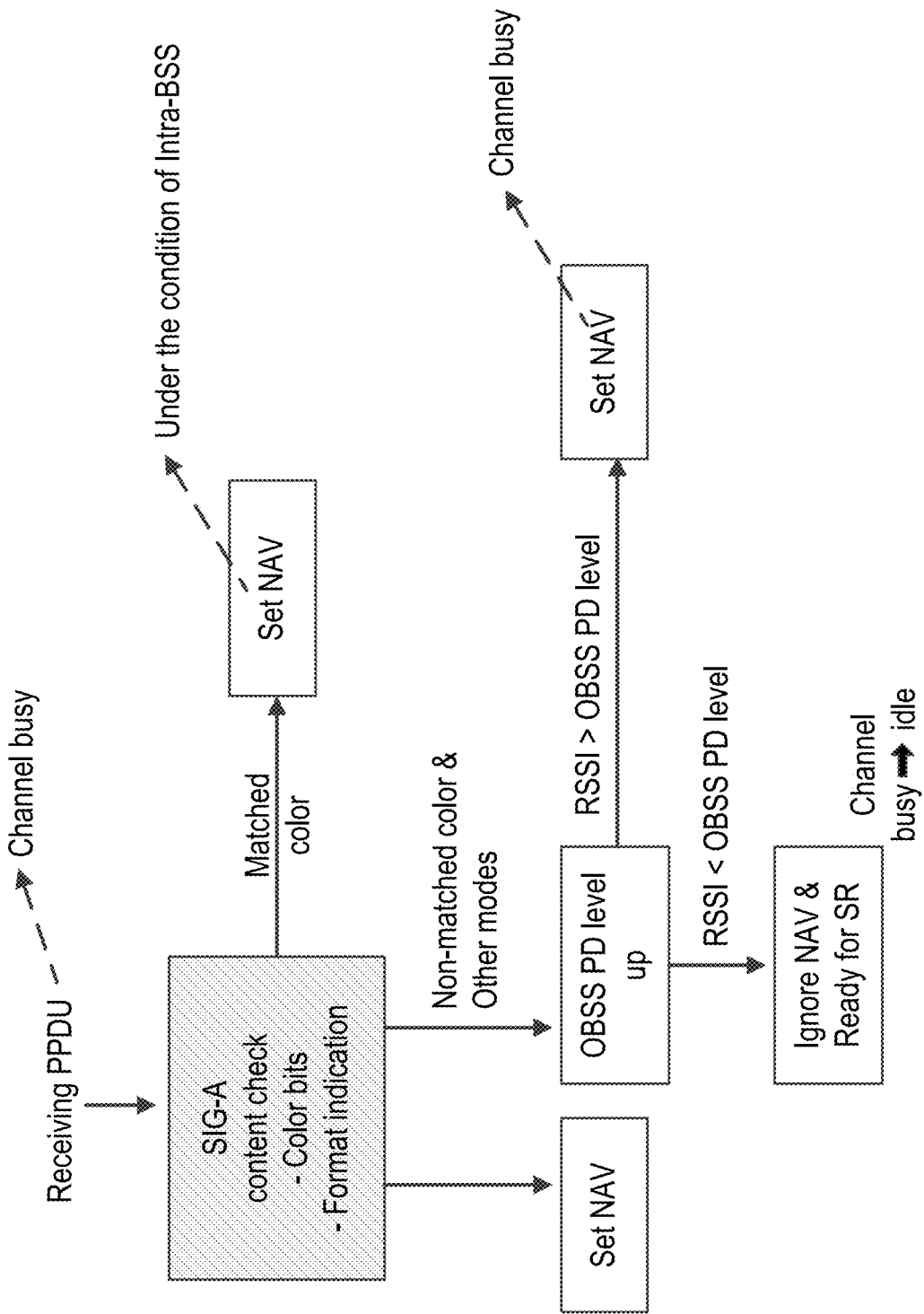
FIG. 14 illustrates an example of detecting a frame for spatial reuse.

FIG. 14 illustrates an example of detecting a frame for spatial reuse. In one or more implementations (which may be referred to as "E9" simply for convenience), when an STA receives a frame, the STA may behave as follows: The STA decodes the frame and checks the contents of an HE-SIG field (e.g., HE-SIG-A field) of the frame, where the contents in the HE-SIG field (e.g., HE-SIG-A field) may include: 1) a color field, which contains color information (e.g., color bits) to determine whether the frame is an inter-frame or intra-frame, 2) a format indication to determine whether the frame is a UL MU PPDU frame, and/or 3) the number of HE-SIG-B symbol for selecting the decision time and corresponding measured received power (e.g., if the length of the HE-SIG-B field is too long to measure the RSSI based on the HE-LTF, then the measured RSSI based on the legacy preamble may be used instead).

The STA may obtain a received power associated with the received frame. The STA may then compare the received power to the OBSS PD level. When the STA determines that the received power is less than the OBSS PD level, the STA ignores updating a NAV timer. Following the comparison, if the medium condition indicates an IDLE channel (e.g., medium condition transitions from a BUSY channel to an IDLE channel) based on channel sensing, the STA resumes the countdown process to have the STA ready to initiate an SR transmission. On the other hand, when the STA determines that the received power is greater than or equal to the OBSS PD level, the STA sets the NAV timer.

Figure 15B:
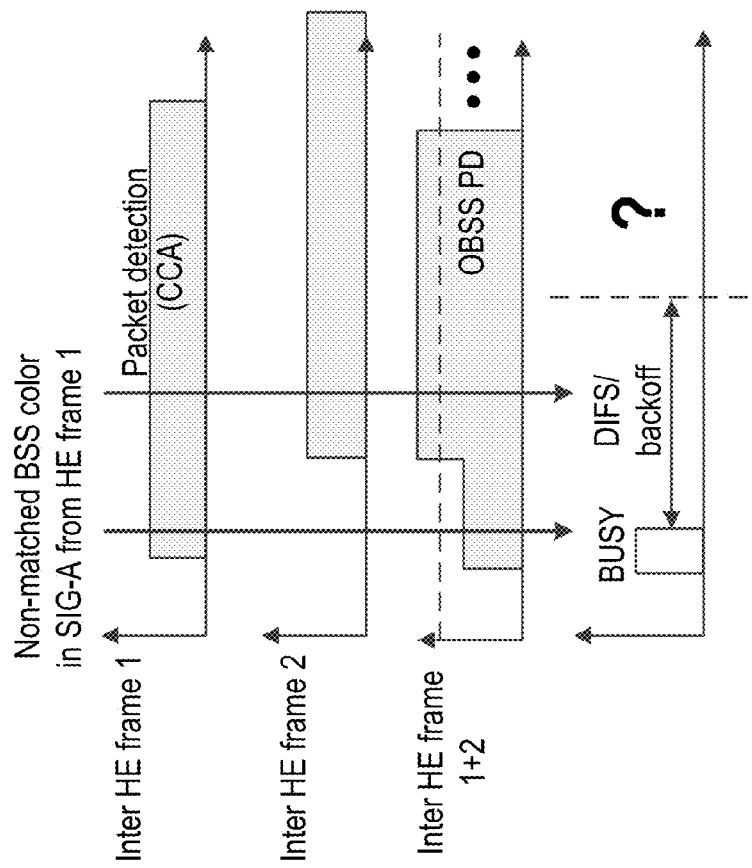
FIGS. 15A and 15B illustrate examples of detecting an inter-basic service set (inter-BSS) frame over multiple decision times.
Figure 15A:
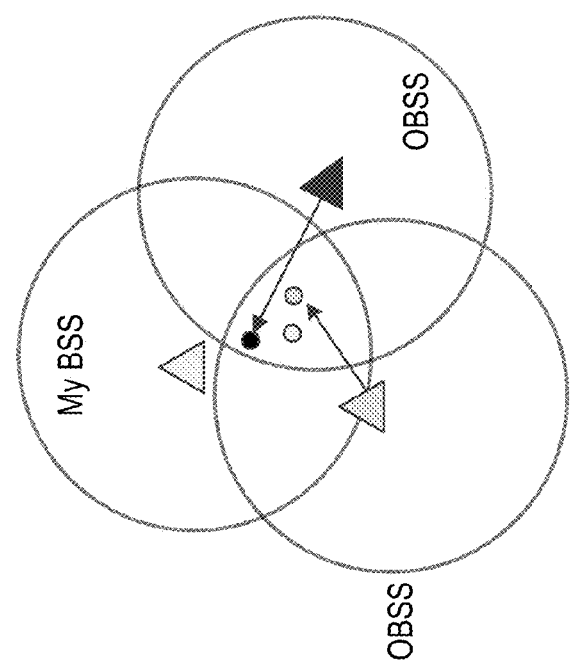

FIGS. 15A and 15B illustrate examples of detecting an inter-BSS frame over multiple decision times. In dense circumstances, there may exist some cases that an STA may receive more than one inter-frame, which is partially overlapped. When the STA receives a frame, the STA determines whether the received frame is an inter-frame, and the STA measures the received power of the frame. The STA then compared the measured received power to the OBSS PD level. In this example, the STA determines that the measured received power is less than the OBSS PD level. During a time in which the medium condition indicates an IDLE channel, the start of a valid packet (or frame) is detected.

Figure 16:
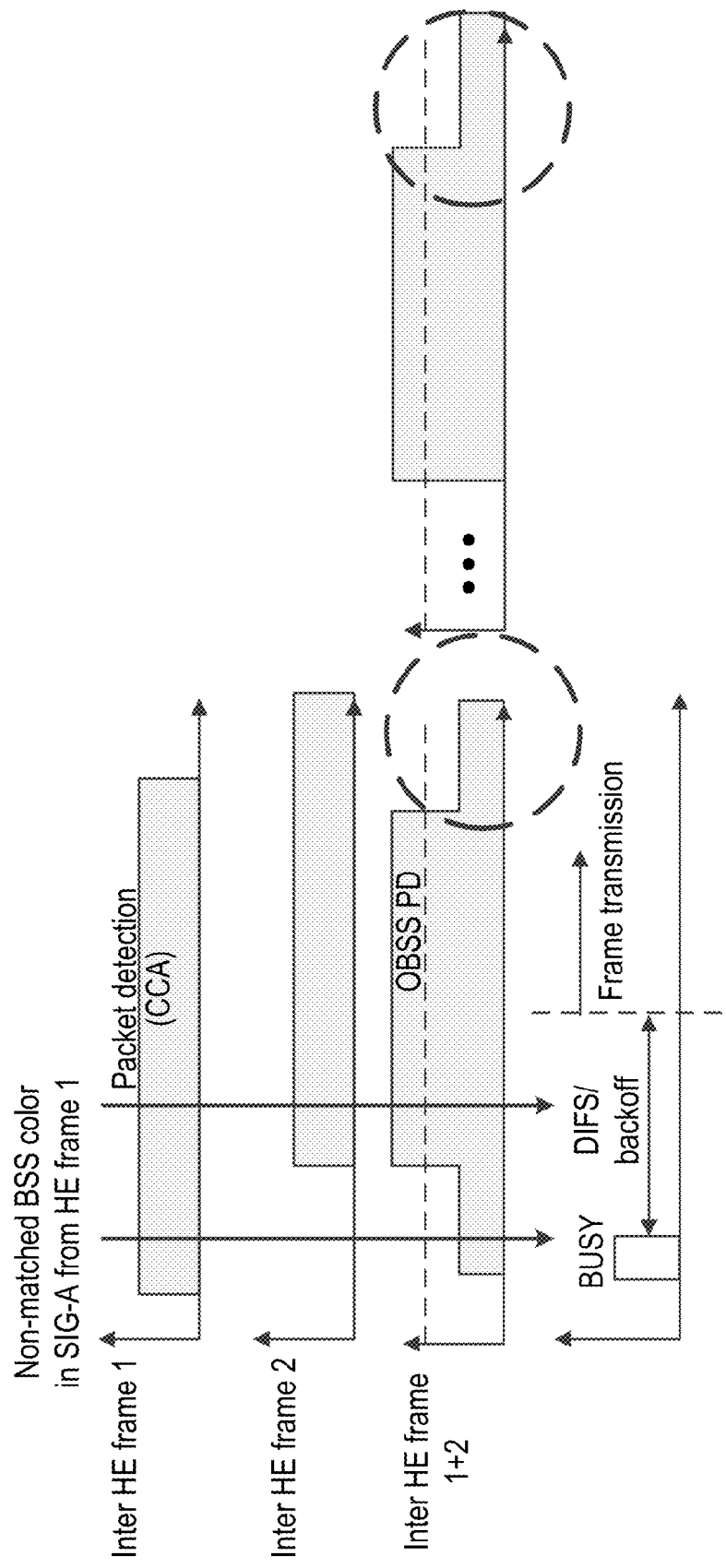
FIGS. 16 and 17 illustrate examples of detecting a frame using an overlapping basic service set (OBSS) packet detection (PD) level for spatial reuse.
Figure 17:
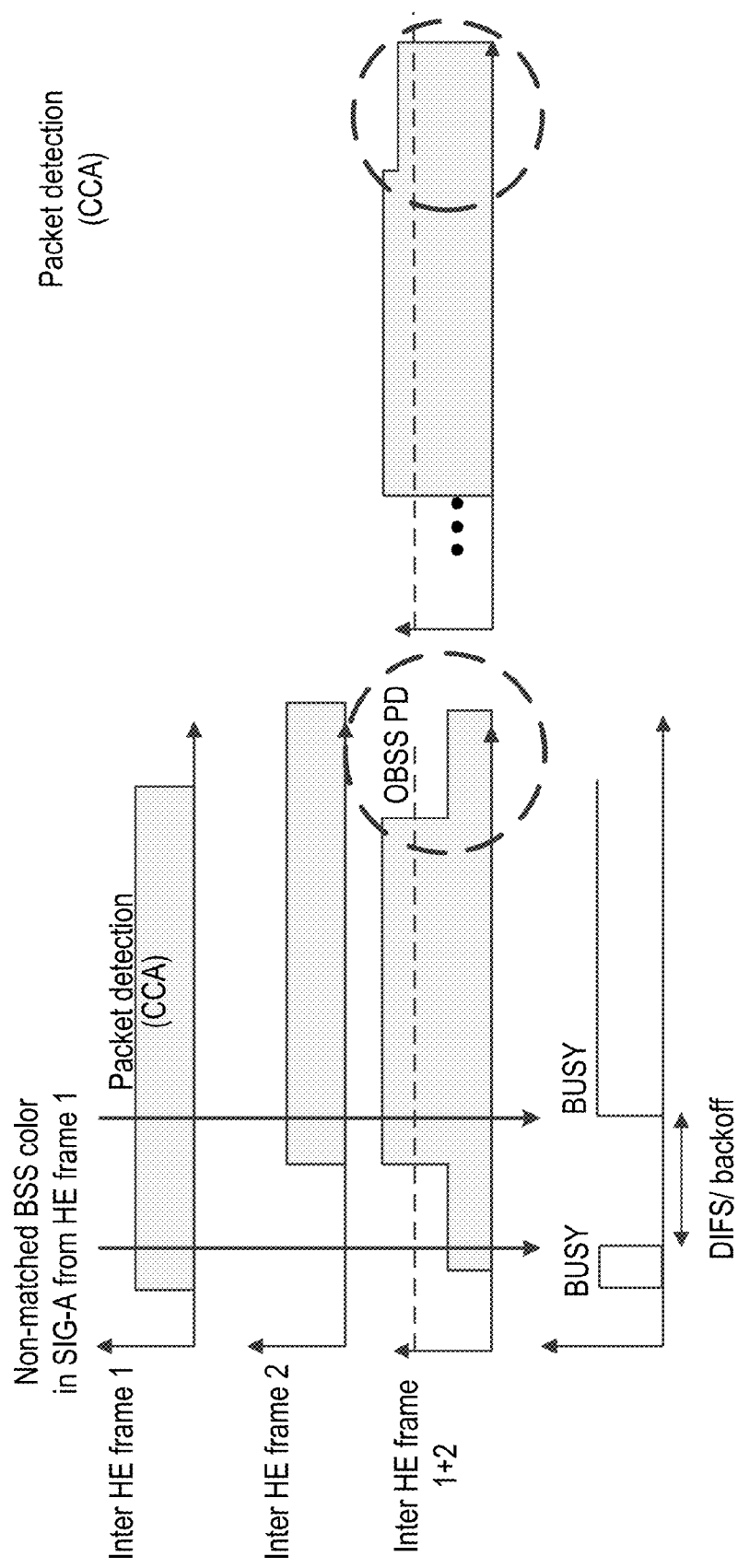

FIGS. 16 and 17 illustrate examples of detecting a frame using an OBSS packet detection (PD) level for spatial reuse. In one or more implementations (which may be referred to as "E11" simply for convenience), when an STA receives a frame, the STA determines that the received frame is an inter-frame (or inter-BSS frame). The STA may then compare the measured received power to the OBSS PD level. When the STA determines that the measured received power is less than the OBSS PD level, the STA ignores updating a NAV timer. Following the comparison, if the medium condition indicates an IDLE channel (e.g., medium condition transitions from a BUSY channel to an IDLE channel) based on channel sensing, the STA resumes the countdown process to have the STA ready to initiate an SR transmission. During the time that the medium condition indicates an IDLE channel, the STA detects the start of a valid packet (or frame). If the estimated packet detect CCA (or receive power) of the second received inter-frame is also less than OBSS PD level, the STA keeps the medium condition indicating an IDLE channel and continues decrementing the backoff counter to zero, where the estimated packet detect CCA (or received power) is calculated with the first received inter-frame and overlapped OBSS PD level.

Figure 18:
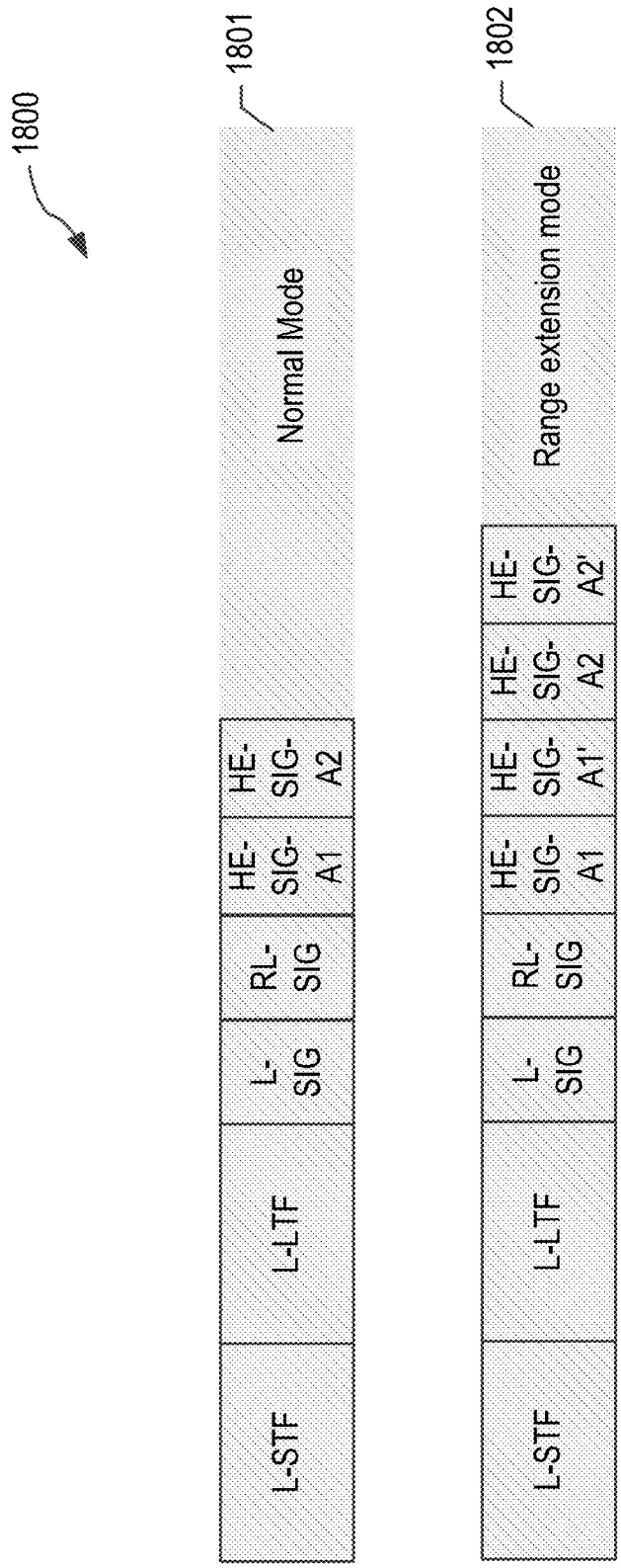
FIG. 18 illustrates an example of frame formats in a normal mode and a range extension mode for spatial reuse.

FIG. 18 illustrates examples of frame formats for spatial reuse. In one or more implementations, the received power of L-STF symbol(s) and L-LTF symbol(s) of the legacy preamble of a frame is boosted by K dB (e.g., K=3) in the extended range preamble format (e.g., 1802) by the transmitter to remove the performance bottleneck in the legacy preamble. In this respect, the measured received power (e.g., measured RSSI) of the legacy preamble can be decreased by K dB when comparing to an OBSS PD level to determine whether the STA is ready for initiating an SR transmission.

If the measured received power is not adjusted to reflect the boost in power in the legacy preamble, then the system may lose the opportunity to use the IDLE medium for an SR transmission.

In one or more implementations (which may be referred to as "E12" simply for convenience), early detection of a frame (e.g., PPDU, HE frame, HE extended range SU PPDU) for spatial reuse is performed by an STA using a procedure that measures a received power of a legacy preamble portion (e.g., L-STF or L-LTF) of the frame, adjusts the received power (if boosted), and compares the power to an OBSS PD level. In one or more implementations, the measured received power is passed from a PHY layer of the wireless device to a MAC layer of the wireless device for processing.

When the STA receives a frame, which may be referred to as a PPDU, HE frame, HE extended range SU PPDU, or another frame format (e.g., trigger based frame format), from a second station, the medium condition indicates a BUSY channel, and this BUSY channel indication continues during the period of time that is taken by the STA to determine whether the frame is an inter-BSS frame (i.e., the frame originates from an inter-BSS) or an intra-BSS frame (i.e., the frame originates from a wireless network other than the wireless network associated with the STA). During the same time period, the STA may suspend a countdown process (e.g., a countdown or decrementing process with respect to an interframe space (IFS) time period, backoff, or a combination thereof, to have the STA ready for an SR transmission).

In one embodiment, determining whether the received frame is an inter-BSS or intra-BSS frame may include a comparison of color information. For example, the STA decodes the frame and checks the contents of the HE-SIG-A field of the frame. The contents of the HE-SIG-A field may include a color field, which contains color information (e.g., color bits). The color information describes a BSS associated with the transmitting device (i.e., the second station). The STA compares the obtained color information to the color information associated with myBSS (i.e., BSS with which the STA is associated or to which the STA belongs). When the color information in the HE-SIG-A field matches with the color information associated with myBSS (i.e., the frame originates from the same BSS as that of the STA), the STA determines that the received frame is an intra-BSS frame and sets its local NAV timer based on the received frame. When the color information in the HE-SIG-A field does not match the color information associated with myBSS (i.e., the frame originates from a different BSS as that of the STA), the STA identifies the frame as an inter-BSS frame. The STA may increase an OBSS PD level by a predetermined level when the color information is not matched. An OBSS PD level may be sometimes referred to as a predetermined OBSS PD level, a PD level or a threshold level.

The STA may obtain a received power measured based on a legacy preamble (or header) portion of the received frame. In some embodiments, the received frame may include two separate LTFs: (1) an L-LTF and (2) an HE-LTF. Each of the two separate LTFs is comprised of one or more symbols. In this embodiment, the L-LTF is the legacy preamble such that the received power measured based on the legacy preamble is based on the L-LTF of the frame. In one or more implementations, the HE-LTF is the non-legacy preamble such that a second received power measured based on the non-legacy preamble is based on the HE-LTF of the frame. A received power may be represented as an RSSI value.

When the measured received power is determined (e.g., by the STA) to have been boosted by a predetermined value (e.g., K dB, where K may be 3), the STA adjusts the measured received power by decreasing the measured received power by a predetermined value (e.g., de-boosting the RSSI value by the predetermined value, which may be K dB) before comparing the measured received power to the OBSS PD level. In one or more implementations, the adjustment to the measured received power by the predetermined value is performed in response to determining that the received frame is a HE extended range SU PPDU format.

The STA may then compare the adjusted received power (e.g., de-boosted RSSI) to the OBSS PD level. When the STA determines that the adjusted received power is less than the OBSS PD level, the STA ignores updating a NAV timer. Following the comparison, if the medium condition indicates an IDLE channel (e.g., medium condition transitions from a BUSY channel to an IDLE channel) based on channel sensing, the STA resumes the countdown process to have the STA ready to initiate an SR transmission. On the other hand, when the STA determines that the adjusted received power is greater than or equal to the OBSS PD level, the STA sets the NAV timer.

In one or more implementations, a received frame is in a first type of frame format (e.g., an HE extended range SU PPDU format) when a link margin available between one STA (e.g., AP) and other STAs is insufficient, such that the received frame may be more susceptible to signal interference. In one embodiment, the STA may determine that the frame has been boosted by detecting that the frame is an HE extended range SU PPDU format. This type of frame may necessitate additional protection from a possible SR transmission from an OBSS STA. This is described in more detail below.

In an example, which may be a variation of E12, when an STA receives a frame which is a first type of frame (i.e., an HE extended range SU PPDU format), the STA obtains a received power (e.g., received power measured based on a legacy preamble of the received frame). A received power may be represented as an RSSI value. When the measured received power is determined (e.g., by the STA) to have been boosted by a predetermined value (e.g., K dB, where K may be 3 when the frame is in an HE extended range SU PPDU format), the STA adjusts the measured received power by increasing the measured received power by a predetermined value (e.g., boosting the RSSI value by M dB) before comparing the measured received power to the OBSS PD level. Under this condition, the STA is not likely to allow an SR transmission when the STA receives an HE extended range SU PPDU. Hence, an HE extended range SU PPDU can be protected more than other HE PPDU formats from potential interference by SR transmission.

The STA may then compare the adjusted received power (e.g., boosted RSSI) to the OBSS PD level. When the STA determines that the adjusted received power is less than the OBSS PD level, the STA ignores updating a NAV timer. Following the comparison, if the medium condition indicates an IDLE channel (e.g., medium condition transitions from a BUSY channel to an IDLE channel) based on channel sensing, the STA resumes the countdown process to have the STA ready to initiate an SR transmission. On the other hand, when the STA determines that the adjusted received power is greater than or equal to the OBSS PD level, the STA sets the NAV timer.

In one or more implementations (which may be referred to as "E13" simply for convenience), early detection of a frame (e.g., PPDU, HE frame, HE extended range SU PPDU) for spatial reuse is performed by an STA using a procedure that measures a received power of a legacy preamble portion (e.g., L-STF or L-LTF) of the frame, compares the received power to an OBSS PD level (adjusted when the received power was boosted).

When the STA receives a frame (e.g., PPDU, HE frame, HE extended range SU PPDU) from a second station, the medium condition indicates a BUSY channel, and this BUSY channel indication continues during the period of time that is taken by the STA to validate that the frame is an inter-BSS frame (i.e., the frame originates from an inter-BSS). During the same time period, the STA may suspend a countdown process (e.g., a countdown or decrementing process with respect to an interframe space (IFS) time period, backoff, or a combination thereof, to have the STA ready for an SR transmission).

During the same time period, the STA decodes the frame and checks the contents of the HE-SIG-A field of the frame. The contents of the HE-SIG-A field include a color field, which contains color information (e.g., color bits). The STA compares the obtained color information to the color information associated with myBSS (i.e., BSS with which the STA is associated or to which the STA belongs). When the color information in the HE-SIG-A field matches with the color information associated with myBSS (i.e., the frame originates from the same BSS as that of the STA), the STA sets its local NAV timer. When the color information in the HE-SIG-A field does not match the color information associated with myBSS (i.e., the frame originates from a different BSS as that of the STA), the STA identifies the frame as an inter-BSS frame. The STA may increase an OBSS PD level to a predetermined level when the color information is not matched. An OBSS PD level may be sometimes referred to as a predetermined OBSS PD level, a PD level or a threshold level.

The STA may obtain a received power measured based on a legacy preamble (or header) portion of the received frame. A received power may be represented as an RSSI value. When the measured received power is determined (e.g., by the STA) to have been boosted by a predetermined value (e.g., K dB, where K may be 3), the STA adjusts the OBSS PD level by increasing the OBSS PD level by a predetermined value (e.g., boosting the OBSS PD level by the predetermined value, which may be K dB) before comparing the measured received power to the OBSS PD level.

The STA may then compare the measured received power to the adjusted OBSS PD level. When the STA determines that the measured received power is less than the adjusted OBSS PD level, the STA ignores updating a NAV timer. Following the comparison, if the medium condition indicates an IDLE channel (e.g., medium condition transitions from a BUSY channel to an IDLE channel) based on channel sensing, the STA resumes the countdown process to have the STA ready to initiate an SR transmission. On the other hand, when the STA determines that the measured received power is greater than or equal to the adjusted OBSS PD level, the STA sets the NAV timer.

In one or more implementations, a received frame is in a first type of frame format (e.g., an HE extended range SU PPDU format) when a link margin available between one STA (e.g., AP) and other STAs is insufficient, such that the received frame may be more susceptible to signal interference. This type of frame may necessitate additional protection from a possible SR transmission from an OBSS STA. This is described in more detail below.

In an example, which may be a variation of E13, when an STA receives a frame which is a first type of frame (i.e., an HE extended range SU PPDU format), the STA obtains a received power (e.g., received power measured based on a legacy preamble of the received frame). A received power may be represented as an RSSI value. When the measured received power is determined (e.g., by the STA) to have been boosted by a predetermined value (e.g., K dB, where K may be 3), the STA adjusts the OBSS PD level by increasing the OBSS PD level by a predetermined value (e.g., boosting the OBSS PD value by M dB) before comparing the measured received power to the OBSS PD level.

The STA may then compare the measured received power to the adjusted OBSS PD level (e.g., boosted by M dB). When the STA determines that the measured received power is less than the adjusted OBSS PD level, the STA ignores updating a NAV timer. Following the comparison, if the medium condition indicates an IDLE channel (e.g., medium condition transitions from a BUSY channel to an IDLE channel) based on channel sensing, the STA resumes the countdown process to have the STA ready to initiate an SR transmission. On the other hand, when the STA determines that the measured received power is greater than or equal to the adjusted OBSS PD level, the STA sets the NAV timer.

In one or more examples, expressions representing the OBSS PD level are reproduced below:

$$\text{Opt 1) OBSS\_PD}_{level} = \max\left\{\min\left\{\begin{array}{l} \text{OBSS\_PD}_{min} \\ \text{OBSS\_PD}_{max} \\ \text{OBSS\_PD}_{min} + (\text{TX\_PWR}_{ref} - \text{TX\_PWR}) + M \end{array}\right.\right.$$

$$\text{Opt 2) OBSS\_PD}_{level} = \max\left\{\min\left\{\begin{array}{l} \text{OBSS\_PD}_{min} \\ \text{OBSS\_PD}_{max} \\ \text{OBSS\_PD}_{min} + (TX_{PWR_{ref}} - TX_{PWR} + M) \end{array}\right.\right.$$

where TX_PWR is the reference power level, TX_PWR is the transmission power in dBm for an HE STA, OBSS_PDmin is the minimum received sensitivity level. OBSS_PDmax is the maximum received sensitivity level. In one or more implementations, M is 0 when the received HE PPDU format is one of HE SU PPDU, HE MU PPDU and HE trigger-based PPDU, or M is a first value when HE PPDU format is the HE extended range SU PPDU format.

In one or more implementations, the first value (as M) is a packet type dependent variable. In some implementations, the first value is a positive integer when all HE PPDU formats necessitate equal protection involving an SR transmission. In one or more implementations, the first value can be a negative integer when the HE extended range PPDU format needs protection from signal interference by allowing SR transmissions. In one or more implementations, the first value can be determined by an associated AP. In one or more implementations, the first value can be changed by AP node using a broadcasting frame. In one or more implementations, the first value can be a fixed value.

In one or more implementations, the first value can be a non-zero value when the packet type of the received frame corresponds to a third type of frame format having a negligible (or small) link margin available between a transmitter and a receiver, thus causing an otherwise successful frame reception to be susceptible to even a marginal amount of additional interference from spatial reuse. The third type of the packet may be the HE extended range SU PPDU. In one or more implementations, the third type of the packet is a PPDU whose modulation and coding scheme (MCS) level is with a low rate/rank.

If the transmit bandwidth differs from 20 MHz, both OBSS_PDmax and OBSS_PDmin can be adjusted based on the following expressions:

$$OBSS\_PD_{max} = OBSS\_PD_{max}(20 \text{ MHz}) + 10 \cdot \log\left(\frac{\text{Bandwidth}}{20 \text{ MHz}}\right)$$

$$OBSS_{PD_{min}} = OBSS_{PD_{min}}(20 \text{ MHz}) + 10 \cdot \log\left(\frac{\text{Bandwidth}}{20 \text{ MHz}}\right)$$

In one or more implementations (which may be referred to as "E14" simply for convenience), a method of assessing a wireless medium from a WLAN device when the WLAN device identifies a start of a first frame is disclosed. The method may include measuring received signal strength of a first part of the first frame; identifying a BSS of the first frame; estimating received signal strength of a second part of the first frame; and assessing the wireless medium as IDLE if (1) the BSS of the first frame is different from the BSS of the WLAN device and (2) the estimated signal strength of the second part is lower than a first threshold value.

In one or more implementations (e.g., E14 or other implementations), the first part is a L-LTF field. In one or more implementations (e.g., E14 or other implementations), the first part is a L-STF field. In one or more implementations (e.g., E14 or other implementations), the first part is HE-LTF field.

In one or more implementations (which may be referred to as "E15" simply for convenience, and which may be, for example, related to E14 or other implementations), the transmission power of the first part is a predetermined level higher than that of the second part of the first frame if the first frame is an HE PPDU using an extended range preamble. In one or more implementations (e.g., E15 or other implementations), the predetermined level is 3 dB. In one or more implementations (e.g., E15 or other implementations), the estimated received signal strength of the second part of the first frame is the predetermined level lower than the measured received signal strength of the first part of the first frame.

Assuming HE extended range SU PPDU is sent in case there is not much of a link margin available between AP and STAs, this PPDU can be more vulnerable to interference. This type of PPDU should be protected from SR transmission from OBSS. In one or more implementations (e.g., E15 or other implementations), the estimated received signal strength of the second part of the first frame is a second predetermined level higher than the measured received signal strength of the first part of the first frame to allow that HE extended range SU PPDU can be protected more than other HE PPDUs. In one or more implementations (e.g., E14 or other implementations), a first threshold value is adjusted with a second predetermined level to allow that HE extended range SU PPDU to receive more protection than other HE PPDUs. In one or more implementations (e.g., E14 or other implementations), the second part of the first frame comprises one or more of L-SIG, RL-SIG, or HE-SIG-A field of the first frame. In one or more implementations (e.g., E14 or other implementations), the second part of the first frame is the first frame outside of the first part. Considering HE extended range SU PPDU needs less interference from OBSSs to support long range, SR mechanism may not be allowed.

In one or more implementations (which may be referred to as "E16" simply for convenience), a method for early detection procedure, where when the WLAN device receives the PPDU, the WLAN device determines whether SR mechanism is allowed is disclosed. The method may include detecting a PPDU format. If the detected PPDU format is a first type of PPDU format, SR mechanism is not allowed and the medium condition indicates BUSY. If the detected PPDU format is a second type of PPDU format, the STA identifies a first value of the PPDU frame which indicates whether SR mechanism is not allowed or not. If the first value is set to a first state. SR mechanism is not allowed and the STA maintains the medium condition as BUSY until the duration of the detected PPDU.

Otherwise, the SR mechanism is allowed as follows. If the first information matches with the STA's own BSSID, the STA maintains the medium condition as BUSY until the duration of the detected PPDU. If the first information does not match with the STA's own BSSID and received signal level is greater than a first threshold level, the STA maintains the medium condition as BUSY until the duration of the detected PPDU. If the first information does not match with the STA's own BSSID and received signal level is lower than a first threshold level, the STA switch the medium condition as IDLE. In one or more implementations (e.g., E16 or other implementations), the first type of PPDU format can be HE extended range SU PPDU.

In one or more implementations (e.g., E16 or other implementations), if both condition 1) L-SIG Length set as mod 3=2 and 2) quadrature binary phase-shift keying (QBPSK) on HE-SIG-A2 are met, the detected PPDU format is considered as HE extended range SU PPDU. In other words, when dividing a value of the length field of the L-SIG field of a frame by three (3) produces a remainder of two (2) and a second OFDM symbol of the HE-SIG-A field of the frame indicates QBPSK modulation, the frame is a HE extended range SU PPDU format. In one or more implementations (e.g., E16 or other implementations), the second type of PPDU format can be HE SU PPDU, HE MU PPDU and HE trigger-based PPDU. In one or more implementations (e.g., E16 or other implementations), if L-SIG Length set as mod 3=1 is met, the detected PPDU format is considered as HE SU PPDU. In one or more implementations (e.g., E16 or other implementations), if both condition 1) L-SIG Length set as mod 3=2 and 2) binary phase shift keying (BPSK) on HE-SIG-A2 are met, the detected PPDU format is considered as HE MU PPDU. In one or more implementations (e.g., E16 or other implementations), the first state of the first value of the PPDU frame can be an SR-not-allowed indication. In one or more implementations (e.g., E16 or other implementations), the SR-not-allowed indication can be in HE-SIG-A of the received PPDU. In one or more implementations (e.g., E16 or other implementations), the STA identifies the first type of PPDU format, a control field containing the first value can be used for other purposes.

In one or more implementations (e.g., E16 or other implementations), SR mechanism comprising two NAVs is allowed as follows. If the first information matches with the STA's own BSSID, it sets/updates Intra-BSS NAV when the received Duration in the intra-BSS PPDU is greater than the STA's current Intra-BSS NAV value; otherwise, the STA regards the PPDU an inter-BSS PPDU. If the PPDU is the inter-BSS PPDU and received signal level is greater than a first threshold level, the STA sets/updates regular NAV when the received Duration in the inter-BSS PPDU is greater than the STA's current regular NAV value. In one or more implementations (e.g., E16 or other implementations), the first threshold level can be OBSS PD level. In one or more implementations (e.g., E16 or other implementations), the first information can be any information within the frame (e.g., color) which has information related to (at least part of) BSSID.

In one or more implementations (e.g., E16, a variation of E16, or other implementations), when transmitting a PPDU frame, the type of the PPDU format is determined. If the determined type of the PPDU frame is a first type of PPDU format, a WLAN device set a first value with a first state in the first type of PPDU format. Otherwise, the WLAN device set the first value with a second state in the second type of the PPDU format. In one or more implementations (e.g., E16, a variation of E16, or other implementations), the first type of PPDU format can be HE extended range SU PPDU. In one or more implementations (e.g., E16, a variation of E16, or other implementations), the first state of first value of the PPDU frame can be an SR-not-allowed indication. In one or more implementations (e.g., E16, a variation of E16, or other implementations), the SR-not-allowed indication can be in HE-SIG-A of the received PPDU.

Figures 19A, 19B:
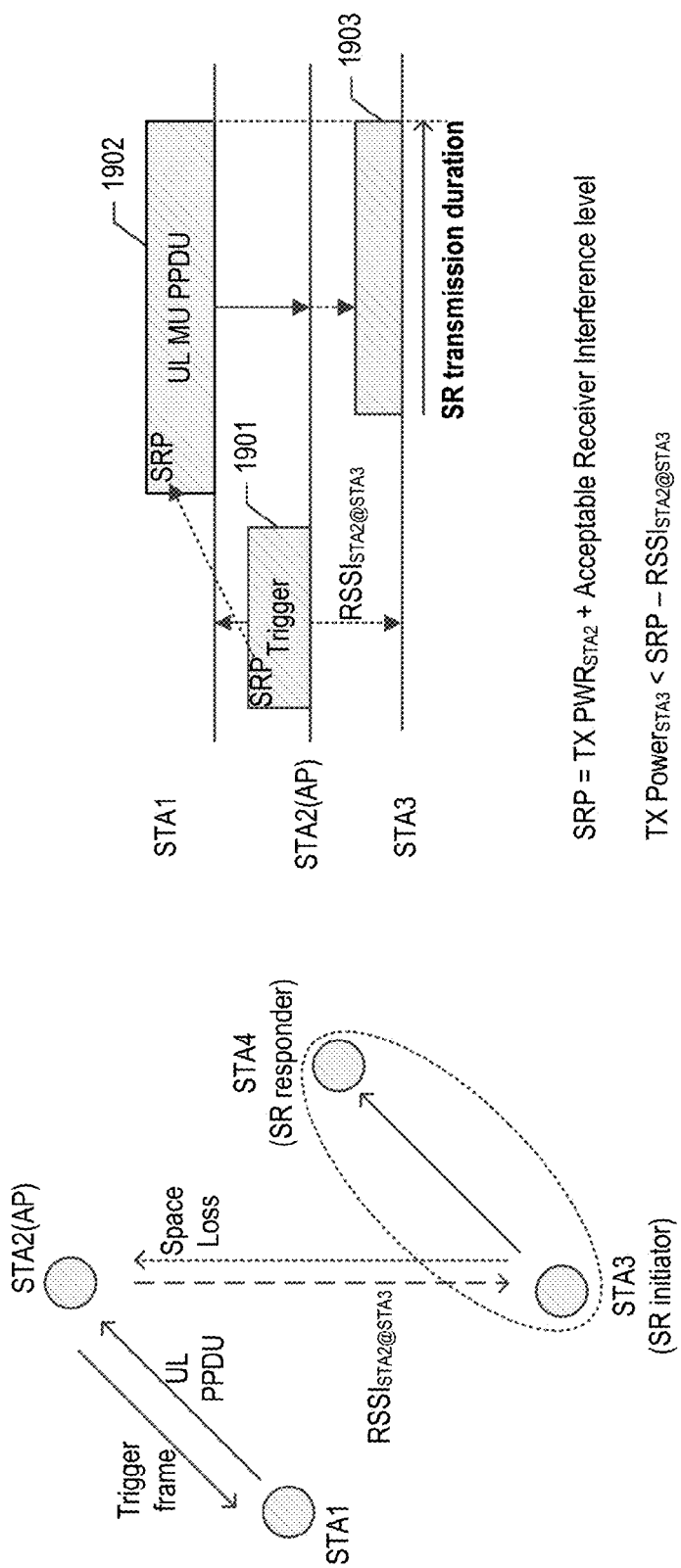
FIGS. 19A and 19B illustrate an example of detecting an overlapping basic service set (OBSS) frame for spatial reuse.

FIGS. 19A and 19B illustrate an example of detecting an overlapping basic service set (OBSS) frame for spatial reuse. In one or more implementations, early detection of a frame (e.g., HE frame, PPDU, HE extended range SU PPDU) for spatial reuse is based on a received power measured from the frame and a spatial reuse parameter associated with an OBSS STA when a station (e.g., STA3) considers a CCA-OA based procedure for initiating an SR transmission.

In this example, STA2 (e.g., AP) transmits a trigger frame (e.g., over a downlink transmission) to solicit a response from STA1. STA1 transmits an UL trigger-based frame (e.g., UL MU PPDU) in response to the trigger frame received from STA2. Meanwhile, STA3 receives the trigger frame and the UL trigger-based frame respectively from STA2 and STA1 as OBSS frames. STA3 may determine whether the frames from STA1 and STA2 are inter-BSS (or OBSS) frames based on color information or MAC address information. In assessing whether STA3 can initiate an SR transmission, STA3 determines whether the SR transmission causes any severe interference to STA2 when STA2 receives the UL trigger-based frame. In one or more implementations, STA3 uses two values 1) $RSSI_{STA2@STA3}$ and 2) spatial reuse parameter (SRP) to adjust a transmit power at STA3. These values facilitate STA3 for satisfying SR conditions that may avoid signal interference at STA2.

When STA3 receives the trigger frame, STA3 measures a received power (e.g., $RSSI_{STA2@STA3}$) of the received trigger frame. $RSSI_{STA2@STA3}$ is a received power of the trigger frame of STA2 measured at STA3 (e.g., a received power based on a legacy preamble of the trigger frame of STA2 measured at STA3).

STA3 receives the SRP in the HE-SIG-A field of the UL trigger-based frame. The SRP from the UL trigger-based frame may correspond to an SRP in the HE-SIG-A field of the trigger frame. In one example, STA1 copies and pastes the SRP in the HE-SIG-A field of the trigger frame into the SRP in the HE-SIG-A field of the UL trigger-based frame. In one or more implementations, the SRP is a function of a transmit power at STA2 (e.g., $TXPWR_{STA2}$) plus an acceptable receiver interference level at STA2. STA3 may initiate an SR transmission associated with STA3 based on the SRP and the measured received power. For example, STA3 may initiate an SR transmission when the estimated transmit power at STA3 is less than a difference between the SRP and the measured received power at STA3 (e.g., TX Power$_{STA3}$<SRP−$RSSI_{STA2@STA3}$, where $RSSI_{STA2@STA3}$ represents the measured received power in this equation).

In the examples and implementations illustrated below (e.g., examples referring to FIG. 20A, 20B, 20C, 21D, 23A, or 23B below), unless specifically stated otherwise, each of a downlink frame and an uplink frame may be simply referred to as a frame. Alternatively, the downlink frame may be referred to as a first frame, and the uplink frame may be referred to as a second frame, and vice versa. Each of a downlink transmission and an uplink transmission may be simply referred to as a transmission. Alternatively, the downlink transmission may be referred to as a first transmission, and the uplink transmission may be referred to as a second transmission, and vice versa.

Figures 20A, 20B:
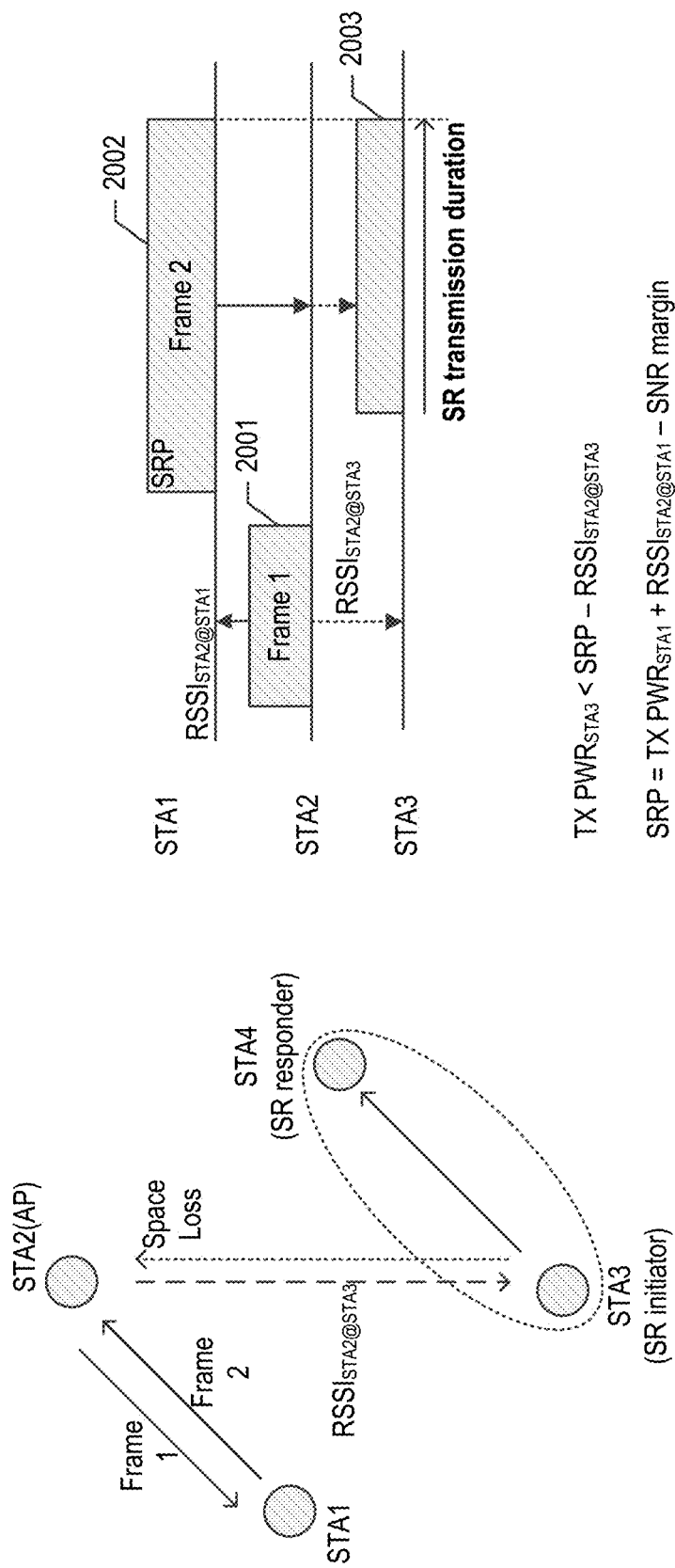
FIGS. 20A and 20B illustrate an example of detecting an overlapping basic service set (OBSS) frame for spatial reuse.

FIGS. 20A and 20B illustrate an example of detecting an overlapping basic service set (OBSS) frame for spatial reuse. In FIGS. 20A and 20B, STA3 receives a first frame and a second frame identified as OBSS frames, where the second frame is not necessarily in response to the first frame. In one or more implementations, one or more of the first frame and the second frame has an HE SU PPDU format (e.g., FIG. 7A), an HE extended range SU PPDU (e.g., FIG. 7C) or an HE MU PPDU format (e.g., FIG. 7B).

In this example, STA2 (e.g., AP) transmits a downlink frame (e.g., Frame 1) over a downlink transmission to solicit a response from STA1. STA1 transmits an uplink frame (e.g., Frame 2) in an uplink transmission based on the downlink frame. In one or more implementations, the uplink frame from STA1 is not in response to the downlink frame from STA2 such that one or more frames may be transmitted between the downlink frame (e.g., Frame 1) and the uplink frame (e.g., Frame 2). Meanwhile, STA3 receives the downlink frame and the uplink frame respectively from STA2 and STA1 as OBSS frames. STA3 may determine whether the frames from STA1 and STA2 are inter-BSS (or OBSS) frames based on color information or MAC address information. In assessing whether STA3 can initiate an SR transmission, STA3 determines whether the SR transmission causes any severe interference to STA2 when STA2 receives the uplink frame. In one or more implementations, STA3 uses two values 1) $RSSI_{STA2@STA3}$ and 2) SRP to adjust a transmit power at STA3. These values facilitate STA3 for satisfying SR conditions that may avoid signal interference at STA2.

When STA3 receives the downlink frame. STA3 measures a received power based on the legacy preamble of the received downlink frame (e.g., $RSSI_{STA2@STA3}$). $RSSI_{STA2@STA3}$ is a received power based on a legacy preamble of the downlink frame of STA2 measured at STA3. STA3 may receive the SRP in the HE-SIG-A field of the uplink frame. In one or more implementations, the SRP is a function of a transmit power at STA1 (e.g., $TXPWR_{STA1}$), a received power based on a legacy preamble of the received downlink frame of STA2 measured at STA1 (e.g. $RSSI_{STA2@STA1}$), and a signal-to-noise ratio (SNR) margin. For example, the SRP is TX $PWR_{STA1}$ plus $RSSI_{STA2@STA1}$ minus SNR margin (i.e., SRP=TX $PWR_{STA1}$+$RSSI_{STA2@STA1}$−SNR margin). In one or more implementations, the SNR margin refers to the required SNR margin as a function of MCS. In one or more implementations, when STA1 receives the downlink frame (e.g., Frame 1), STA1 measures the received power based on the legacy preamble of the downlink frame from STA2 (e.g., $RSSI_{STA2@STA1}$). STA3 may initiate an SR transmission associated with STA3 based on the SRP and the measured received power at STA3 (e.g., $RSSI_{STA2@STA3}$). For example, STA3 may initiate an SR transmission when the estimated transmit power at STA3 is less than a difference between the SRP and the measured received power at STA3 (e.g., $RSSI_{STA1@STA3}$). In other words, an SR transmission is initiated when TX Power$_{STA3}$<SRP−$RSSI_{STA2@STA3}$, where $RSSI_{STA2@STA3}$ represents the received power based on a legacy preamble of the downlink frame of STA2 measured at STA3).

In one or more implementations (which may be referred to as "E20" simply for convenience and in connection with, for example, FIGS. 19A and 19B), early detection of a frame (e.g., HE frame, PPDU, HE extended range SU PPDU) for spatial reuse is based on a received power measured based on a legacy preamble portion of (e.g., L-STF or L-LTF) the frame and a spatial reuse parameter associated with an OBSS STA when a station (e.g., STA3) considers a CCA-OA based procedure for initiating an SR transmission.

In this example, STA2 (e.g., AP) transmits a trigger frame (e.g., over a downlink transmission) to solicit a response from STA1. STA1 transmits an UL trigger-based frame (e.g., UL MU PPDU) in response to the trigger frame received from STA2. Meanwhile, STA3 receives the trigger frame and the UL trigger-based frame respectively from STA2 and STA1 as OBSS frames. STA3 may determine whether the frames from STA1 and STA2 are inter-BSS (or OBSS) frames based on color information or MAC address information. In assessing whether STA3 can initiate an SR transmission, STA3 determines whether the SR transmission causes any severe interference to STA2 when STA2 receives the UL trigger-based frame. In one or more implementations. STA3 uses two values 1) $RSSI_{STA2@STA3}$ and 2) spatial reuse parameter (SRP) to adjust a transmit power at STA3. These values facilitate STA3 for satisfying SR conditions that may avoid signal interference at STA2.

When STA3 receives the trigger frame, STA3 measures a received power based on the legacy preamble of the received trigger frame (e.g., $RSSI_{STA2@STA3}$). $RSSI_{STA2@STA3}$ is a received power based on a legacy preamble of the received trigger frame of STA2 measured at STA3. STA3 may determine whether the received trigger frame is an HE extended range SU PPDU, where power of the L-STF/L-LTF symbols is boosted by a predetermined value (e.g., 3 dB). When the trigger frame is an HE extended range SU PPDU, STA3 adjusts the received power ($RSSI_{STA2@STA3}$) measured based on the legacy preamble by decreasing the received power by the predetermined value to compensate for a power boost factor.

STA3 may receive the SRP in the HE-SIG-A field of the UL trigger-based frame. The SRP from the UL trigger-based frame may correspond to an SRP in the HE-SIG-A field of the trigger frame. In one example, STA1 copies and pastes the SRP in the HE-SIG-A field of the trigger frame into the SRP in the HE-SIG-A field of the UL trigger-based frame. In one or more implementations, the SRP is a function of a transmit power at STA2 (e.g., $TXPWR_{STA2}$) plus an acceptable receiver interference level at STA2. STA3 may initiate an SR transmission associated with STA3 based on the SRP and the adjusted received power (e.g., adjusted $RSSI_{STA2@STA3}$). For example, STA3 may initiate an SR transmission when the estimated transmit power at STA3 is less than a difference between the SRP and the adjusted received power at STA3 (e.g., TX Power$_{STA3}$<SRP−adjusted $RSSI_{STA2@STA3}$).

In one or more implementations (which may be referred to as "E21" simply for convenience and in connection with, for example, FIGS. 20A and 20B), early detection of a frame (e.g., HE frame, PPDU, HE extended range SU PPDU) for spatial reuse is based on a received power measured based on a legacy preamble portion of (e.g., L-STF or L-LTF) the frame and a spatial reuse parameter associated with an OBSS STA when a station (e.g., STA3) considers a CCA-OA based procedure for initiating an SR transmission.

In this example, STA2 (e.g., AP) transmits a downlink frame (e.g., Frame 1) over a downlink transmission to solicit a response from STA1. STA1 transmits an uplink frame (e.g., Frame 2) in an uplink transmission based on the downlink frame. In one or more implementations, the uplink frame from STA1 is not in response to the downlink frame from STA2 such that one or more frames may be transmitted between the downlink frame (e.g., Frame 1) and the uplink frame (e.g., Frame 2). Meanwhile, STA3 receives the downlink frame and the uplink frame respectively from STA2 and STA1 as OBSS frames. STA3 may determine whether the frames from STA1 and STA2 are inter-BSS (or OBSS) frames based on color information or MAC address information. In assessing whether STA3 can initiate an SR transmission, STA3 determines whether the SR transmission causes any severe interference to STA2 when STA2 receives the uplink frame. In one or more implementations, STA3 uses two values 1) $RSSI_{STA2@STA3}$ and 2) SRP to adjust a transmit power at STA3. These values facilitate STA3 for satisfying SR conditions that may avoid signal interference at STA2.

When STA3 receives the downlink frame, STA3 measures a received power based on the legacy preamble of the received downlink frame (e.g., $RSSI_{STA2@STA3}$). $RSSI_{STA2@STA3}$ is a received power based on a legacy preamble of the downlink frame of STA2 measured at STA3. STA3 may determine whether the received downlink frame is an HE extended range SU PPDU, where power of the L-STF/L-LTF symbols is boosted by a predetermined value (e.g., 3 dB). When the downlink frame is an HE extended range SU PPDU, STA3 adjusts the received power ($RSSI_{STA2@STA3}$) by decreasing the received power by the predetermined value to compensate for a power boost factor.

STA3 may receive the SRP in the HE-SIG-A field of the uplink frame. In one or more implementations, the SRP is a function of a transmit power at STA1 (e.g., $TXPWR_{STA1}$), a received power based on a legacy preamble of the received downlink frame of STA2 measured at STA1 (e.g. $RSSI_{STA2@STA1}$), and a signal-to-noise ratio (SNR) margin. For example, the SRP is TX $PWR_{STA1}$ plus $RSSI_{STA2@STA1}$ minus SNR margin (i.e., SRP=TX $PWR_{STA1}$+$RSSI_{STA2@STA1}$−SNR margin). In one or more implementations, the SNR margin refers to the required SNR margin as a function of MCS. In one or more implementations, when STA1 receives the downlink frame (e.g., Frame 1), STA1 measures the received power based on the legacy preamble of the downlink frame from STA2 (e.g., $RSSI_{STA2@STA1}$). STA3 may initiate an SR transmission associated with STA3 based on the SRP and the adjusted received power (e.g., adjusted $RSSI_{STA2@STA3}$). For example, STA3 may initiate an SR transmission when the estimated transmit power at STA3 is less than a difference between the SRP and the adjusted received power (e.g., adjusted $RSSI_{STA2@STA3}$). In other words, an SR transmission is initiated TX Power$_{STA3}$<SRP−adjusted $RSSI_{STA2@STA3}$.

In one or more implementations (which may be referred to as "E22" simply for convenience and in connection with, for example, FIGS. 20A and 20B), early detection of a frame (e.g., HE frame, PPDU, HE extended range SU PPDU) for spatial reuse is based on a received power measured based on a legacy preamble portion of (e.g., L-STF or L-LTF) the frame and a spatial reuse parameter associated with an OBSS STA when a station (e.g., STA3) considers a CCA-OA based procedure for initiating an SR transmission.

In this example, STA2 (e.g., AP) transmits a downlink frame (e.g., Frame 1) over a downlink transmission to solicit a response from STA1. STA transmits an uplink frame (e.g., Frame 2) in an uplink transmission based on the downlink frame. In one or more implementations, the uplink frame from STA1 is not in response to the downlink frame from STA2 such that one or more frames may be transmitted between the downlink frame (e.g., Frame 1) and the uplink frame (e.g., Frame 2).

When STA1 receives the downlink frame, STA1 measures a received power based on the legacy preamble of the received downlink frame (e.g., $RSSI_{STA2\#STA1}$). $RSSI_{STA2@STA1}$ is a received power based on a legacy preamble of the downlink frame of STA2 measured at STA1. STA1 determines whether the received downlink frame is an HE extended range SU PPDU, where power of the L-STF/L-LTF symbols is boosted by a predetermined value (e.g., 3 dB). When the downlink frame is an HE extended range SU PPDU. STA1 adjusts the received power (e.g., $RSSI_{STA2@STA1}$) by decreasing the received power by the predetermined value to compensate for a power boost factor. In this respect, STA1 can determine the SRP since the SRP may be a function of a transmit power at STA1 (e.g., $TXPWR_{STA1}$) plus the adjusted received power at STA1 based on the downlink frame from STA2 (e.g., adjusted $RSSI_{STA2@STA1}$), minus a SNR margin. That is: SRP=TX $PWR_{STA1}$+adjusted $RSSI_{STA2@STA1}$−SNR margin. The SNR margin may refer to the required SNR margin as a function of MCS. The determined SRP may be placed into the uplink frame by STA1.

Meanwhile, STA3 receives the downlink frame and the uplink frame respectively from STA2 and STA1 as OBSS frames. STA3 may determine whether the frames from STA1 and STA2 are inter-BSS (or OBSS) frames based on color information or MAC address information. In assessing whether STA3 can initiate an SR transmission, STA3 determines whether the SR transmission causes any severe interference to STA2 when STA2 receives the uplink frame. In one or more implementations, STA3 uses two values 1) $RSSI_{STA2\#STA3}$ and 2) SRP to adjust a transmit power at STA3. These values facilitate STA3 for satisfying SR conditions that may avoid signal interference at STA2.

In one or more implementations (which may be referred to as "E23" simply for convenience and in connection with, for example, FIGS. 20A and 20B), early detection of a frame (e.g., HE frame. PPDU, HE extended range SU PPDU) for spatial reuse is based on a received power measured based on a legacy preamble portion of (e.g., L-STF or L-LTF) the frame and a spatial reuse parameter associated with an OBSS STA when a station (e.g., STA3) considers a CCA-OA based procedure for initiating an SR transmission.

In this example, STA2 (e.g., AP) transmits a downlink frame (e.g., Frame 1) over a downlink transmission to solicit a response from STA1. STA1 transmits an uplink frame (e.g., Frame 2) in an uplink transmission based on the downlink frame. In one or more implementations, the uplink frame from STA1 is not in response to the downlink frame from STA2 such that one or more frames may be transmitted between the downlink frame (e.g., Frame 1) and the uplink frame (e.g., Frame 2).

When STA1 receives the downlink frame, STA1 measures a received power based on the legacy preamble of the received downlink frame (e.g., $RSSI_{STA2@STA1}$). $RSSI_{STA22@STA1}$ is a received power based on a legacy preamble of the downlink frame of STA2 measured at STA1. STA1 determines whether the received downlink frame is an HE extended range SU PPDU, where power of the L-STF/L-LTF symbols is boosted by a predetermined value (e.g., 3 dB). When the downlink frame is an HE extended range SU PPDU, STA1 adjusts the received power (e.g., $RSSI_{STA2@STA1}$) by decreasing the received power by the predetermined value to compensate for a power boost factor. In this respect, STA1 can determine the SRP since the SRP may be a function of a transmit power at STA1 (e.g., $TXPWR_{STA1}$) plus the adjusted received power at STA1 based on the downlink frame from STA2 (e.g., adjusted $RSSI_{STA2@STA1}$), minus a SNR margin in some embodiments. That is: SRP=TX $PWR_{STA1}$+adjusted $RSSI_{STA2@STA1}$−SNR margin. The SNR margin may refer to the required SNR margin as a function of MCS. The determined SRP may be placed into the uplink frame by STA1.

Meanwhile, STA3 receives the downlink frame and the uplink frame respectively from STA2 and STA1 as OBSS frames. STA3 may determine whether the frames from STA1 and STA2 are inter-BSS (or OBSS) frames based on color information or MAC address information. In assessing whether STA3 can initiate an SR transmission, STA3 determines whether the SR transmission causes any severe interference to STA2 when STA2 receives the uplink frame. In one or more implementations, STA3 uses two values 1) $RSSI_{STA2\#STA3}$ and 2) SRP to adjust a transmit power at STA3. These values facilitate STA3 for satisfying SR conditions that may avoid signal interference at STA2.

When STA3 receives the downlink frame, STA3 measures a received power based on the legacy preamble of the received downlink frame (e.g., $RSSI_{STA2@STA3}$). $RSSI_{STA2@STA3}$ is a received power based on a legacy preamble of the downlink frame of STA2 measured at STA3. STA3 may determine whether the received downlink frame is an HE extended range SU PPDU, where power of the L-STF/L-LTF symbols is boosted by a predetermined value (e.g., 3 dB). When the downlink frame is an HE extended range SU PPDU, STA3 adjusts the received power (e.g., $RSSI_{STA2@STA3}$) by decreasing the received power by the predetermined value to compensate for a power boost factor.

STA3 may receive the SRP in the HE-SIG-A field of the uplink frame. STA3 may initiate an SR transmission associated with STA3 based on the SRP and the adjusted received power (e.g., adjusted $RSSI_{STA2@STA3}$). For example, STA3 may initiate an SR transmission when the estimated transmit power at STA3 is less than a difference between the SRP and the adjusted received power (e.g., adjusted $RSSI_{STA2@STA3}$). In other words, an SR transmission is initiated when TX $Power_{STA3}$<SRP−adjusted $RSSI_{STA2@STA3}$.

In one or more implementations (which may be referred to as "E24" simply for convenience and in connection with, for example, FIGS. 20A and 20B), early detection of a frame (e.g., HE frame, PPDU, HE extended range SU PPDU) for spatial reuse is based on a received power measured based on a legacy preamble portion of (e.g., L-STF or L-LTF) the frame and a spatial reuse parameter associated with an OBSS STA when a station (e.g., STA3) considers a CCA-OA based procedure for initiating an SR transmission.

When STA2 receives a frame (e.g., Frame 2), STA2 measures a received power based on the legacy preamble of the received frame (e.g., $RSSI_{STA1@STA2}$). STA2 may determine whether the received frame is an HE extended range SU PPDU, where power of the L-STF/L-LTF symbols is boosted by a predetermined value (e.g., K dB, which may be 3 dB). When the frame is an HE extended range SU PPDU, STA2 adjusts the received power (e.g., $RSSI_{STA1@STA2}$) by decreasing the received power by the predetermined value.

Similarly, when STA3 receives a frame, STA3 measures a received power based on a legacy preamble of the received frame (e.g., $RSSI_{STA2@STA3}$). STA3 may determine whether the received frame is an HE extended range SU PPDU, where power of the L-STF/L-LTF symbols is boosted by a predetermined value (e.g., K dB, which may be 3 dB). When the frame is an HE extended range SU PPDU, STA3 adjusts the received power (e.g., $RSSI_{STA2@STA3}$) by decreasing the received power by the predetermined value.

Considering the SR conditions, while a received power (e.g., RSSI) is measured based on the legacy preamble of a frame with an HE PPDU format, there is no rule on a legacy PPDU with a VHT PPDU format, in which the legacy PPDU is identified as an OBSS frame (or inter-BSS frame) based on a MAC address in a PSDU.

In one or more implementations, the PHY includes the most recently measured RSSI value in the PHY-RX-START.indication (e.g., RXVECTOR) primitive issued to the MAC when it starts decoding the PSDU. After identifying the frame as an OBSS frame, where the MAC address of the frame does not match to its BSS identifier (BSSID), the RSSI is measured based on a non-legacy preamble (e.g., VHT-LTF symbols). The measured RSSI based on the non-legacy preamble is likely to be different from the measured RSSI based on the legacy preamble (e.g., L-LTF).

In one or more implementations (which may be referred to as "E25" simply for convenience and in connection with, for example, FIGS. 19A and 19B or FIGS. 20A and 20B), early detection of a frame (e.g., VHT frame, HE frame, PPDU, HE extended range SU PPDU) for spatial reuse is based on a received power measured when a station (e.g., STA3) considers initiating an SR transmission.

When a station (e.g., STA3) receives a frame with an HE PPDU format, which is identified as an OBSS frame based on color information (e.g., color bits) in the HE-SIG-A field, the received power (e.g., RSSI) that is measured based on the legacy preamble is issued to the MAC for processing.

Similarly when a station (e.g., STA3) receives a frame with a legacy PPDU format, which is identified as an OBSS frame based on a MAC address in the PSDU, the received power (e.g., RSSI) that is measured based on the legacy preamble is issued to the MAC for processing. In one or more implementations, the received power that is measured based on the non-legacy preamble (e.g., HT-LTFs, VHT-LTFs) is filtered out and not issued to the MAC for processing.

Figures 21A, 21B:
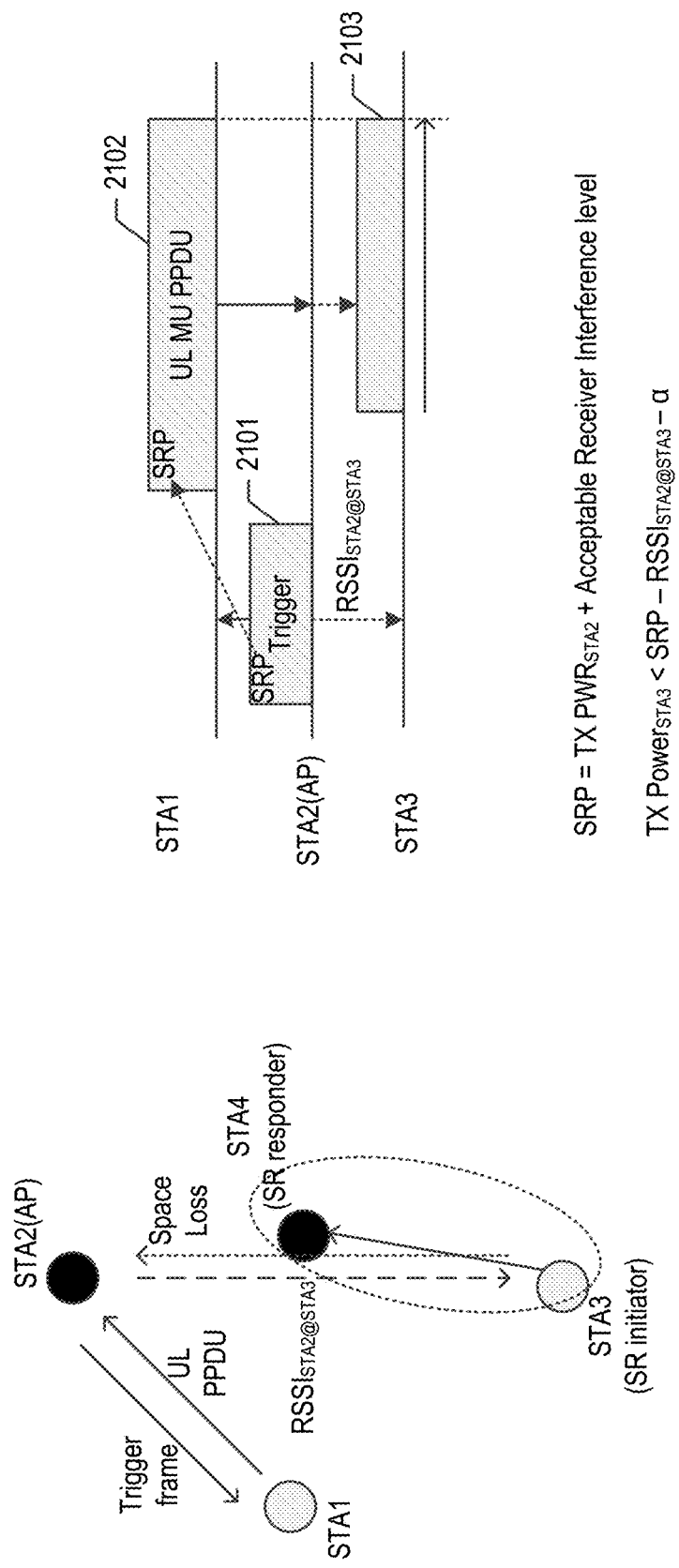
FIGS. 21A through 21D illustrate an example of detecting an overlapping basic service set (OBSS) frame when beamforming is applied for spatial reuse.
Figures 21C, 21D:
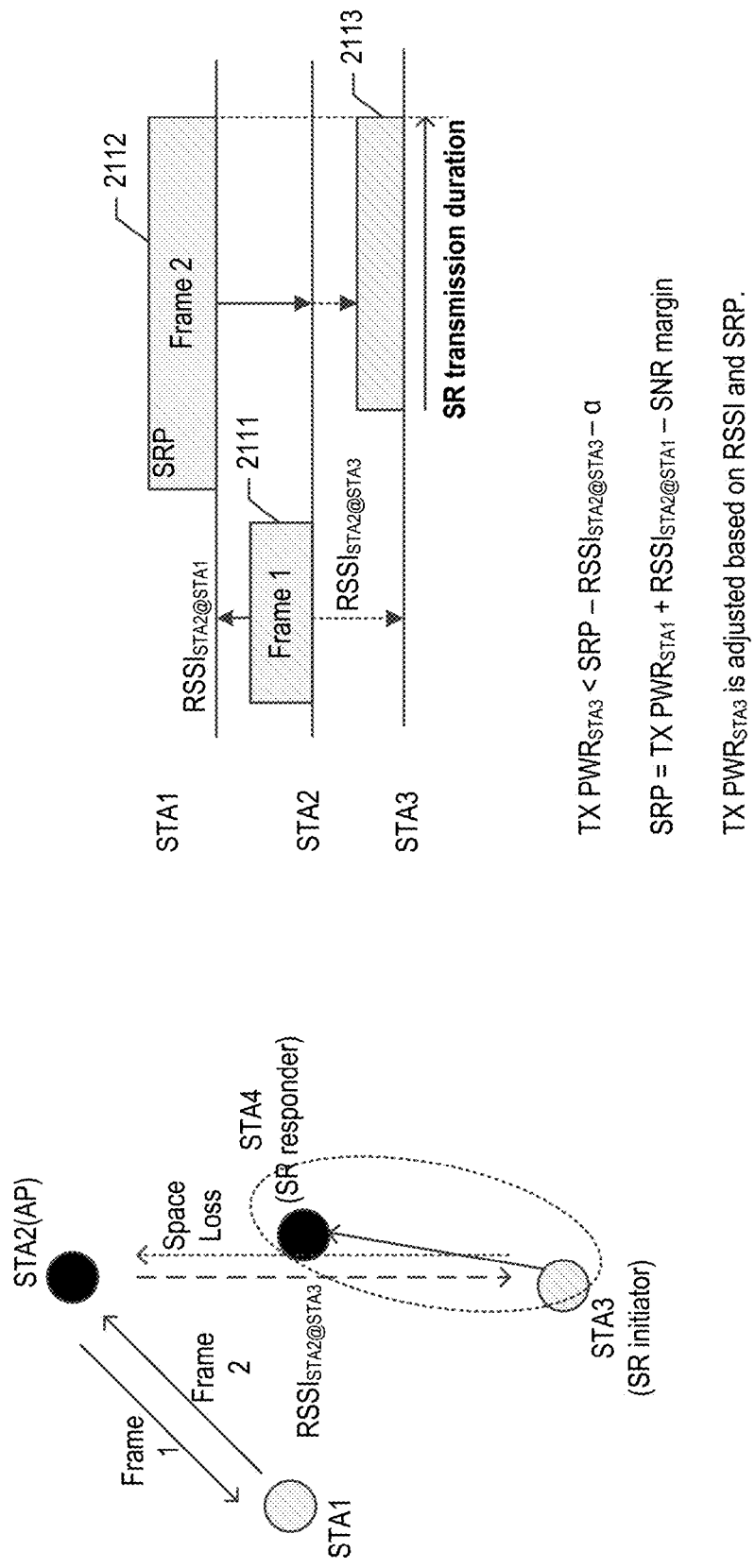

FIGS. 21A through 21D illustrate examples of early detection of an overlapping basic service set (OBSS) frame when beamforming is applied for spatial reuse. In FIG. 21A, a transmitter (e.g., STA1) sends an uplink frame (e.g., UL trigger-based PPDU) to a receiver (e.g., STA2). Under one or more SR transmission rules in the IEEE 802.11ax specification, when an SR STA initiator (e.g., STA3) receives an inter-BSS PPDU (e.g., OBSS frame), STA3 measures the received power (e.g., RSSI) based on the legacy portion of the inter-BSS PPDU to consider the condition that allows an SR transmission to be initiated during a given time duration.

In meeting the one or more SR conditions, the SR STA initiator (e.g., STA3) determines to transmit an SR PPDU that is beamformed to a direction targeting an SR STA responder (e.g., STA4). As illustrated in FIGS. 20A and 20C, the beam direction is formed in the direction of STA2. In this respect, if STA4 happens to be located near the receiver (e.g., STA2), the beamformed SR PPDU may give off an unexpected interference at STA2 when STA2 receives the beamformed SR PPDU, because STA2 did not take into consideration the beamforming effect from the SR STA initiator (e.g., STA3). Moreover, it may be difficult for the station (e.g., STA3) to estimate the channel condition to the receiver (e.g., STA2) in order for the station (e.g., STA2) to avoid additional interference due to beamforming. In this respect, it may be difficult for STA3 to estimate the actual beamforming gain toward STA2.

To address this beamforming effect, determining a transmission power from an SR STA initiator is described in the present disclosure. In one or more implementations, when an SR STA initiator (e.g., STA3) intends to transmit a set of frames to a target receiver (e.g., STA4) utilizing SR transmission procedures, the SR STA initiator may consider the estimated beamforming gain when the SR STA initiator calculates the allowed transmission power during the SR transmission. For example, the estimated beamforming gain is the estimated beamforming gain toward the target receiver.

In one or more implementations (which may be referred to as "E25a" simply for convenience and in connection with, for example, FIGS. 21A and 21B), early detection of a frame (e.g., HE frame, PPDU, HE extended range SU PPDU) for spatial reuse is based on a received power measured based on a legacy preamble portion (e.g., L-STF or L-LTF) of the frame and a spatial reuse parameter associated with an OBSS STA when a station (e.g., STA3) considers a CCA-OA based procedure for initiating an SR transmission when beamforming is applied.

In this example, STA2 (e.g., AP) transmits a trigger frame (e.g., over a downlink transmission) to solicit a response from STA1. STA1 transmits an UL trigger-based frame (e.g., UL MU PPDU) in response to the trigger frame received from STA2. Meanwhile, STA3 receives the trigger frame and the UL trigger-based frame respectively from STA2 and STA1 as OBSS frames. STA3 may determine whether the frames from STA1 and STA2 are inter-BSS (or OBSS) frames based on color information or MAC address information. In assessing whether STA3 can initiate an SR transmission, STA3 determines whether the SR transmission causes any severe interference to STA2 when STA2 receives the UL trigger-based frame. In one or more implementations, STA3 uses three values 1) $RSSI_{STA2@STA3}$, 2) SRP to adjust a transmit power at STA3, and 3) α corresponding to a value of beamforming gain to adjust a transmit power at STA3. These values facilitate STA3 for satisfying SR conditions that may avoid signal interference at STA2.

When STA3 receives the trigger frame, STA3 measures a received power based on the legacy preamble of the received trigger frame (e.g., $RSSI_{STA2@STA3}$). $RSSI_{STA2@STA3}$ is a received power based on a legacy preamble of the trigger frame of STA2 measured at STA3. STA3 may determine whether the received trigger frame is an HE extended range SU PPDU, where power of the L-STF/L-LTF symbols is boosted by a predetermined value (e.g., 3 dB). When the trigger frame is an HE extended range SU PPDU, STA3 adjusts the received power (e.g., $RSSI_{STA2@STA3}$) by decreasing the received power by the predetermined value to compensate for a power boost factor.

STA3 may receive the SRP in the HE-SIG-A field of the UL trigger-based frame. The SRP from the UL trigger-based frame may correspond to an SRP in the HE-SIG-A field of the trigger frame. In one example, STA1 copies and pastes the SRP in the HE-SIG-A field of the trigger frame into the SRP in the HE-SIG-A field of the UL trigger-based frame. In one or more implementations, the SRP is a function of a transmit power at STA2 (e.g., $TXPWR_{STA2}$) plus an acceptable receiver interference level at STA2. STA3 may initiate an SR transmission associated with STA3 based on the SRP and the adjusted received power (e.g., adjusted $RSSI_{STA2@STA3}$). For example, STA3 may initiate an SR transmission when the estimated transmit power at STA3 is less than a difference between the SRP and the sum of the adjusted received power at STA3 and the α value (e.g., TX $Power_{STA3}$<SRP-adjusted $RSSI_{STA2@STA3}$−α, where α is set to a non-zero value when the SR PPDU from STA3 is beamformed, where α is set to a non-zero value that refers to the estimated beamforming gain to the SR STA responder, and where α is set to a non-zero value that refers to the estimated maximum beamforming gain that the SR STA initiator can have during the SR transmission).

In one or more implementations (which may be referred to as "E21a" simply for convenience and in connection with, for example, FIGS. 20A and 20B), early detection of a frame (e.g., HE frame, PPDU. HE extended range SU PPDU) for spatial reuse is based on a received power measured based on a legacy preamble portion (e.g., L-STF or L-LTF) of the frame and a spatial reuse parameter associated with an OBSS STA when a station (e.g., STA3) considers a CCA-OA based procedure for initiating an SR transmission when beamforming is applied.

In this example, STA2 (e.g., AP) transmits a downlink frame (e.g., Frame 1) over a downlink transmission to solicit a response from STA1. STA1 transmits an uplink frame (e.g., Frame 2) in an uplink transmission based on the downlink frame. In one or more implementations, the uplink frame from STA1 is not in response to the downlink frame from STA2 such that one or more frames may be transmitted between the downlink frame (e.g., Frame 1) and the uplink frame (e.g., Frame 2). Meanwhile, STA3 receives the downlink frame and the uplink frame respectively from STA2 and STA1 as OBSS frames. STA3 may determine whether the frames from STA1 and STA2 are inter-BSS (or OBSS) frames based on color information or MAC address information. In assessing whether STA3 can initiate an SR transmission, STA3 determines whether the SR transmission causes any severe interference to STA2 when STA2 receives the uplink frame. In one or more implementations, STA3 uses three values as 1) $RSSI_{STA2@STA3}$, 2) SRP to adjust a transmit power at STA3, and 3) α corresponding to α value of beamforming gain to adjust a transmit power at STA3. These values facilitate STA3 for satisfying SR conditions that may avoid signal interference at STA2.

When STA3 receives the downlink frame, STA3 measures a received power based on the legacy preamble of the received downlink frame (e.g., $RSSI_{STA2@STA3}$). $RSSI_{STA2@STA3}$ is a received power based on a legacy preamble of the downlink frame of STA2 measured at STA3. STA3 may determine whether the received downlink frame is an HE extended range SU PPDU, where power of the L-STF/L-LTF symbols is boosted by a predetermined value (e.g., 3 dB). When the downlink frame is an HE extended range SU PPDU, STA3 adjusts the received power (e.g., $RSSI_{STA2@STA3}$) by decreasing the received power by the predetermined value to compensate for a power boost factor.

STA3 may receive the SRP in the HE-SIG-A field of the uplink frame. In one or more implementations, the SRP is a function of a transmit power at STA1 (e.g., $TXPWR_{STA1}$), a received power based on a legacy preamble of the received downlink frame of STA2 measured at STA1 (e.g., $RSSI_{STA2@STA1}$), and an SNR margin. For example, the SRP is TX $PWR_{STA1}$ plus $RSSI_{STA2@STA1}$ minus SNR margin (i.e., SRP=TX $PWR_{STA1}$+$RSSI_{STA2@STA1}$−SNR margin). In one or more implementations, the SNR margin refers to the required SNR margin as a function of MCS. In one or more implementations, when STA1 receives the downlink frame (e.g., Frame 1), STA1 measures the received power measured based on the legacy preamble of the downlink frame (e.g., $RSSI_{STA2@STA1}$). STA3 may initiate an SR transmission associated with STA3 based on the SRP, the adjusted received power (e.g., adjusted $RSSI_{STA2@STA3}$), and the α value. For example, STA3 may initiate an SR transmission when the estimated transmit power at STA3 is less than a difference between the SRP and the sum of the adjusted received power and the α value (e.g., TX $Power_{STA3}$<SRP-adjusted $RSSI_{STA2@STA3}$−α, where α is set to a non-zero value when the SR PPDU from STA3 is beamformed, where α is set to a non-zero value that refers to the estimated beamforming gain to the SR STA responder, and where α is set to a non-zero value that refers to the estimated maximum beamforming gain that the SR STA initiator can have during the SR transmission).

In one or more implementations (which may be referred to as "E22a" simply for convenience and in connection with, for example, FIGS. 20A and 20B), early detection of a frame (e.g., HE frame. PPDU, HE extended range SU PPDU) for spatial reuse is based on a received power measured based on a legacy preamble portion (e.g., L-STF or L-LTF) of the frame and a spatial reuse parameter associated with an OBSS STA when a station (e.g., STA3) considers a CCA-OA based procedure for initiating an SR transmission when beamforming is applied.

In this example, STA2 (e.g., AP) transmits a downlink frame (e.g., Frame 1) over a downlink transmission to solicit a response from STA1. STA1 transmits an uplink frame (e.g., Frame 2) in an uplink transmission based on the downlink frame. In one or more implementations, the uplink frame from STA1 is not in response to the downlink frame from STA2 such that one or more frames may be transmitted between the downlink frame (e.g., Frame 1) and the uplink frame (e.g., Frame 2).

When STA1 receives the downlink frame. STA1 measures a received power based on the legacy preamble of the received downlink frame (e.g., $RSSI_{STA2@STA1}$). $RSSI_{STA22@STA1}$ is a received power based on a legacy preamble of the downlink frame of STA2 measured at STA1. STA1 determines whether the received downlink frame is an HE extended range SU PPDU, where power of the L-STF/L-LTF symbols is boosted by a predetermined value (e.g., 3 dB). When the downlink frame is an HE extended range SU PPDU, STA1 adjusts the received power (e.g., $RSSI_{STA2@STA1}$) by decreasing the received power by the predetermined value to compensate for a power boost factor. In this respect, STA can determine the SRP since the SRP may be a function of a transmit power at STA1 (e.g., $TXPWR_{STA1}$) plus the adjusted received power (e.g., adjusted $RSSI_{STA2@STA1}$), minus a SNR margin. That is: SRP=TX $PWR_{STA1}$+adjusted $RSSI_{STA2}@_{STA1}$−SNR margin. The SNR margin may refer to the required SNR margin as a function of MCS. The determined SRP may be added into the uplink frame by STA1.

Meanwhile, STA3 receives the downlink frame and the uplink frame respectively from STA2 and STA1 as OBSS frames. STA3 may determine whether the frames from STA1 and STA2 are inter-BSS (or OBSS) frames based on color information or MAC address information. In assessing whether STA3 can initiate an SR transmission, STA3 determines whether the SR transmission causes any severe interference to STA2 when STA2 receives the uplink frame. In one or more implementations, STA3 uses three values as 1)

$RSSI_{STA2@STA3}$, 2) SRP to adjust a transmit power at STA3, and 3) α corresponding to a value of beamforming gain to adjust a transmit power at STA3, where α is set to a non-zero value when the SR PPDU from STA3 is beamformed, where α is set to a non-zero value that refers to the estimated beamforming gain to the SR STA responder, and where α is set to a non-zero value that refers to the estimated maximum beamforming gain that the SR STA initiator can have during the SR transmission. These values facilitate STA3 for satisfying SR conditions that may avoid signal interference at STA2.

In one or more implementations (which may be referred to as "E23a" simply for convenience and in connection with, for example, FIGS. 20A and 20B), early detection of a frame (e.g., HE frame, PPDU, HE extended range SU PPDU) for spatial reuse is based on a received power measured based on a legacy preamble portion (e.g., L-STF or L-LTF) of the frame and a spatial reuse parameter associated with an OBSS STA when a station (e.g., STA3) considers a CCA-OA based procedure for initiating an SR transmission when beamforming is applied.

In this example, STA2 (e.g., AP) transmits a downlink frame (e.g., Frame 1) over a downlink transmission to solicit a response from STA1. STA1 transmits an uplink frame (e.g., Frame 2) in an uplink transmission based on the downlink frame. In one or more implementations, the uplink frame from STA1 is not in response to the downlink frame from STA2 such that one or more frames may be transmitted between the downlink frame (e.g., Frame 1) and the uplink frame (e.g., Frame 2).

When STA1 receives the downlink frame, STA1 measures a received power based on the legacy preamble of the received downlink frame (e.g., $RSSI_{STA2@STA1}$). $RSSI_{STA2@STA1}$ is a received power based on a legacy preamble of the downlink frame of STA2 measured at STA1. STA1 determines whether the received downlink frame is an HE extended range SU PPDU, where power of the L-STF/L-LTF symbols is boosted by a predetermined value (e.g., 3 dB). When the downlink frame is an HE extended range SU PPDU, STA1 adjusts the received power (e.g., $RSSI_{STA2@STA1}$) by decreasing the received power by the predetermined value to compensate for a power boost factor. In this respect, STA1 can determine the SRP since the SRP may be a function of a transmit power at STA1 (e.g., $TXPWR_{STA1}$) plus the adjusted received power at STA1 based on the downlink frame from STA2 (e.g., adjusted $RSSI_{STA2@STA1}$), minus an SNR margin in some embodiments. The SNR margin may refer to the required SNR margin as a function of MCS. The determined SRP may be added into the uplink frame by STA1.

Meanwhile, STA3 receives the downlink frame and the uplink frame respectively from STA2 and STA1 as OBSS frames. STA3 may determine whether the frames from STA1 and STA2 are inter-BSS (or OBSS) frames based on color information or MAC address information. In assessing whether STA3 can initiate an SR transmission, STA3 determines whether the SR transmission causes any severe interference to STA2 when STA2 receives the uplink frame. In one or more implementations, STA3 uses three values as 1) $RSSI_{STA2@STA3}$, 2) SRP to adjust a transmit power at STA3, and 3) α corresponding to a value of beamforming gain to adjust a transmit power at STA3. These values facilitate STA3 for satisfying SR conditions that may avoid signal interference at STA2.

When STA3 receives the downlink frame. STA3 measures a received power based on the legacy preamble of the received downlink frame (e.g., $RSSI_{STA2@STA3}$). $RSSI_{STA2}$ $@STA3$ is a received power based on a legacy preamble of the downlink frame of STA2 measured at STA3. STA3 may determine whether the received downlink frame is an HE extended range SU PPDU, where power of the L-STF/L-LTF symbols is boosted by a predetermined value (e.g., 3 dB). When the downlink frame is an HE extended range SU PPDU, STA3 adjusts the received power (e.g., $RSSI_{STA2@STA3}$) by decreasing the received power by the predetermined value to compensate for a power boost factor.

STA3 may receive the SRP in the HE-SIG-A field of the uplink frame. STA3 may initiate an SR transmission associated with STA3 based on the SRP, the adjusted received power (e.g., adjusted $RSSI_{STA2@STA3}$) and the α value. For example, STA3 may initiate an SR transmission when the estimated transmit power at STA3 is less than a difference between the SRP and the sum of adjusted received power at STA3 and the α value (e.g., TX $Power_{STA3}$<SRP−adjusted $RSSI_{STA2@STA3}$−α, where α is set to a non-zero value when the SR PPDU from STA3 is beamformed, where α is set to a non-zero value that refers to the estimated beamforming gain to the SR STA responder, and where α is set to a non-zero value that refers to the estimated maximum beamforming gain that the SR STA initiator can have during the SR transmission).

Figure 22B:
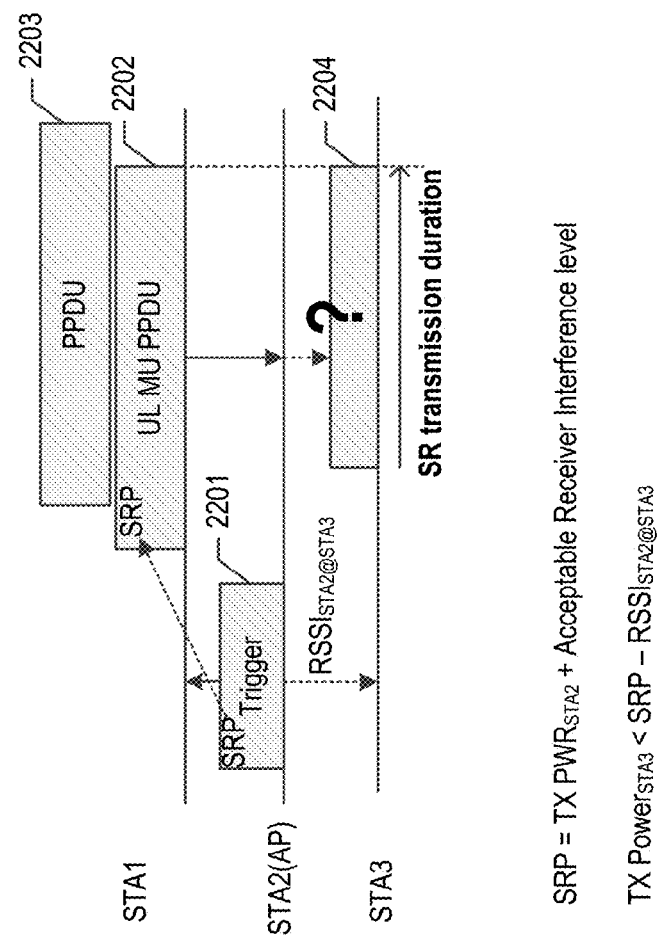
FIGS. 22A and 22B illustrate an example of detecting an overlapping basic service set (OBSS) frame for spatial reuse.
Figure 22A:
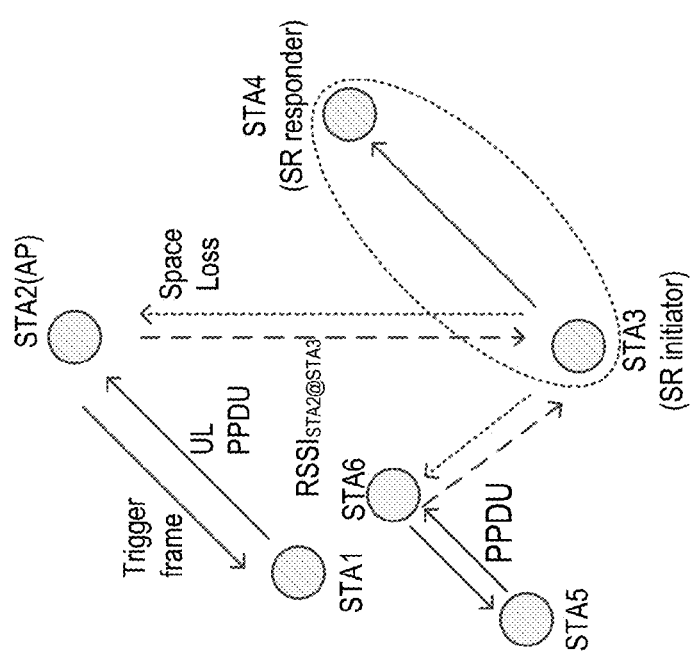

FIGS. 22A and 22B illustrate an example of detecting an overlapping basic service set (OBSS) frame for spatial reuse. In this example, STA2 (e.g., AP) transmits a trigger frame (e.g., 2201) over a downlink transmission to solicit a response from STA1. STA1 transmits an UL trigger-based frame (e.g., UL MU PPDU 2202) in response to the trigger frame received from STA2. Meanwhile, STA3 receives the trigger frame and the UL trigger-based frame respectively from STA2 and STA1 as OBSS frames. STA3 may determine whether the frames from STA1 and STA2 are inter-BSS (or OBSS) frames based on color information or MAC address information. In assessing whether STA3 can initiate an SR transmission (e.g., 2204), STA3 determines whether the SR transmission causes any severe interference to STA2 when STA2 receives the UL trigger-based frame.

However, in dense circumstances, there may exist some cases where an SR STA initiator (e.g., STA3) may receive one or more other PPDU(s), which may be partially overlapped during a DIFS/backoff procedure for an SRP-based SR transmission when the medium condition associated with STA3 indicates an IDLE channel.

In a given time duration during which an SR transmission is allowed to be initiated (or has been initiated) by the SR STA (e.g., STA3), one or more other frames may be received during this time that cause STA3 to reconsider whether to suspend the SR transmission. When the SR STA initiator (e.g., STA3) receives the UL trigger-based PPDU frame (e.g., 2202), STA3 checks the contents of the UL trigger-based PPDU and determines that the UL trigger-based PPDU is an inter-frame. STA3 adjusts a transmit power at STA3 to satisfy one or more SR conditions directed to avoiding signal interference at STA2 (e.g., $TXPower_{STA3}$<SRP−$RSSI_{STA2@STA3}$). During a time that the medium condition indicates an IDLE channel, the start of the another PPDU (e.g., 2203) may be detected. In this respect, it may be unclear how the SR STA initiator (e.g., STA3) behaves. STA3 may initiate another iteration of an SRP-based SR transmission procedure, which would require at least two HE PPDUs to be detected. However, the newly-detected frame (e.g., 2203) may be a legacy frame containing no SRP field, such that initiating another round of the SRP-based SR transmission procedure may consume resources unnecessarily. In some aspects, STA3 may consider an OBSS-PD level based SR transmission, where the measured received power is compared to a predetermined OBSS PD level. Since the transmit power at STA3 is based on the SRP-based PPDU at the time when the other PPDU was detected, the transmit power is likely to be greater than the OBSS PD level, thus complicating the chances for STA3 to be allowed to initiate the SR transmission.

Figure 23B:
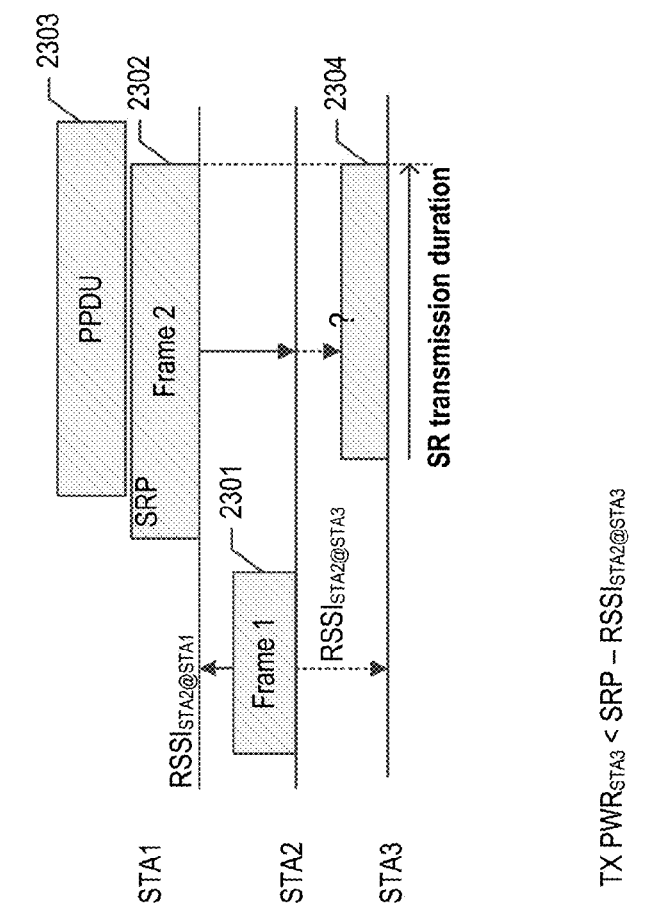
FIGS. 23A and 23B illustrate an example of detecting an overlapping basic service set (OBSS) frame for spatial reuse.
Figure 23A:
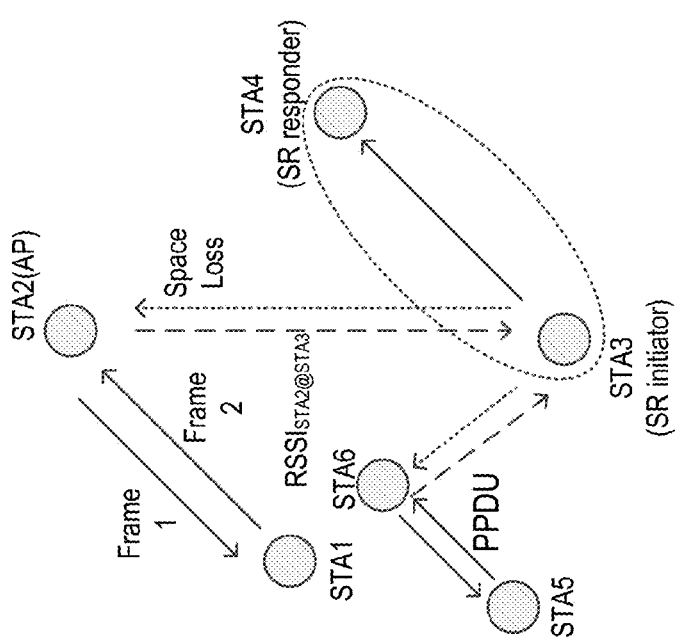

FIGS. 23A and 23B illustrate an example of detecting an overlapping basic service set (OBSS) frame for spatial reuse. The same issues as those discussed in FIGS. 22A and 22B can be observed in FIGS. 23A and 23B, involving a different type of SRP-based SR transmission (e.g., E21).

Figure 24:
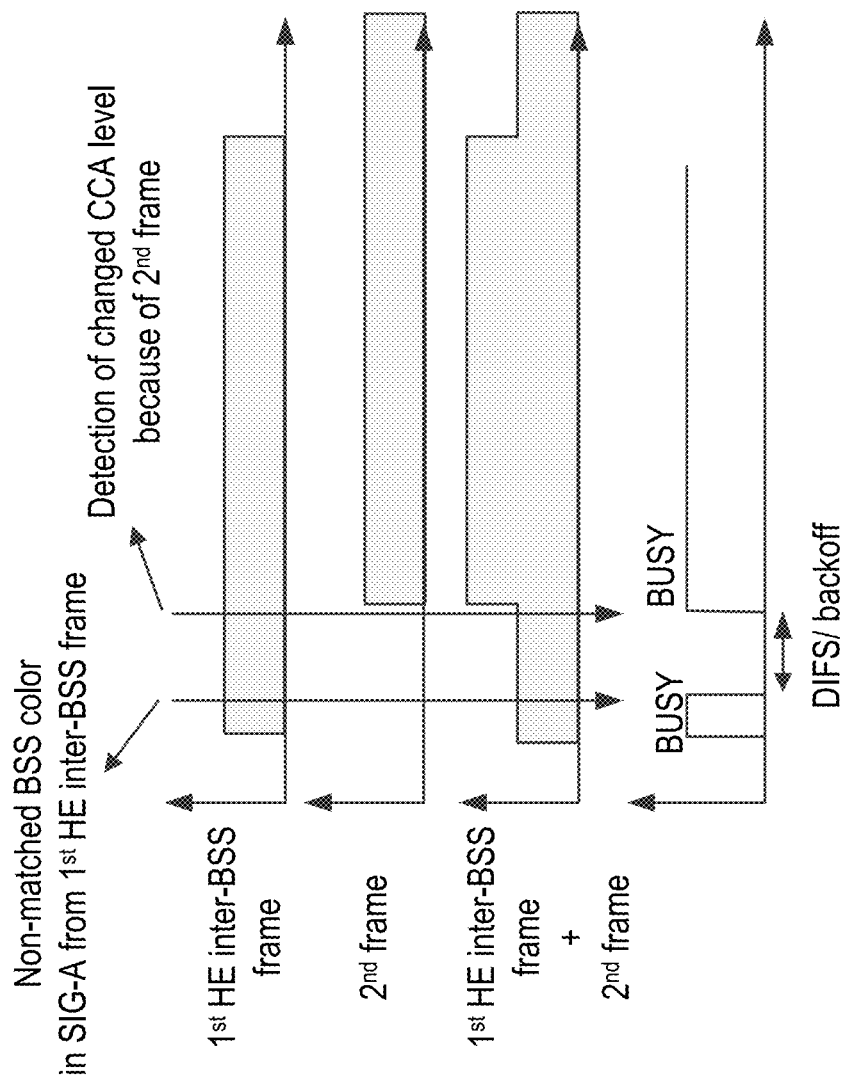
FIG. 24 illustrates an example of detecting an inter-BSS frame during a period for initiating a spatial reuse transmission.

FIG. 24 illustrates an example of detecting an inter-BSS frame during a period for initiating a spatial reuse transmission. In one or more implementations (which may be referred to as "E24" simply for convenience and in connection with, for example, FIGS. 22A and 22B, and FIGS. 23A and 23B), when an SR STA initiator (e.g., STA3) is in a DIFS/backoff procedure after satisfying one or more SRP-based SR transmission conditions, the SR STA initiator may behave as follows when STA3 receives a second frame (i.e., a frame other than the frame sent by STA1 and the frame sent by STA2). For example, a second frame may be a frame 2203 or a frame 2303.

If the SR STA initiator (e.g., STA3) meets any of the following condition(s), then the SR STA initiator stops (or suspends) the SR transmission procedure. In this respect, STA3 indicates that the medium condition is a BUSY channel (i.e., medium condition transitions from an IDLE channel to a BUSY channel), and SR STA initiator (e.g., STA3) stops the backoff countdown (e.g., decrementing backoff slots):

the SR STA initiator detects the start of a valid frame (e.g., the second frame, such as the frame 2203 or 2303, is determined to be an OBSS frame or to originate from another STA (e.g., not STA1 or STA2));

the receive power is increased to be greater than a predetermined threshold (e.g., the sum of the received power of the frame 2202 and the received power of the frame 2203 is greater than a predetermined threshold; or the sum of the received power of the frame 2302 and the received power of the frame 2303 is greater than a predetermined threshold), where the predetermined threshold may be set to an OBSS PD level;

the increased receive power is larger than a predetermined delta value (e.g., the power increase due to the frame 2203 (or 2303) is larger than the predetermined delta value); and/or the received power is increased (e.g., when the frame 2203 or 2303 is received at STA3) (i) before HE-STF of the first HE inter-BSS frame (e.g., the frame 2202 or 2302) or (ii) after HE-LTF of the first HE inter BSS frame, where each of HE-STF and HE-LTF is a region where beamforming gain can be applied.

In one or more implementations (e.g., E24 or other implementations), if the SR STA initiator (e.g., STA3) determines that the estimated packet detect CCA (or measured received power) of the second frame (e.g., the frame 2203 or 2303) is less than the OBSS PD level (e.g., as a condition of an OBSS PD based SR transmission), then SR STA initiator (e.g., STA3) indicates that the medium condition is IDLE, and SR STA initiator (e.g., STA3) resumes (or starts) the backoff countdown process (e.g., decrementing backoff slot values to zero). The estimated packet detect CCA (or received power) may be calculated with the first HE inter-BSS frame (e.g., 2202, 2302) and the overlapped OBSS PD level (e.g., a predetermined threshold). In one or more implementations (e.g., E24 or other implementations), the SR STA initiator (e.g., STA3) follows an OBSS PD based SR transmission rule for SR transmission, where the SR duration may be an SR duration set up based on OA-CCA first, and/or where the SR duration may be a value of a transmission opportunity (TXOP) duration field in the HE-SIG-A field of the first HE inter-BSS frame.

It should be noted that like reference numerals may designate like elements. These components with the same reference numerals have certain characteristics that are the same, but as different figures illustrate different examples, the same reference numeral does not indicate that a component with the same reference numeral has the exact same characteristics. While the same reference numerals are used for certain components, examples of differences with respect to a component are described throughout this disclosure.

The embodiments provided herein have been described with reference to a wireless LAN system, however, it should be understood that these solutions are also applicable to other network environments, such as cellular telecommunication networks, wired networks, etc.

An embodiment of the present disclosure may be an article of manufacture in which a non-transitory machine-readable medium (such as microelectronic memory) has stored thereon instructions which program one or more data processing components (generically referred to here as a "processor" or "processing unit") to perform the operations described herein. In other embodiments, some of these operations may be performed by specific hardware components that contain hardwired logic (e.g., dedicated digital filter blocks and state machines). Those operations may alternatively be performed by any combination of programmed data processing components and fixed hardwired circuit components.

In some cases, an embodiment of the present disclosure may be an apparatus (e.g., an AP STA, a non-AP STA, or another network or computing device) that includes one or more hardware and software logic structure for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

Figure 25A:
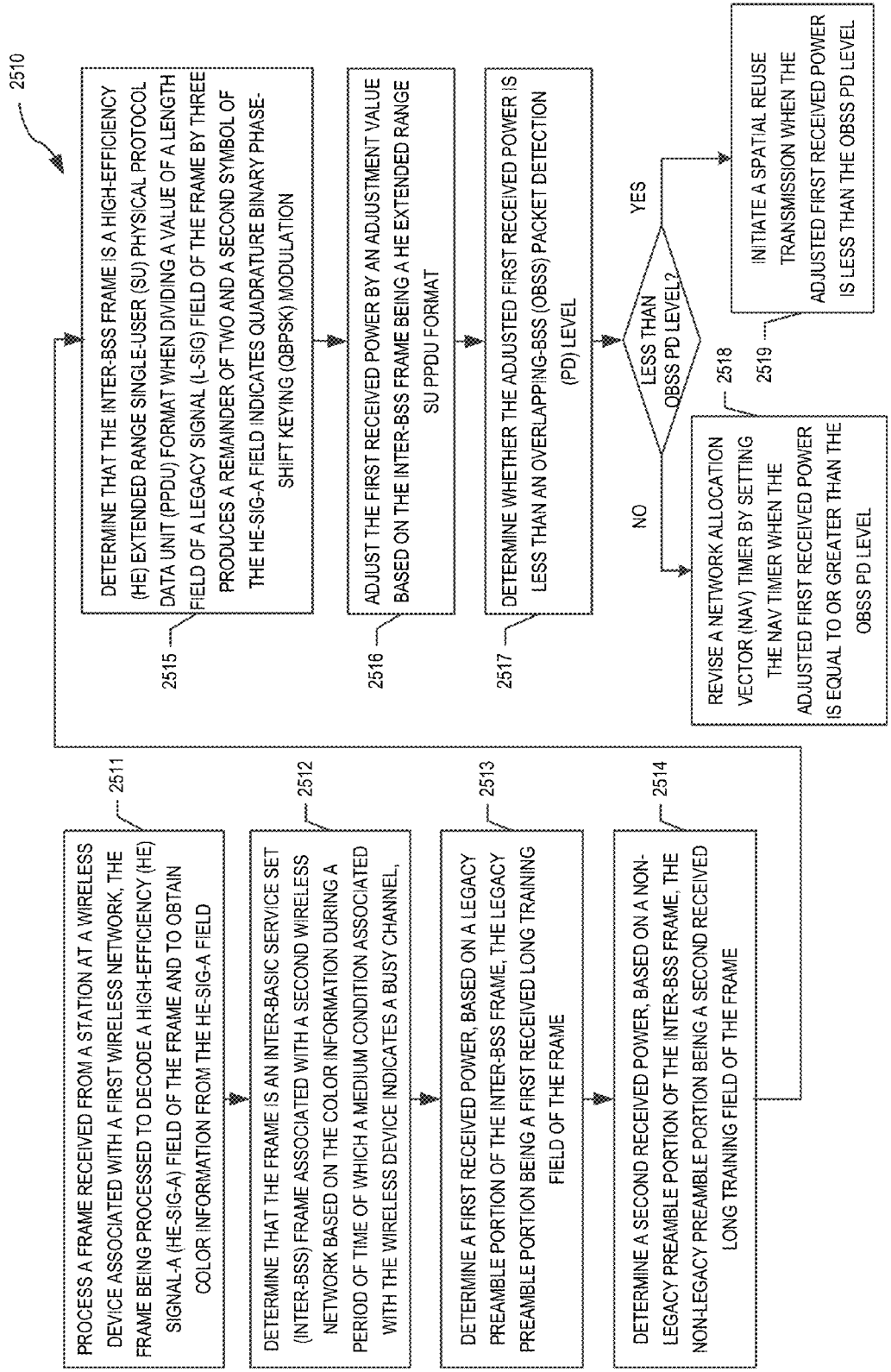
FIGS. 25A, 25B, and 25C illustrate flow charts of examples of methods for early detection procedure of high-efficiency frame and decision timing for spatial reuse.
Figure 25B:
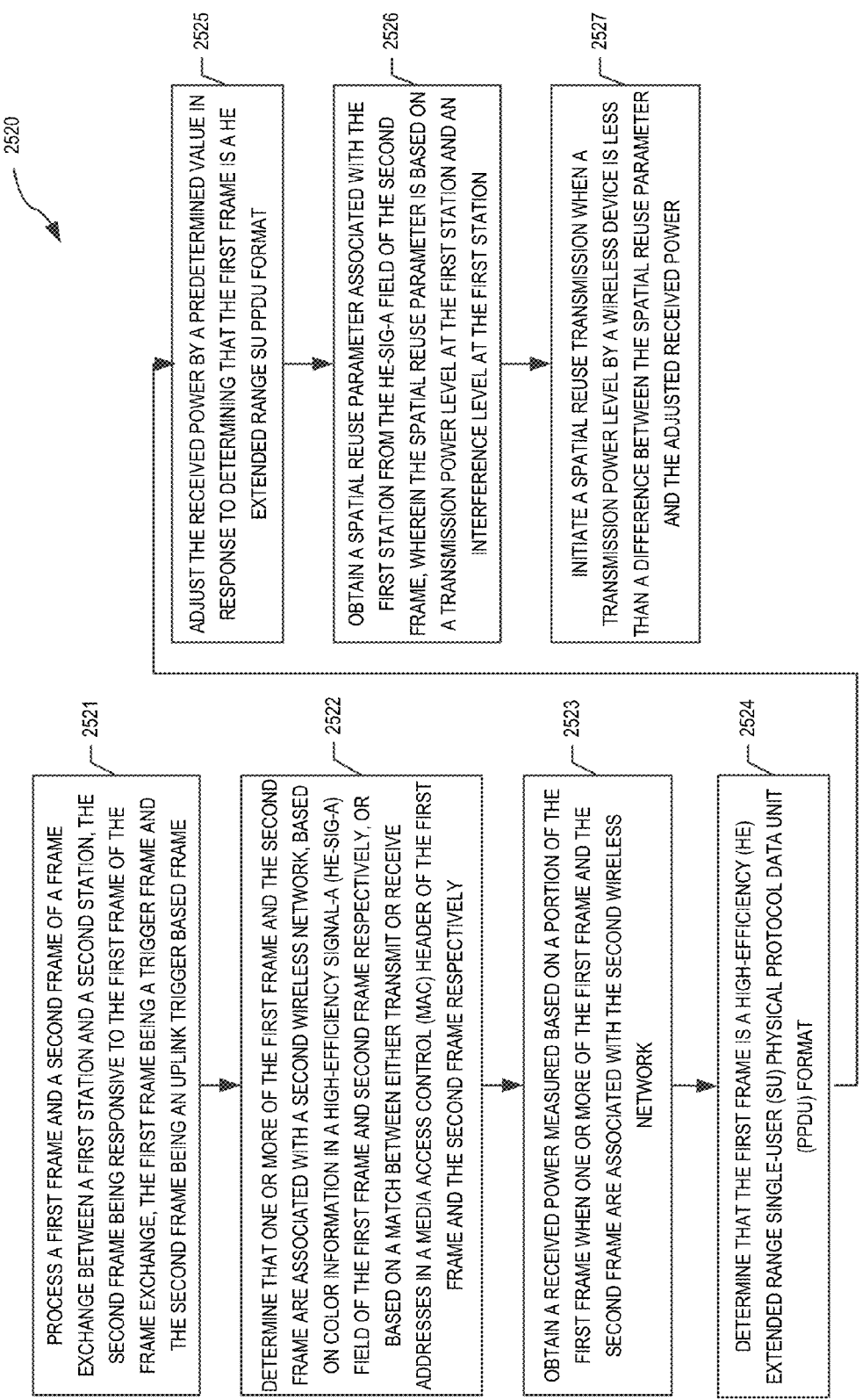
Figure 25C:
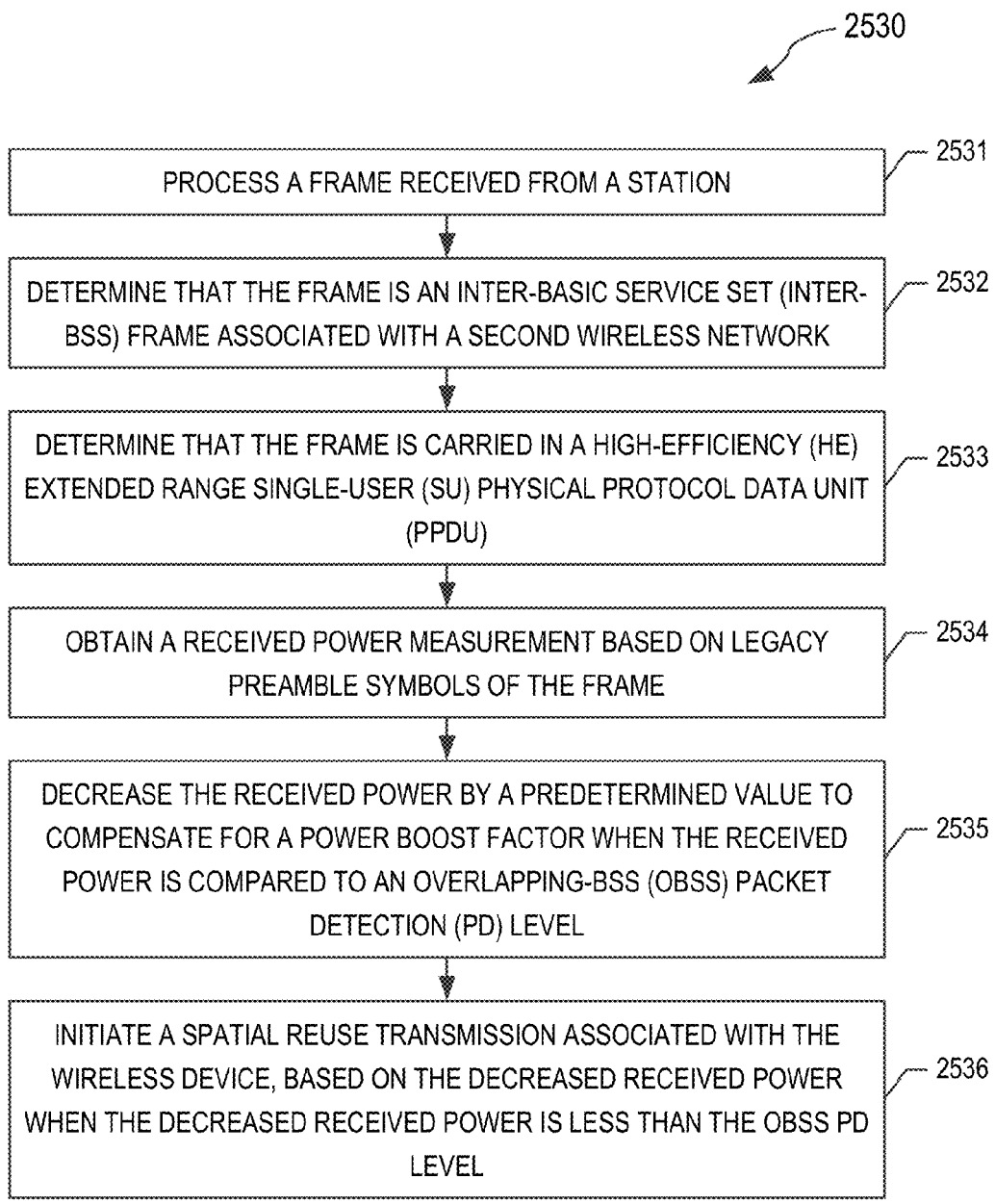

FIGS. 25A, 25B, and 25C illustrate flow charts of examples of methods for facilitating wireless communication. For explanatory and illustration purposes, the example processes 2510, 2520, and 2530 may be performed by the wireless communication devices 111-115 of FIG. 1 and their components such as a baseband processor 210, a MAC processor 211, a MAC software processing unit 212, a MAC hardware processing unit 213, a PHY processor 215, a transmitting signal processing unit 280 and/or a receiving signal processing unit 290; however, the example processes 2510, 2520, and 2530 are not limited to the wireless communication devices 111-115 of FIG. 1 or their components, and the example processes 2510, 2520, 2530 may be performed by some of the devices shown in FIG. 1, or other devices or components. Further, for explanatory and illustration purposes, the blocks of the example processes 2510, 2520, 2530 are described herein as occurring in serial or linearly. However, multiple blocks of the example processes 2510, 2520, 2530 may occur in parallel. In addition, the blocks of the example processes 2510, 2520, 2530 need not be performed in the order shown and/or one or more of the blocks/actions of the example processes 2510, 2520, 2530 need not be performed. Various examples of aspects of the disclosure are described below as clauses for convenience. These are provided as examples, and do not limit the subject technology. As an example, some of the operations described below are illustrated in FIGS. 25A, 25B, and 25C.

FIG. 25A illustrates a flow chart of the example process 2510. In step 2511, a wireless device (or station) processes a frame received from a station. The frame is processed to decode a HE-SIG-A field of the frame and to obtain color information from the HE-SIG-A field. In step 2512, the wireless device determines whether the frame is an inter-BSS frame associated with a second wireless network based on the color information during a period of time of which a medium condition associated with the wireless device indicates a busy channel. If the frame is an inter-BSS frame associated with the second wireless network, the process 2510 proceeds to step 2513. In step 2513, the wireless device determines a first received power that is based on a legacy preamble portion of the frame, where the legacy preamble portion is a first received long training field of the frame. In step 2514, the wireless device determines a second received power that is based on a non-legacy preamble portion of the frame, where the non-legacy preamble portion is a second received long training field of the frame. In step 2515, the wireless device determines that the inter-BSS frame is a HE extended range SU PPDU format when dividing a value of a length field of a legacy signal (L-SIG) field of the frame by three produces a remainder of two and a second symbol of the HE-SIG-A field indicates QBPSK modulation. In step 2516, the wireless device adjusts the first received power by an adjustment value based on the inter-BSS frame being a HE extended range SU PPDU format. In step 2517, the wireless device determines whether the adjusted first received power is less than an OBSS PD level. If the adjusted received power is determined to be equal to or greater than the OBSS PD level, then process 2510 proceeds to step 2518. Otherwise, process 2510 proceeds to step 2519. In step 2518, the wireless device revises a NAV timer by setting the NAV timer based on the adjusted first received power being equal to or greater than the OBSS PD level. In step 2519, the wireless device initiates a spatial reuse transmission based on the adjusted first received power being less than the OBSS PD level.

FIG. 25B illustrates a flow chart of the example process 2520. In step 2521, a wireless device (or station) processes a first frame and a second frame of a frame exchange between a first station and a second station, in which the second frame is responsive to the first frame of the frame exchange. The first frame can be a trigger frame and the second frame can be an UL trigger based frame. In step 2522, the wireless device determines that one or more of the first frame and the second frame are associated with a second wireless network, based on color information in a HE-SIG-A field of the first frame and second frame respectively, or based on a match between either transmit or receive addresses in a MAC header of the first frame and second frame respectively. In step 2523, the wireless devices obtains a received power measured based on a portion of the first frame when one or more of the first frame and the second frame are associated with the second wireless network. In step 2524, the wireless device determines that the frame is a HE extended range SU PPDU format. In step 2525, the wireless device adjusts the received power by a predetermined value in response to determining that the frame is a HE extended range SU PPDU format. In step 2526, the wireless device obtains a spatial reuse parameter associated with the first station from the HE-SIG-A field of the second frame, in which the spatial reuse parameter is based on a transmission power level at the first station and an interference level at the first station. In step 2527, the wireless device initiates a spatial reuse transmission when a transmission power level by the wireless device is less than a difference between the spatial reuse parameter and the adjusted received power.

FIG. 25C illustrates a flow chart of the example process 2530. In step 2531, a wireless device (or station) is processing a frame received from a station. In step 2532, the wireless device is determining that the frame is an inter-BSS frame associated with a second wireless network. In step 2533, the wireless device is determining that the frame is carried in a HE extended range SU PPDU. In step 2534, the wireless device is obtaining a received power measurement based on legacy preamble symbols of the frame. In step 2535, the wireless device is decreasing the received power by a predetermined value to compensate for a power boost factor when the received power is compared to an OBSS PD level. In step 2536, the wireless device is initiating a spatial reuse transmission associated with the wireless device, based on the decreased received power when the adjusted received power is less than the OBSS PD level.

In one or more aspects, clauses regarding the present disclosure are described below.

A method comprising one or more methods or operations described herein.

An apparatus or a station comprising one or more memories (e.g., 240, one or more internal, external or remote memories, or one or more registers) and one or more processors (e.g., 210) coupled to the one or more memories, the one or more processors configured to cause the apparatus to perform one or more methods or operations described herein.

An apparatus or a station comprising one or more memories (e.g., 240, one or more internal, external or remote memories, or one or more registers) and one or more processors (e.g., 210 or one or more portions), wherein the one or more memories store instructions that, when executed by the one or more processors, cause the one or more processors to perform one or more methods or operations described herein.

An apparatus or a station comprising means (e.g., 210) adapted for performing one or more methods or operations described herein.

A computer-readable storage medium (e.g., 240, one or more internal, external or remote memories, or one or more registers) comprising instructions stored therein, the instructions comprising code for performing one or more methods or operations described herein.

A computer-readable storage medium (e.g., 240, one or more internal, external or remote memories, or one or more registers) storing instructions that, when executed by one or more processors (e.g., 210 or one or more portions), cause the one or more processors to perform one or more methods or operations described herein.

In one aspect, a method may be an operation, an instruction, or a function and vice versa. In one aspect, a clause may be amended to include some or all of the words (e.g., instructions, operations, functions, or components) recited in other one or more clauses, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware or software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the present disclosure. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A. B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A wireless device, associated with a first wireless network, for facilitating spatial reuse, the wireless device comprising:
   one or more memories; and
   one or more processors coupled to the one or more memories, the one or more processors configured to cause:
   processing a frame received from a station;
   determining whether the frame is associated with a second wireless network;
   determining a first received power, based on a legacy preamble portion of the frame, when the frame is associated with the second wireless network;
   detecting whether the frame is in a high-efficiency extended range single-user physical layer protocol data unit (HE ER SU PPDU) format from a plurality of frame formats, wherein detecting that the frame is in the HE ER SU PPDU format indicates that the legacy preamble portion of the frame is boosted in power by a predetermined value;
in response to detecting that the frame is in the HE ER SU PPDU format, adjusting the first received power by the predetermined value; and
initiating a spatial reuse transmission based on the adjusted first received power,
wherein the HE ER SU PPDU format includes a legacy short training field (L-STF), which is directly followed by a legacy long training field (L-LTF), which is directly followed by a legacy signal (L-SIG) field, which is directly followed by a repeated L-SIG (RL-SIG) field, which is directly followed by a high-efficiency signal-A (HE-SIG-A) field, which is directly followed by a high-efficiency short training field (HE-STF), and
wherein the HE-SIG-A field is 16 microseconds (μs) in length, and the HE-STF is 4 μs in length.

2. The wireless device of claim 1, wherein processing the frame comprises:
decoding the HE-SIG-A field of the frame;
obtaining contents from the HE-SIG-A field, the contents containing color information,
wherein determining whether the frame is associated with the second wireless network comprises determining that the frame is associated with the second wireless network based on the color information.

3. The wireless device of claim 2, wherein when the color information does not match with color information associated with the first wireless network, the frame is an inter-basic service set (inter-BSS) frame.

4. The wireless device of claim 1, wherein the one or more processors are configured to cause:
determining whether the adjusted first received power is less than an overlapping basic service set (OBSS) packet detection (PD) level,
wherein the spatial reuse transmission is initiated when the adjusted first received power is less than the OBSS PD level.

5. The wireless device of claim 1, wherein adjusting the first received power comprises decreasing the first received power by three (3) decibel (dB).

6. The wireless device of claim 1, wherein the one or more processors are configured to cause:
determining a second received power based on a non-legacy preamble portion of the frame, wherein the legacy preamble portion of the frame is a first received long training field of the frame and the non-legacy preamble portion of the frame is a second received long training field of the frame; and
passing the first received power from a physical layer of the wireless device to a media access control layer of the wireless device.

7. The wireless device of claim 1, wherein the first received power comprises a received signal strength indicator (RSSI) value associated with the legacy preamble portion of the frame.

8. The wireless device of claim 1, wherein the one or more processors are configured to cause:
revising a network allocation vector (NAV) timer based on a comparison between the adjusted first received power and an overlapping basic service set (OBSS) packet detection (PD) level.

9. The wireless device of claim 1, wherein the one or more processors are configured to cause:
setting a network allocation vector (NAV) timer when the adjusted first received power is equal to or greater than an overlapping basic service set (OBSS) packet detection (PD) level.

10. The wireless device of claim 1, wherein detecting whether the frame is in the HE ER SU PPDU format comprises detecting that the frame is in the HE ER SU PPDU format based on a length field of the L-SIG field of the frame and the HE-SIG-A field of the frame.

11. The wireless device of claim 1, wherein when dividing a value of the length field of the L-SIG field of the frame by three produces a remainder of two and a second orthogonal frequency division modulation (OFDM) symbol of the HE-SIG-A field of the frame indicates quadrature binary phase-shift keying (QBPSK) modulation, the frame is determined to be in the HE ER SU PPDU format.

12. The wireless device of claim 1, wherein a medium condition associated with the wireless device is indicated to be busy during a period of time for the wireless device to determine whether the frame is an inter-basic service set (inter-BSS) frame.

13. A wireless device for facilitating spatial reuse in a first wireless network, the wireless device comprising:
one or more memories; and
one or more processors coupled to the one or more memories, the one or more processors configured to cause:
processing a first frame and a second frame of a frame exchange between a first station and a second station, the second frame being responsive to the first frame of the frame exchange;
determining that one or more of the first frame and the second frame are associated with a second wireless network;
obtaining a received power measured based on a portion of the first frame when one or more of the first frame and the second frame are associated with the second wireless network;
detecting whether the first frame is in a high-efficiency extended range single-user physical layer protocol data unit (HE ER SU PPDU) format from a plurality of frame formats, wherein detecting that the first frame is in the HE ER SU PPDU format indicates that the portion of the first frame is boosted in power by a predetermined value;
in response to detecting that the first frame is in the HE ER SU PPDU format, adjusting the received power by the predetermined value;
obtaining a spatial reuse parameter associated with the first station, wherein the spatial reuse parameter is based on a transmission power level at the first station and an interference level at the first station; and
initiating a spatial reuse transmission based on the spatial reuse parameter and the adjusted received power,
wherein the HE ER SU PPDU format includes a legacy short training field (L-STF), which is directly followed by a legacy long training field (L-LTF), which is directly followed by a legacy signal (L-SIG) field, which is directly followed by a repeated L-SIG (RL-SIG) field, which is directly followed by a high-efficiency signal-A (HE-SIG-A) field, which is directly followed by a high-efficiency short training field (HE-STF), and
wherein the HE-SIG-A field is 16 microseconds (μs) in length, and the HE-STF is 4 μs in length.

14. The wireless device of claim 13, wherein determining that one or more of the first frame and the second frame are associated with the second wireless network comprises:
- determining that the first frame is associated with the second wireless network based on color information in the HE-SIG-A field of the first frame or based on a match between either a transmit address or a receive address in a media access control (MAC) header of the first frame; and
- determining that the second frame is associated with the second wireless network based on color information in an HE-SIG-A field of the second frame or based on a match between either a transmit address or a receive address in a MAC header of the second frame.

15. The wireless device of claim 13, wherein the one or more processors are configured to cause obtaining the spatial reuse parameter from the HE-SIG-A field of the second frame.

16. The wireless device of claim 13, wherein initiating the spatial reuse transmission is performed when a transmission power level by the wireless device is less than a difference between the spatial reuse parameter and the adjusted received power.

17. The wireless device of claim 13, wherein the first frame is a trigger frame, and the second frame is an uplink (UL) trigger based frame.

18. A computer-implemented method, comprising:
- processing a frame received from a station;
- determining that the frame is an inter-basic service set (inter-BSS) frame associated with a second wireless network;
- determining whether the frame is carried in a high-efficiency extended range single-user physical layer protocol data unit (HE ER SU PPDU), wherein determining that the frame is carried in the HE ER SU PPDU format indicates that the legacy preamble symbols of the frame are boosted in power by a predetermined value;
- obtaining a received power measurement based on legacy preamble symbols of the frame;
- in response to determining that the frame is carried in the HE ER SU PPDU format, decreasing the received power by the predetermined value to compensate for a power boost factor when the received power is compared to an overlapping-BSS (OBSS) packet detection (PD) level; and
- initiating a spatial reuse transmission associated with the station, based on the decreased received power when the decreased received power is less than the OBSS PD level,
- wherein the HE ER SU PPDU format includes a legacy short training field (L-STF), which is directly followed by a legacy long training field (L-LTF), which is directly followed by a legacy signal (L-SIG) field, which is directly followed by a repeated L-SIG (RL-SIG) field, which is directly followed by a high-efficiency signal-A (HE-SIG-A) field, which is directly followed by a high-efficiency short training field (HE-STF), and
- wherein the HE-SIG-A field is 16 microseconds (µs) in length, and the HE-STF is 4 µs in length.

* * * * *